United States Patent [19]

Sindhu et al.

(10) Patent No.: US 6,917,620 B1
(45) Date of Patent: *Jul. 12, 2005

(54) SEPARATION OF DATA AND CONTROL IN A SWITCHING DEVICE

(75) Inventors: Pradeep S. Sindhu, Mountain View, CA (US); Kireeti Kompella, Sunnyvale, CA (US); Dennis C. Ferguson, Mountain View, CA (US); Bjorn O. Liencres, Palo Alto, CA (US); Nalini Agarwal, Sunnyvale, CA (US); Hann-Hwan Ju, San Jose, CA (US); Raymond Marcelino Manese Lim, Mountain View, CA (US); Rasoul Mirzazadeh Oskouy, Fremont, CA (US); Sreeram Veeragandham, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,864

(22) Filed: Dec. 17, 1999

Related U.S. Application Data

(63) Continuation-in-part of application No. 08/901,061, filed on Jul. 24, 1997, now Pat. No. 6,493,347, which is a continuation-in-part of application No. 08/844,171, filed on Apr. 18, 1997, now Pat. No. 5,905,725, which is a continuation-in-part of application No. 08/767,576, filed on Dec. 16, 1996, now Pat. No. 5,909,440.

(51) Int. Cl.$^7$ ................................................ H04J 3/24
(52) U.S. Cl. ...................................... 370/401; 370/384

(58) Field of Search ................................ 370/401, 389, 370/396, 397, 351, 352, 354, 355, 428, 412, 429, 413, 414–418, 442, 368, 363, 353, 398, 395.1, 395.31, 395.53, 395.6, 395.61, 395.64, 395.65, 395.7, 395.71, 399, 475; 340/825.01, 825.03; 717/1, 3, 100, 102, 103

(56) References Cited

U.S. PATENT DOCUMENTS 4,947,388 A * 8/1990 Kuwahara et al. .......... 370/411
5,448,702 A   9/1995 Garcia, Jr. et al.

(Continued)

OTHER PUBLICATIONS

Gersht et al., "Architecture for Restorable Call Allocation and Fast VP Restoration in Mesh ATM Networks," *IEEE International Conference on Communications*, 1997, vol. 3, pp. 1158–1163.

(Continued)

*Primary Examiner*—Dang T. Ton
(74) *Attorney, Agent, or Firm*—Harrity & Snyder, LLP

(57) ABSTRACT

A method and apparatus for switching a data packet between a source and destination in a network. The data packet includes a header portion and a data portion. The header portion includes routing information for the data packet. The method includes defining a data path in the router comprising a path through the router along which the data portion of the data packet travels and defining a control path comprising a path through the router along which routing information from the header portion travels. The method includes separating the data path and control path in the router such that the routing information can be separated from the data portion allowing for the separate processing of each in the router. The data portion can be stored in a global memory while routing decisions are made on the routing information in the control path.

33 Claims, 34 Drawing Sheets

U.S. PATENT DOCUMENTS

| | | | |
|---|---|---|---|
| 5,457,687 A | 10/1995 | Newman | |
| 5,491,694 A | 2/1996 | Oliver et al. | |
| 5,521,910 A | 5/1996 | Matthews | |
| 5,539,815 A | 7/1996 | Samba | 379/220 |
| 5,835,710 A * | 11/1998 | Nagami et al. | 709/250 |
| 5,905,725 A | 5/1999 | Sindhu et al. | 370/389 |
| 5,909,440 A * | 6/1999 | Ferguson et al. | 370/389 |
| 6,493,347 B2 * | 12/2002 | Sindhu et al. | 370/401 |

OTHER PUBLICATIONS

Hagard et al., "Multiprotocol Label Switching in ATM Networks," *Ericsson Review*, SE, Ericsson, Stockholm, 1998, 1:32–39.

Nilsson et al., "Fast Address Lookup for Internet Routers" University of Technology, 13 pgs., (Juniper Networks Feb. 10, 1998).

Wipusitwarakun et al., "VP's Priority Based Restoring Function Enhanced Self–healing Algorithm," *IEICE Trans. Commun.*, 1998, E81–B, 11:2100–2108.

\* cited by examiner

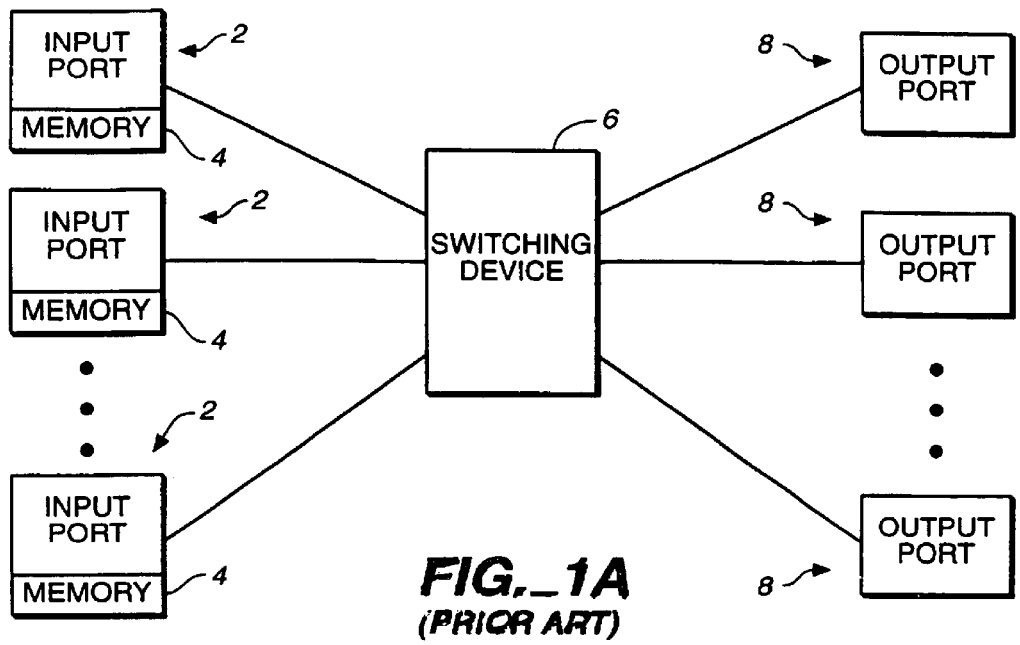
FIG._1A
*(PRIOR ART)*
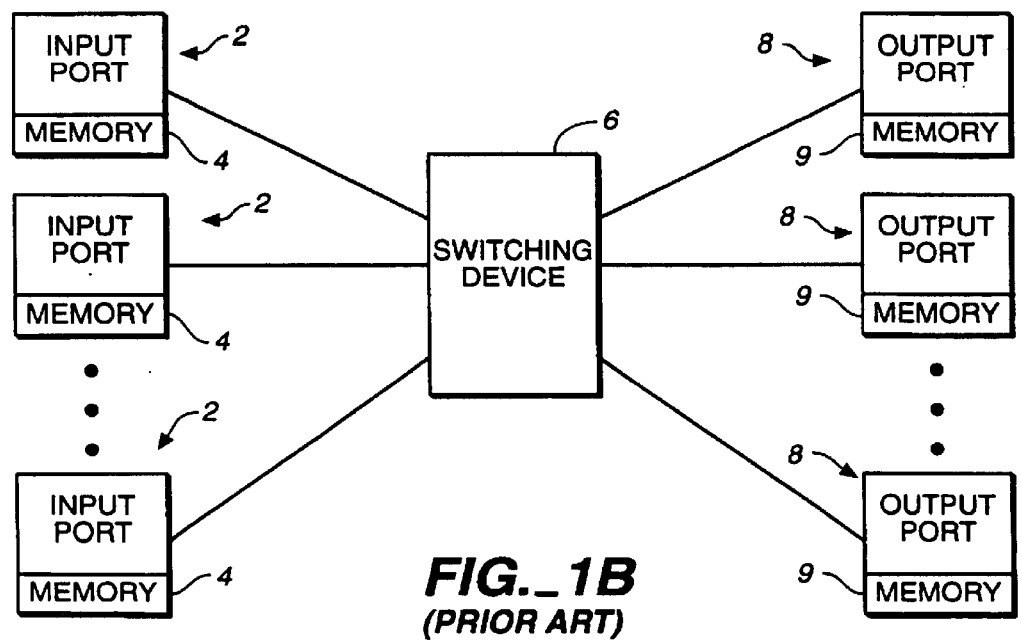
FIG._1B
*(PRIOR ART)*

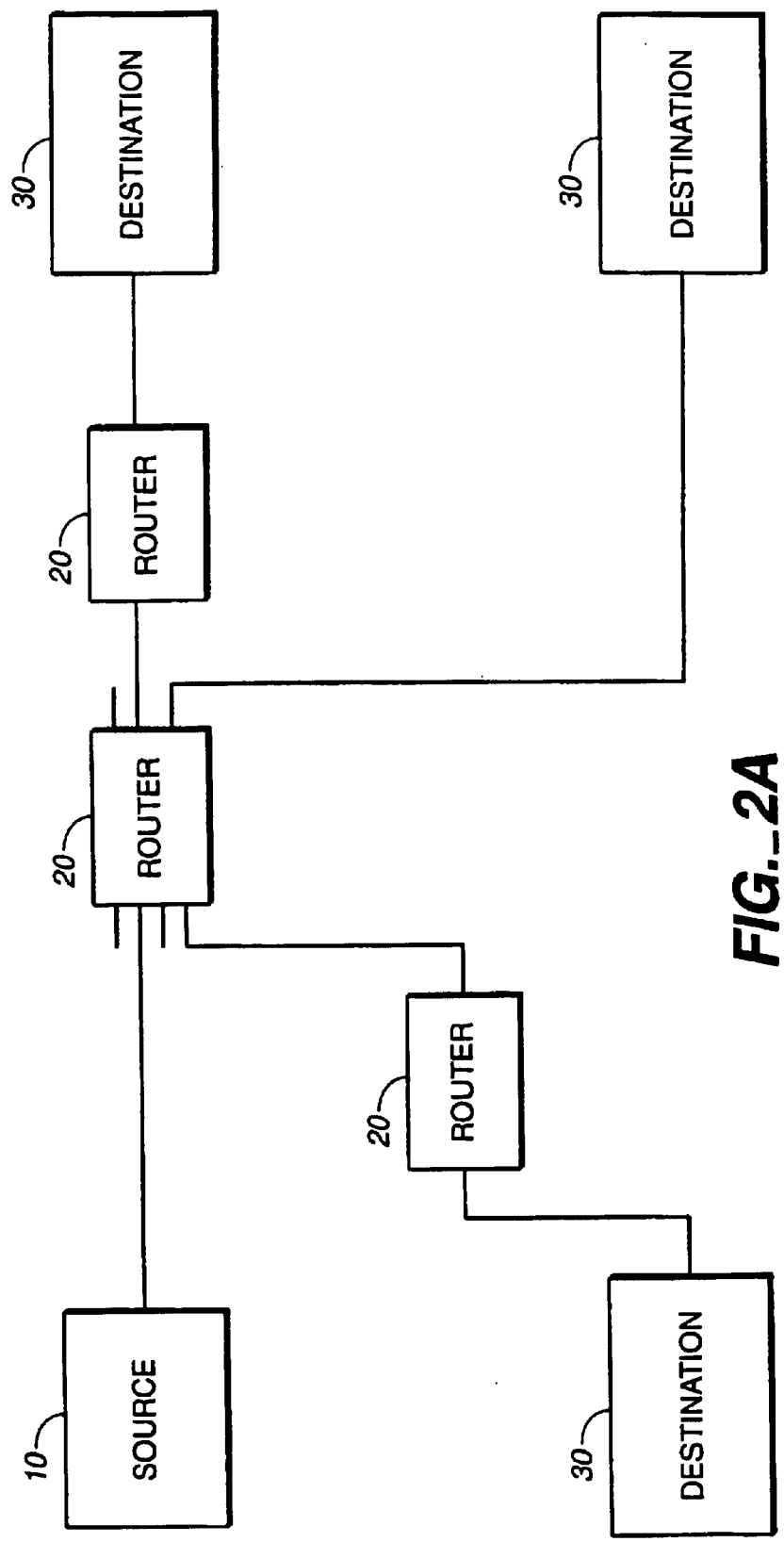
FIG._2A

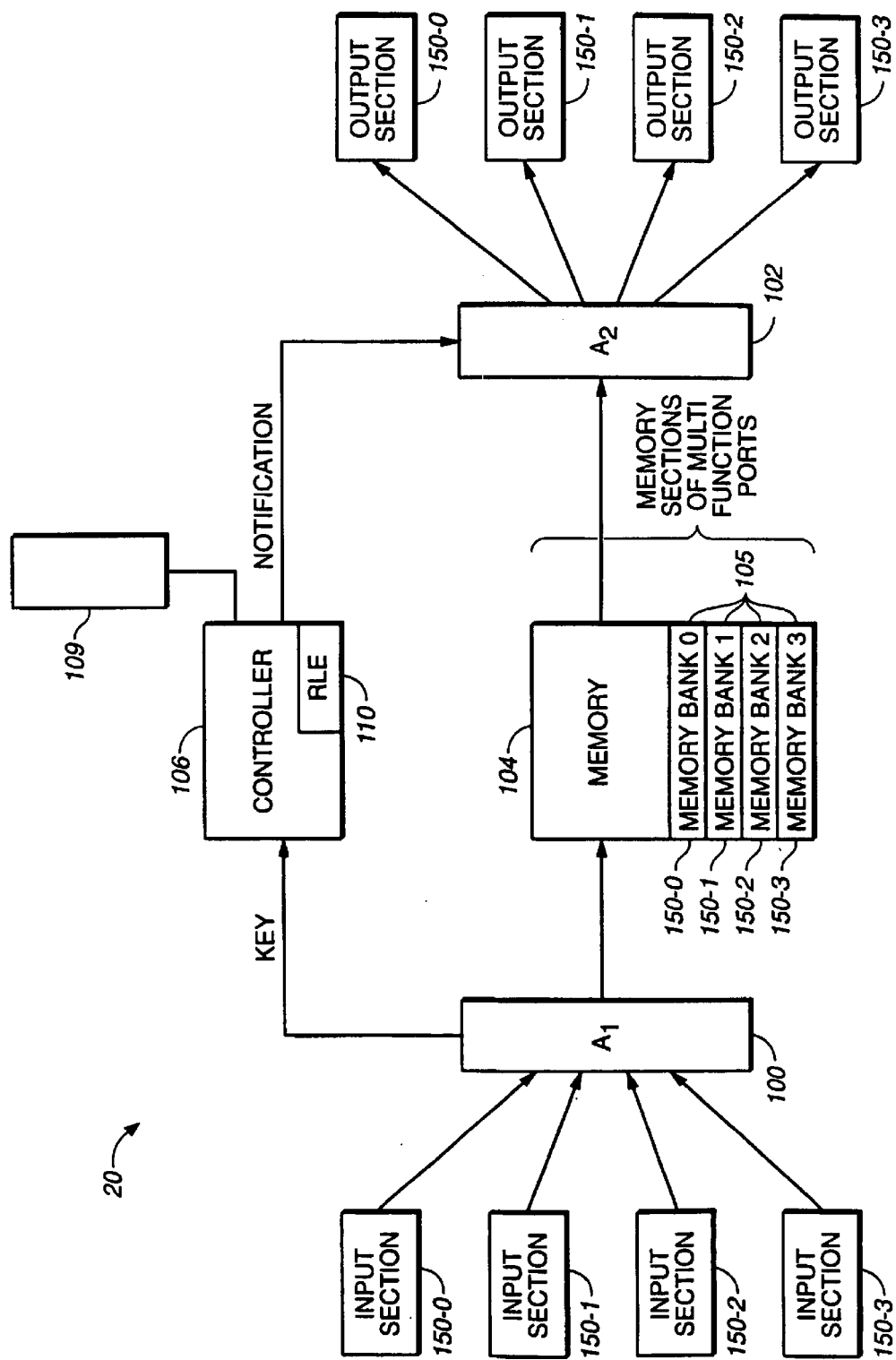
FIG._2B

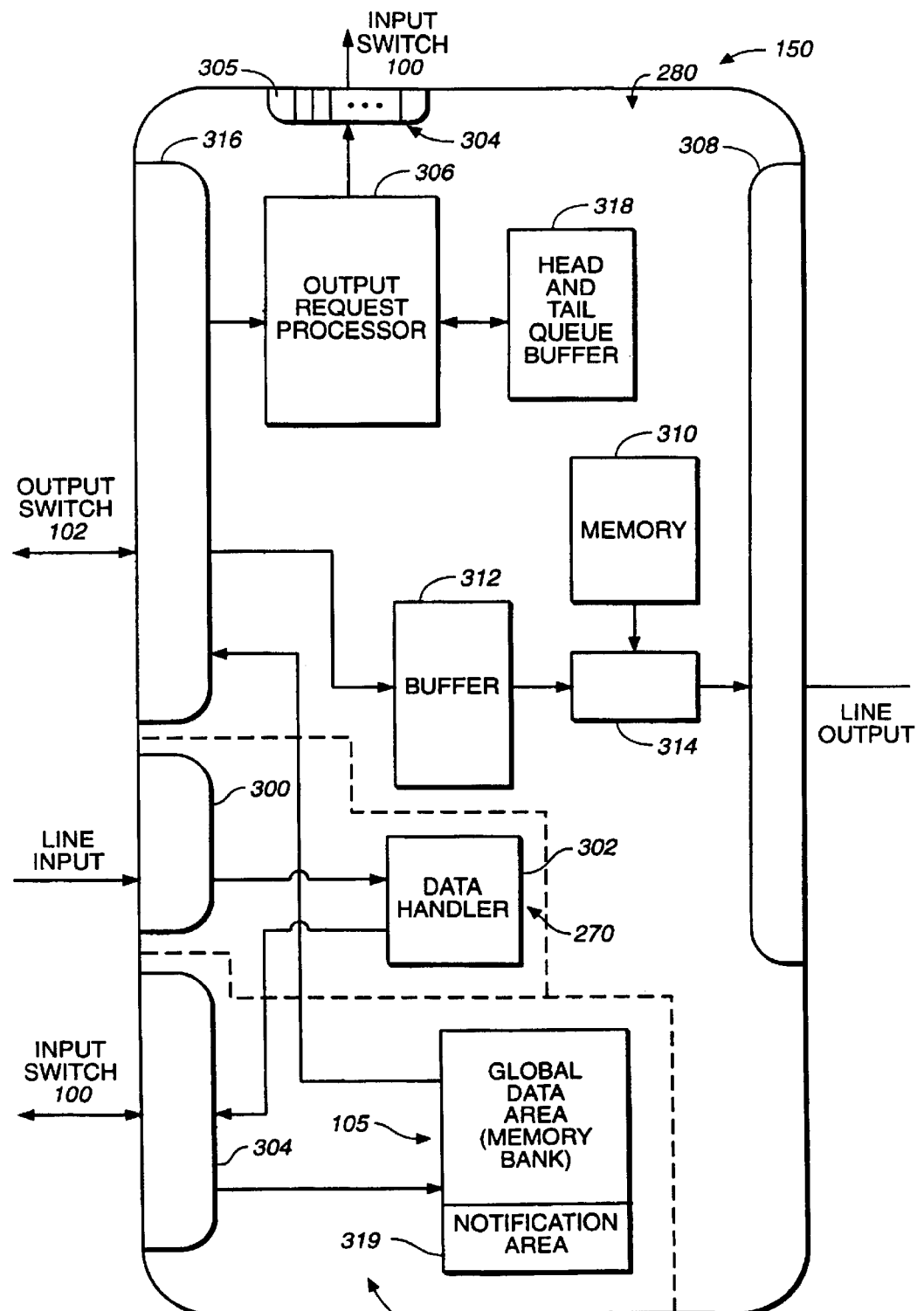
FIG._3A

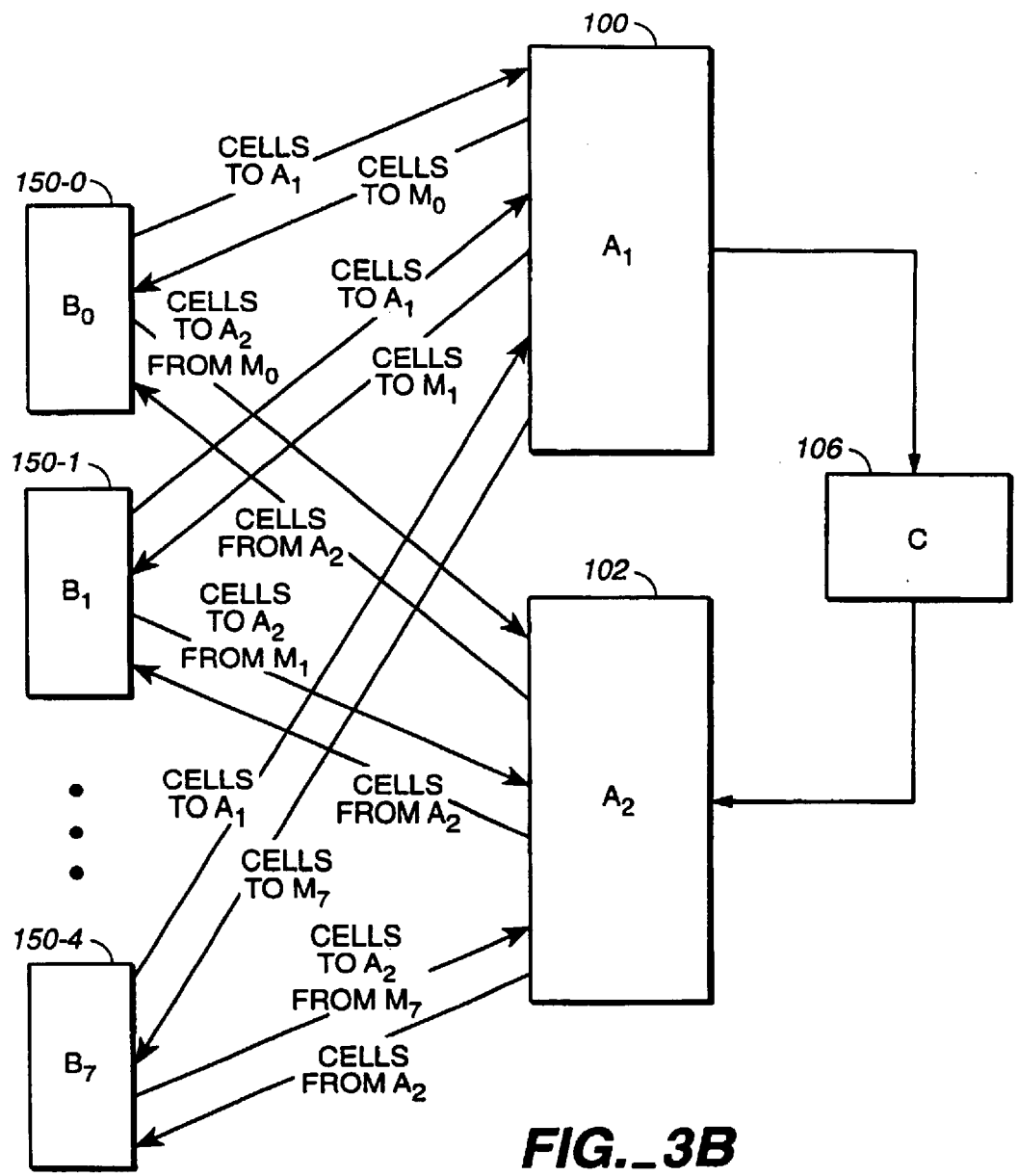
FIG._3B

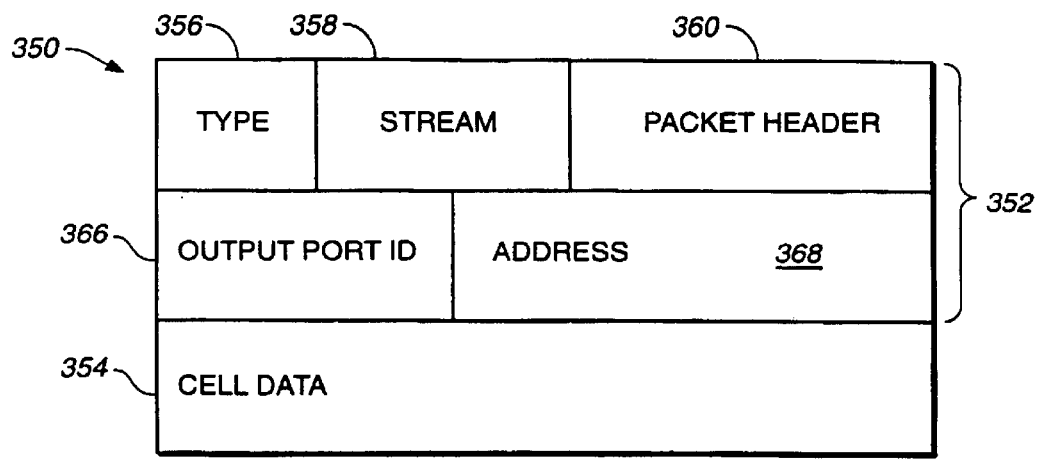
FIG._3C
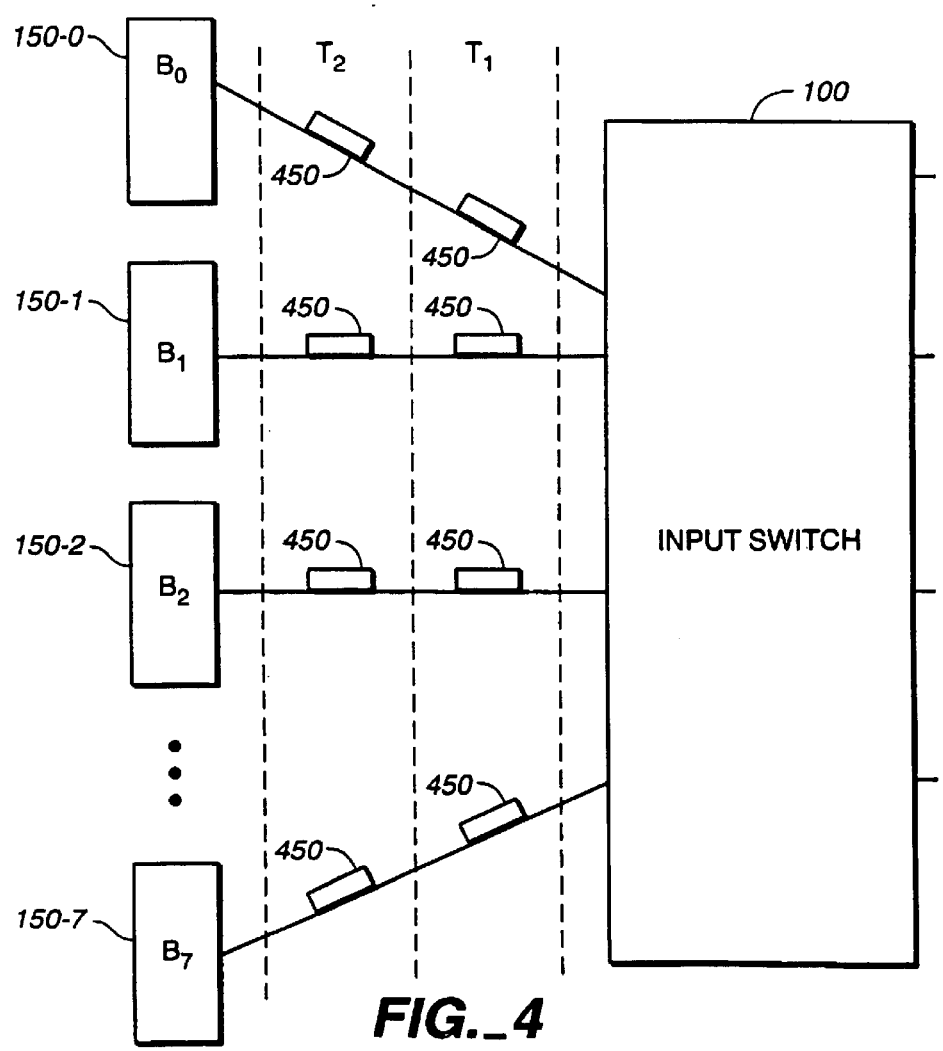
FIG._4

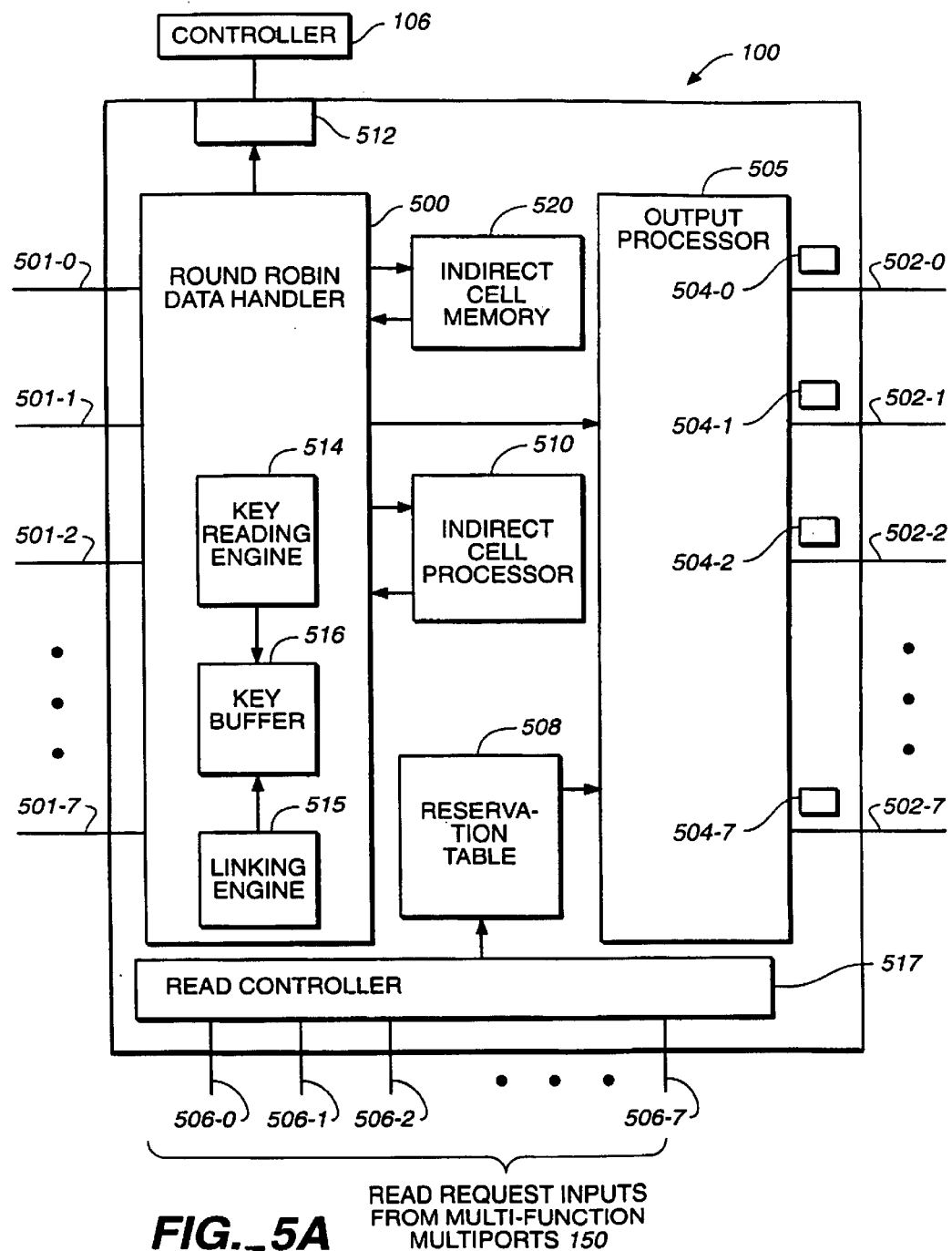
FIG._5A READ REQUEST INPUTS FROM MULTI-FUNCTION MULTIPORTS 150

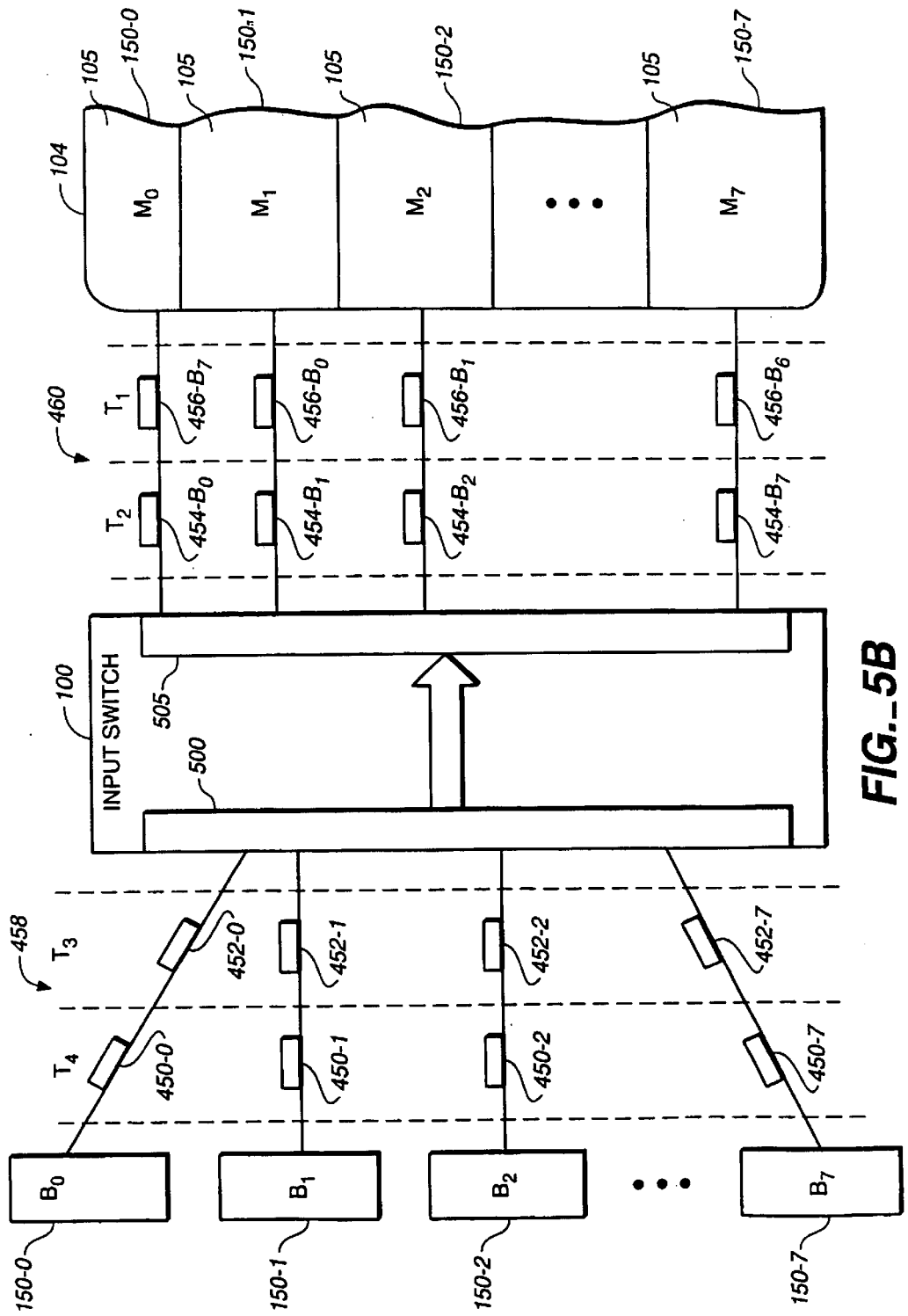

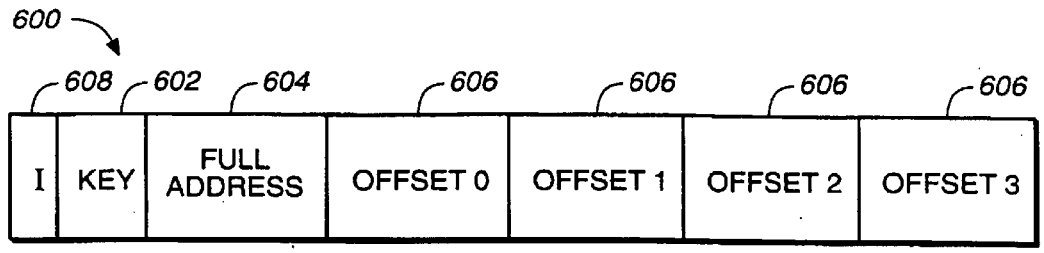
FIG._6
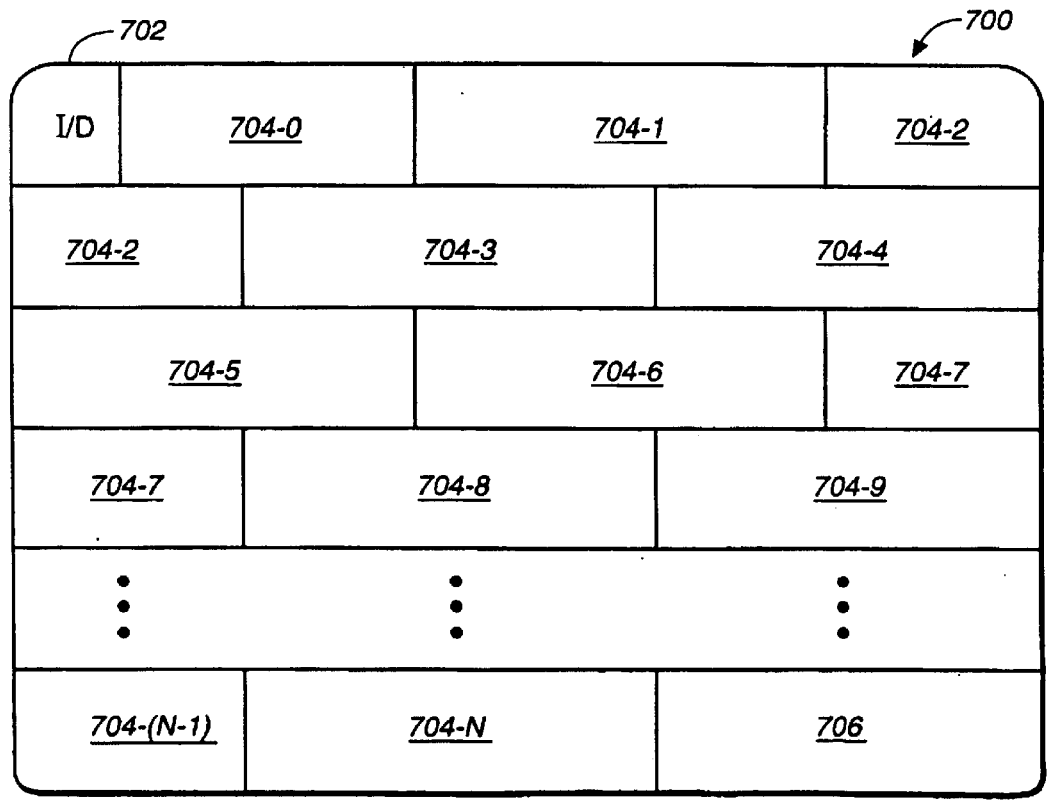
FIG._7

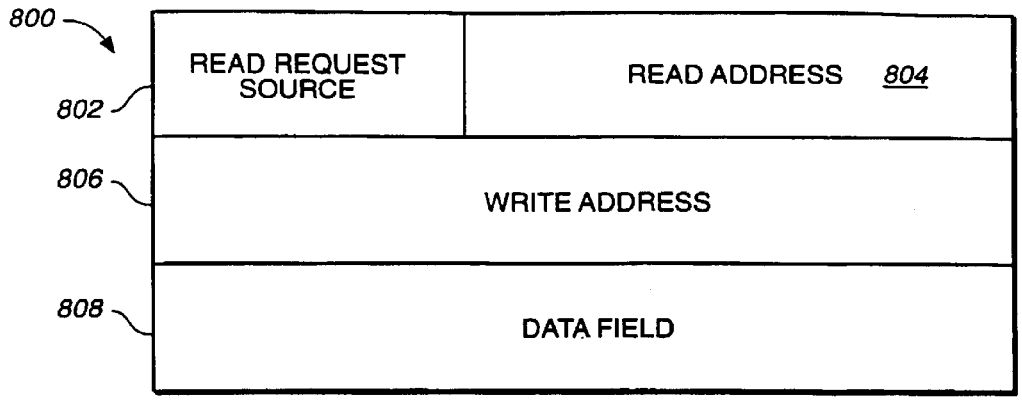
FIG._8
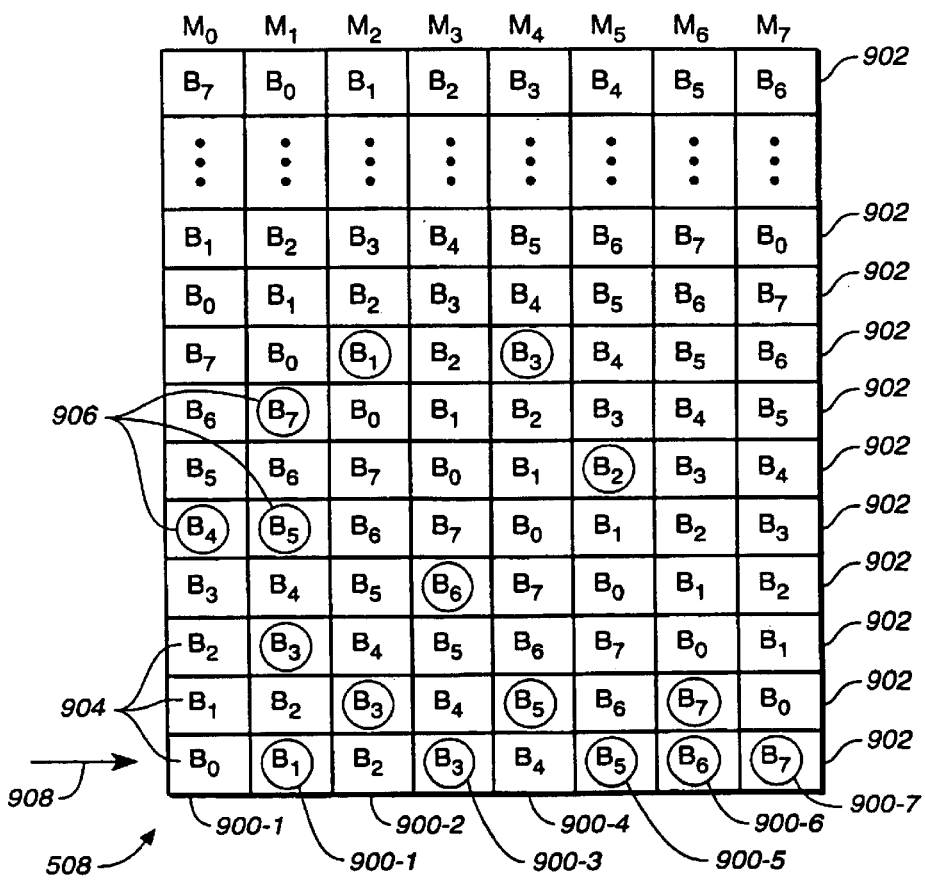
FIG._9

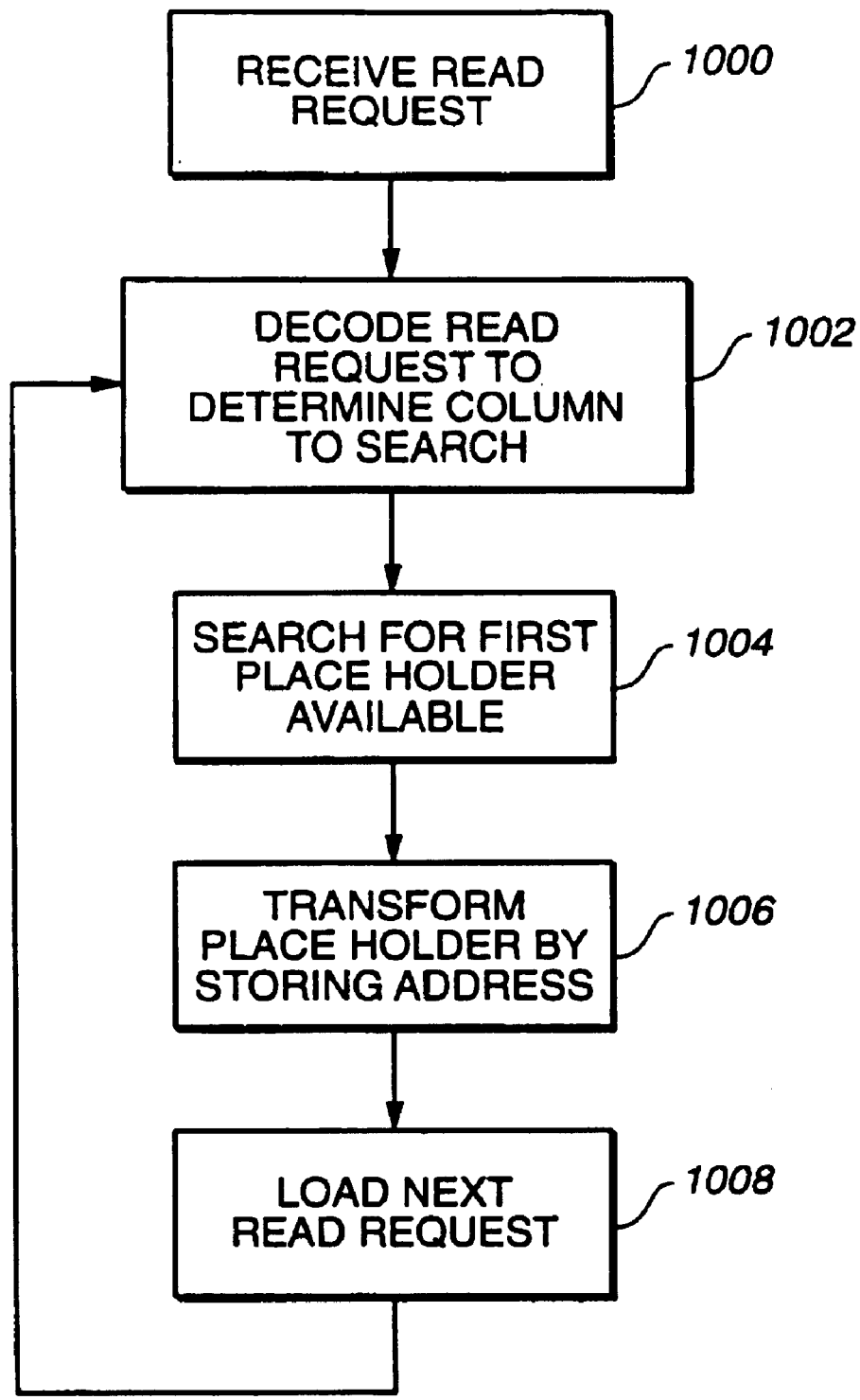
FIG._10

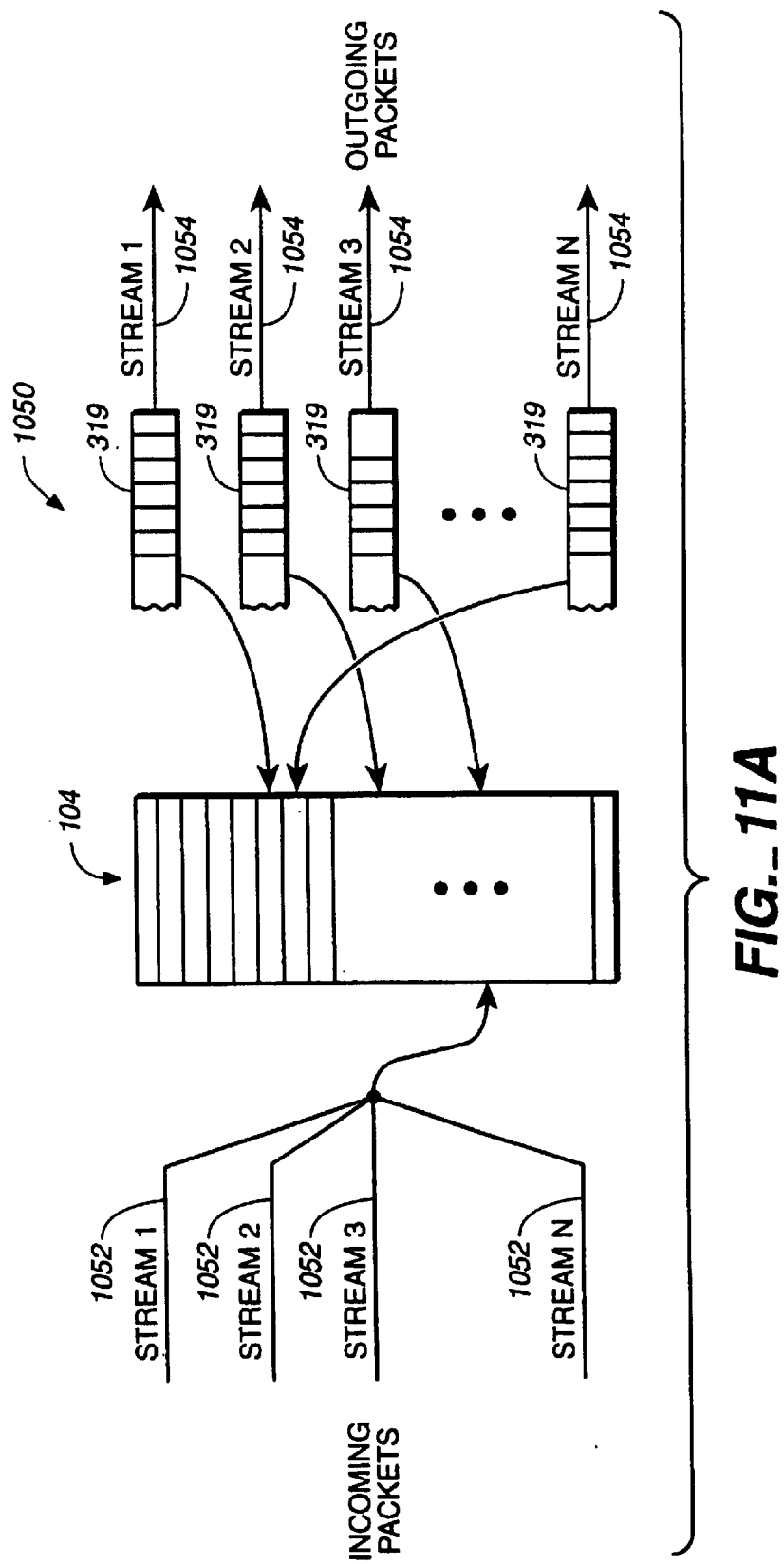
FIG._11A

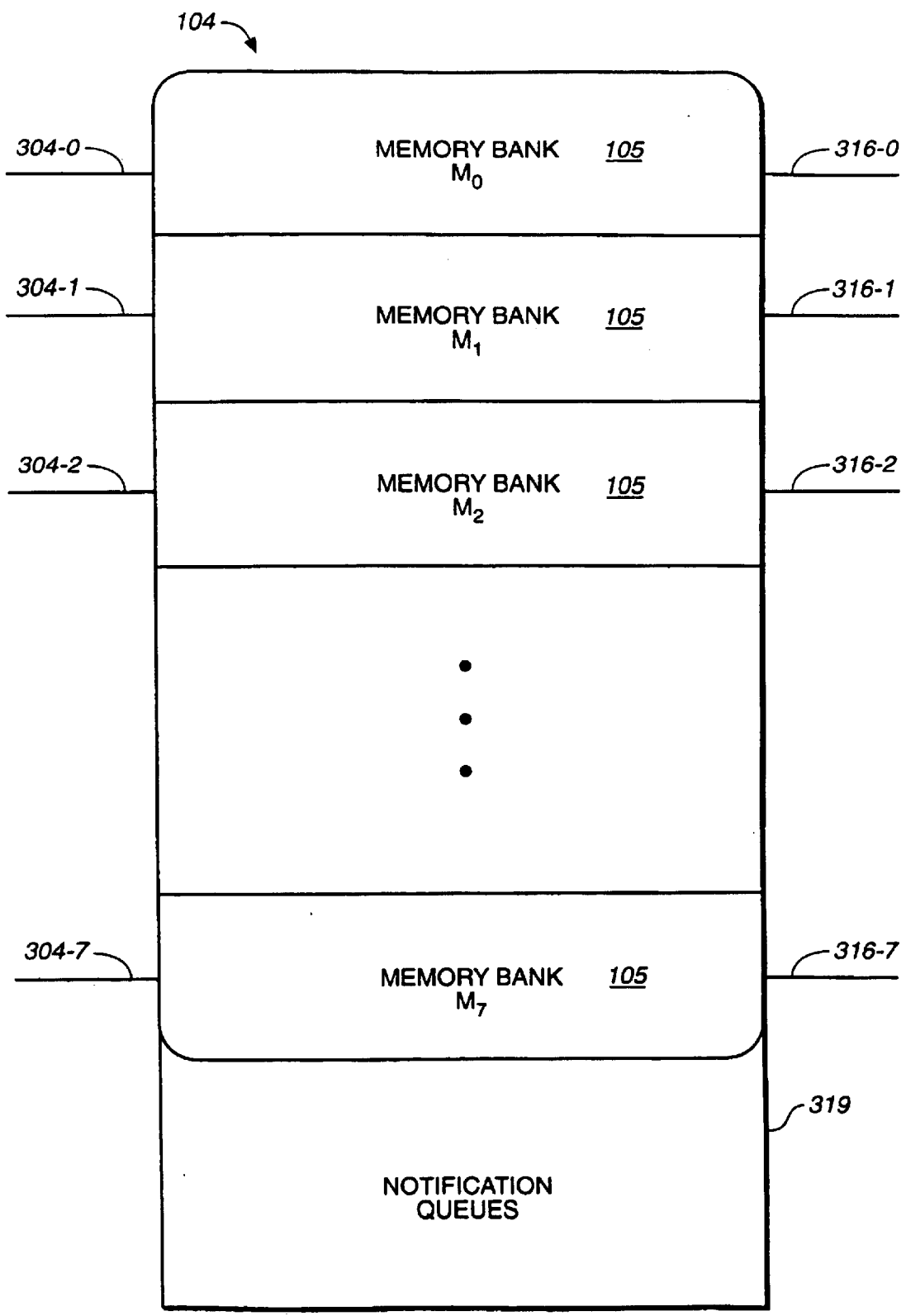
FIG._11B

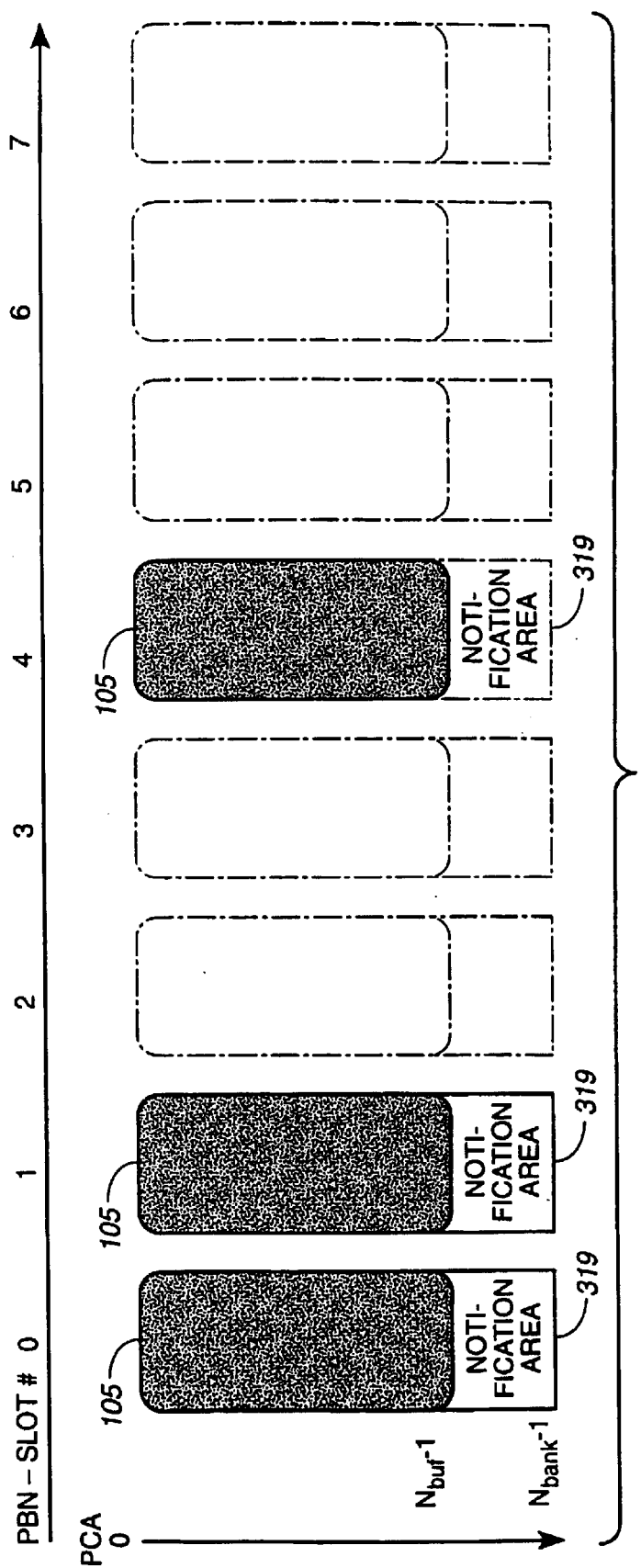
FIG._11C

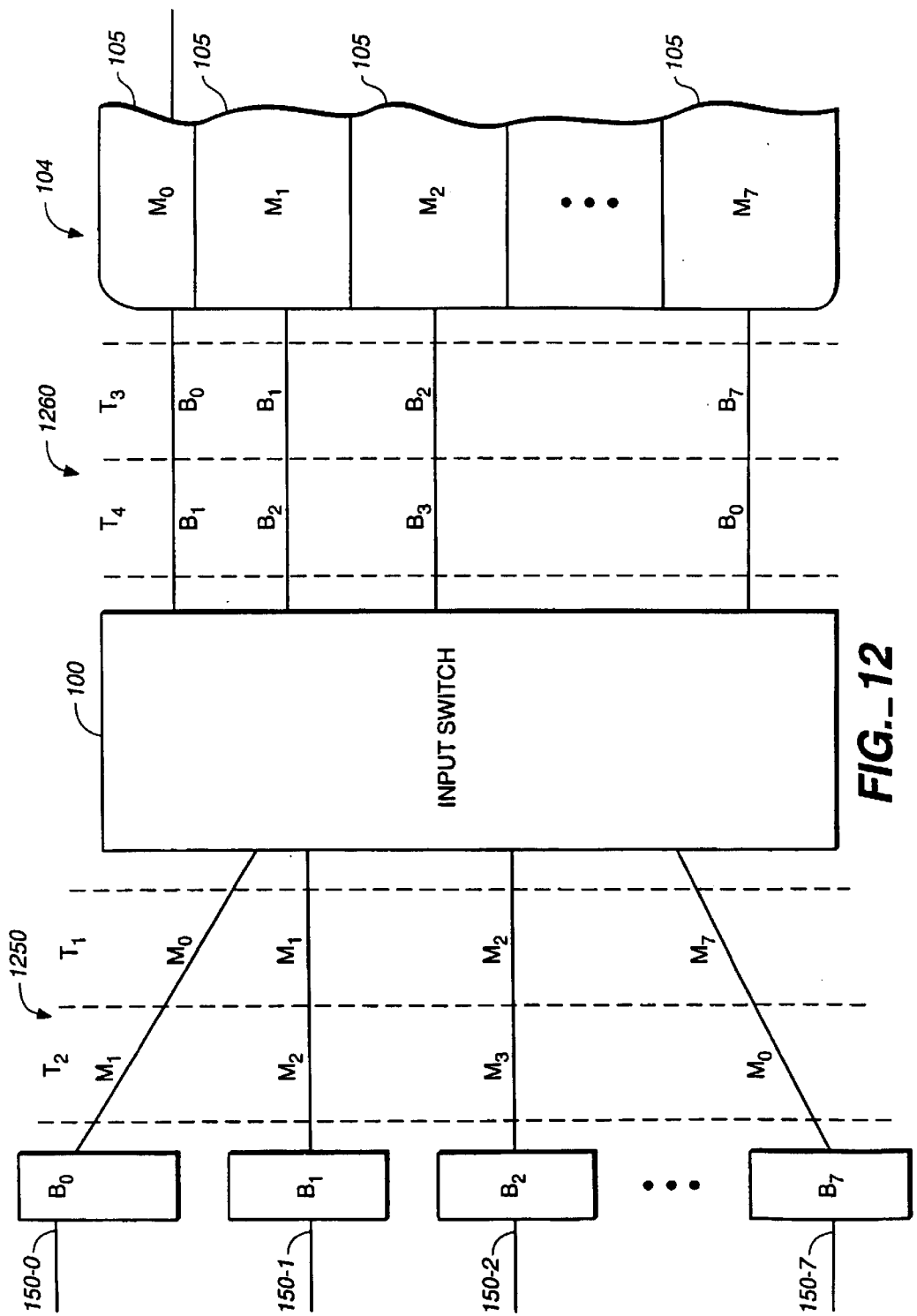

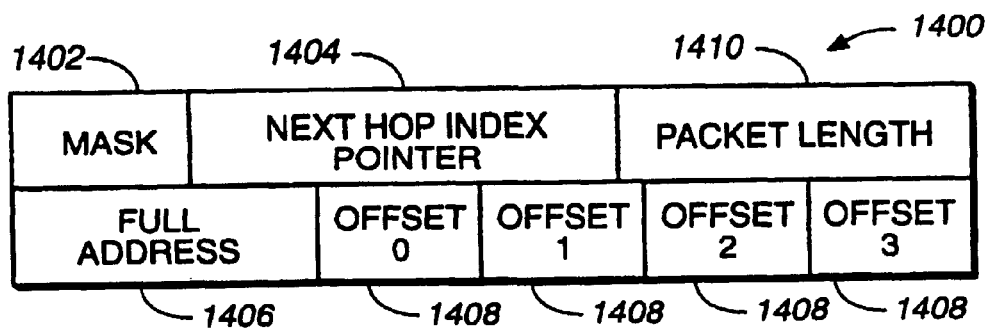
FIG._14

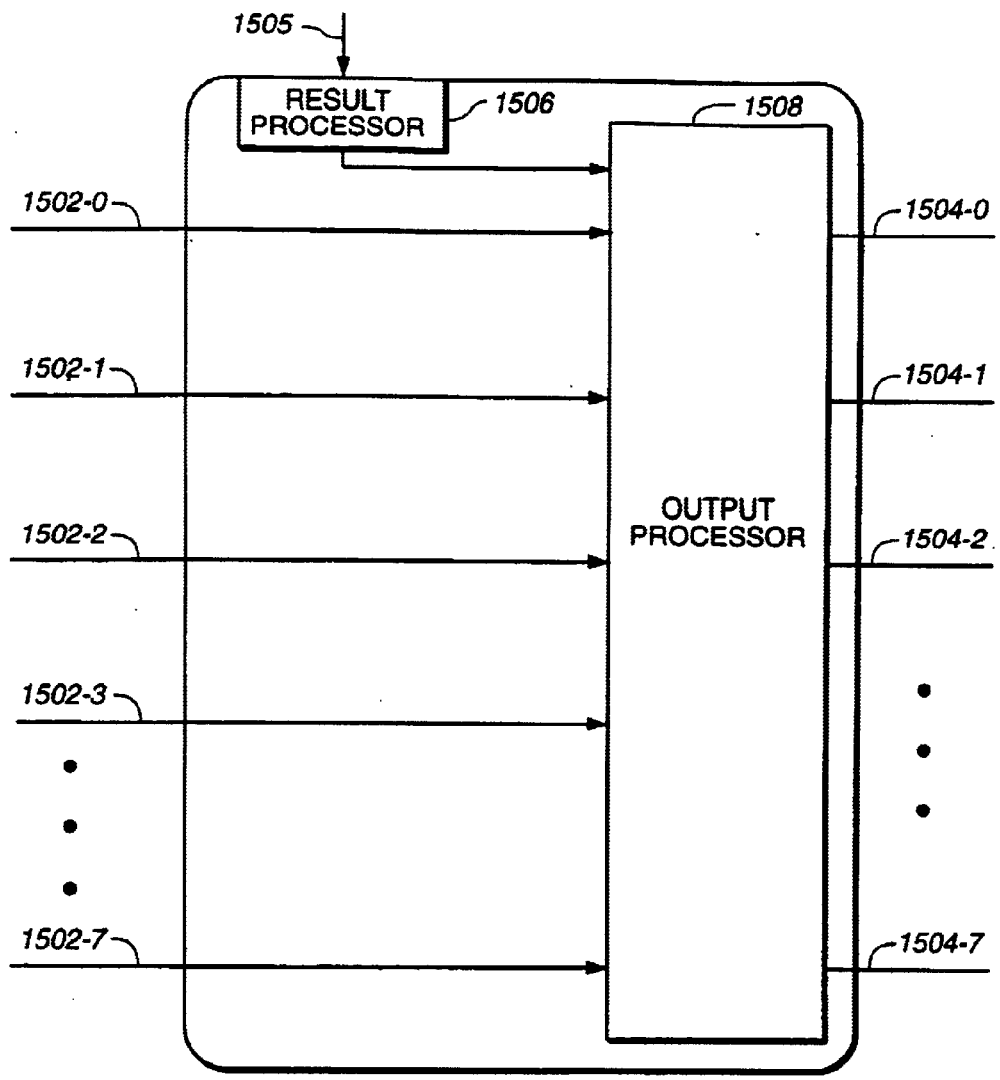
FIG._15A
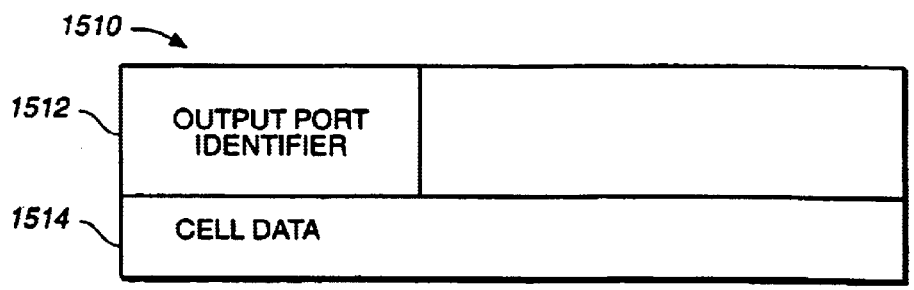
FIG._15B

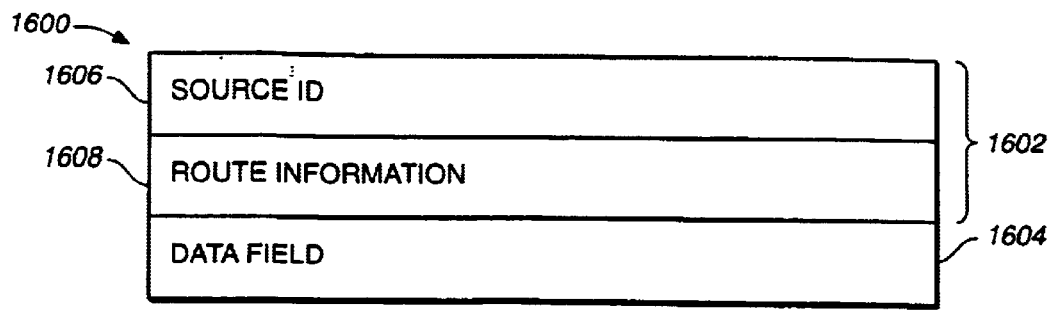
FIG._16
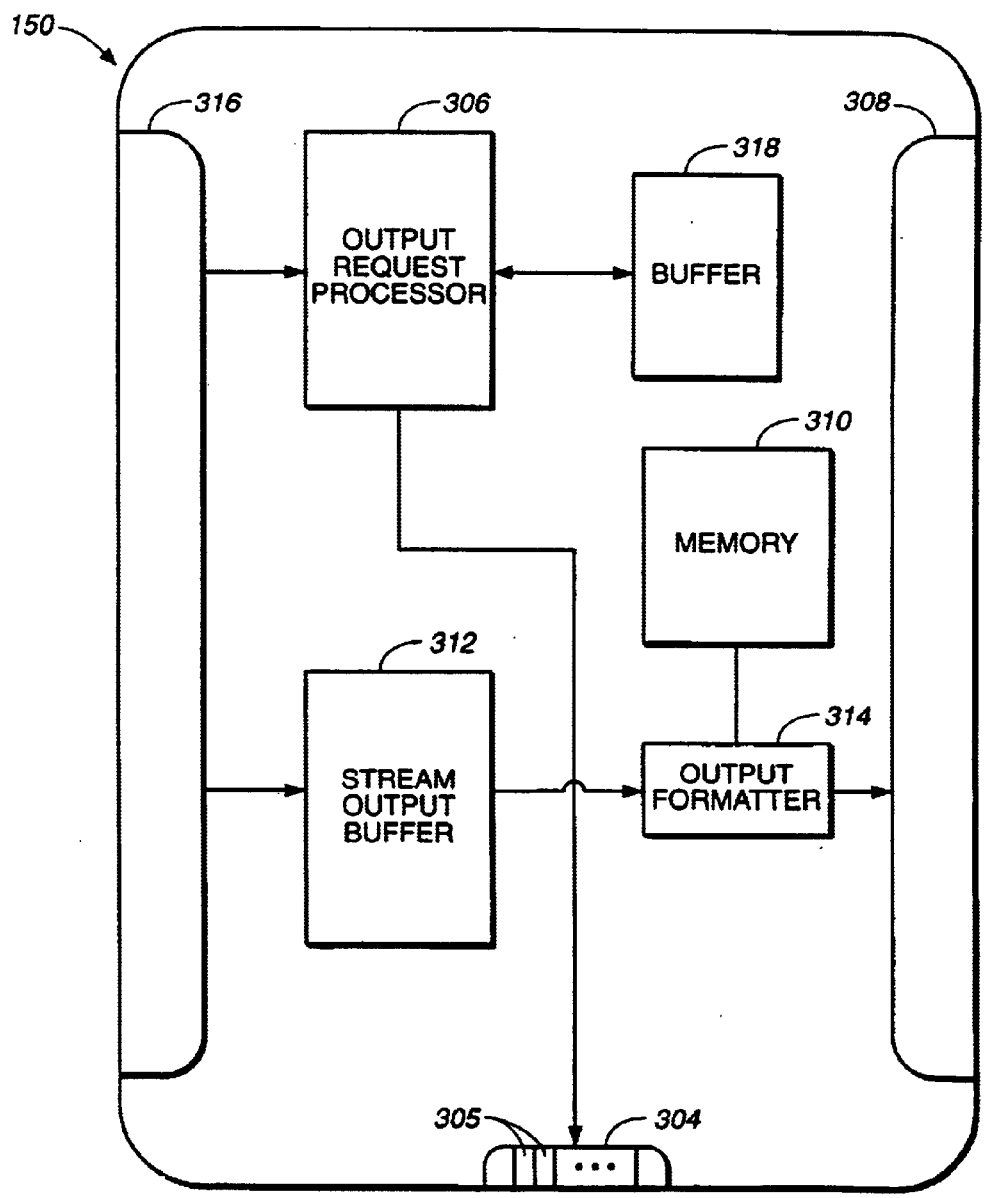
FIG._17A

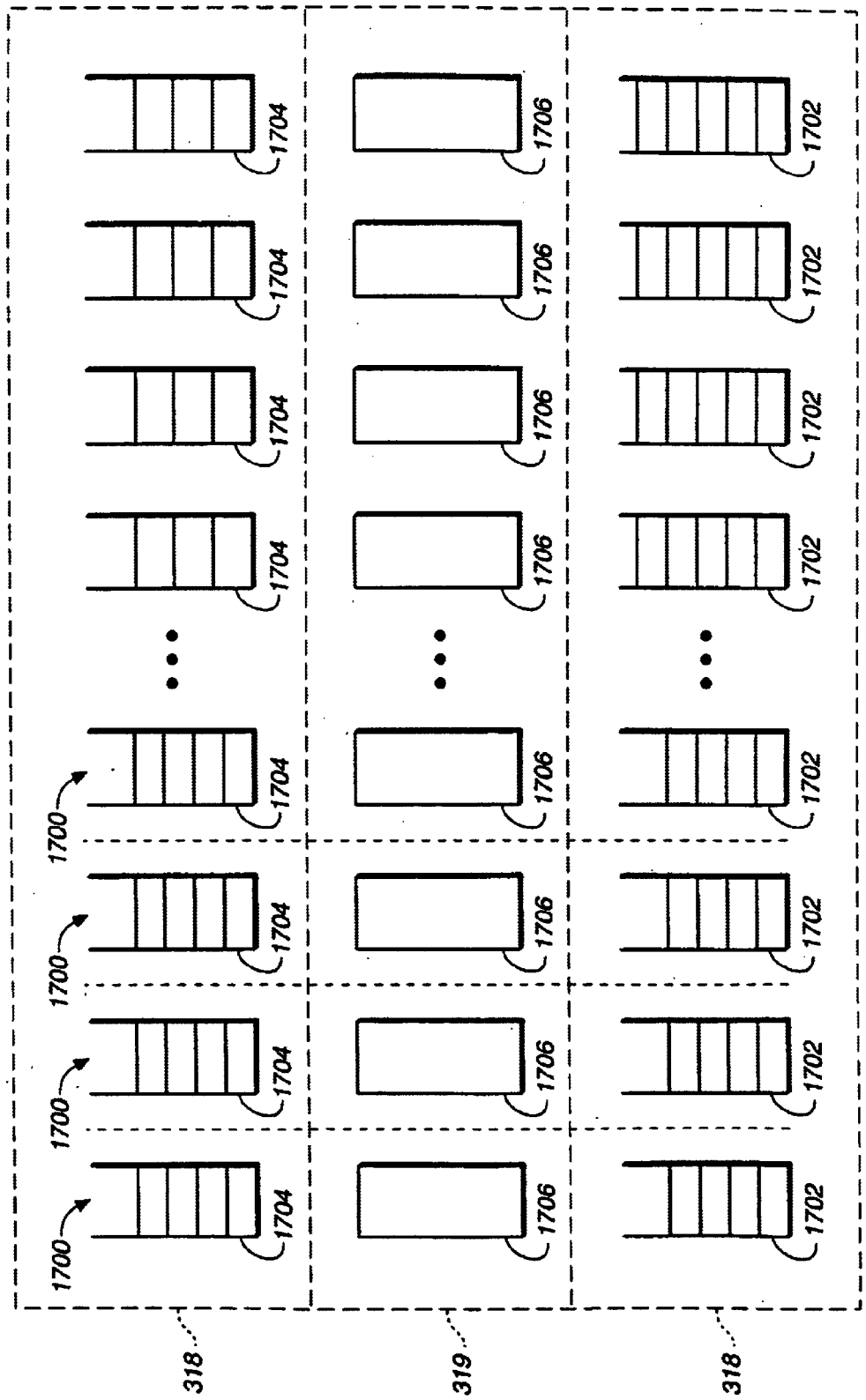

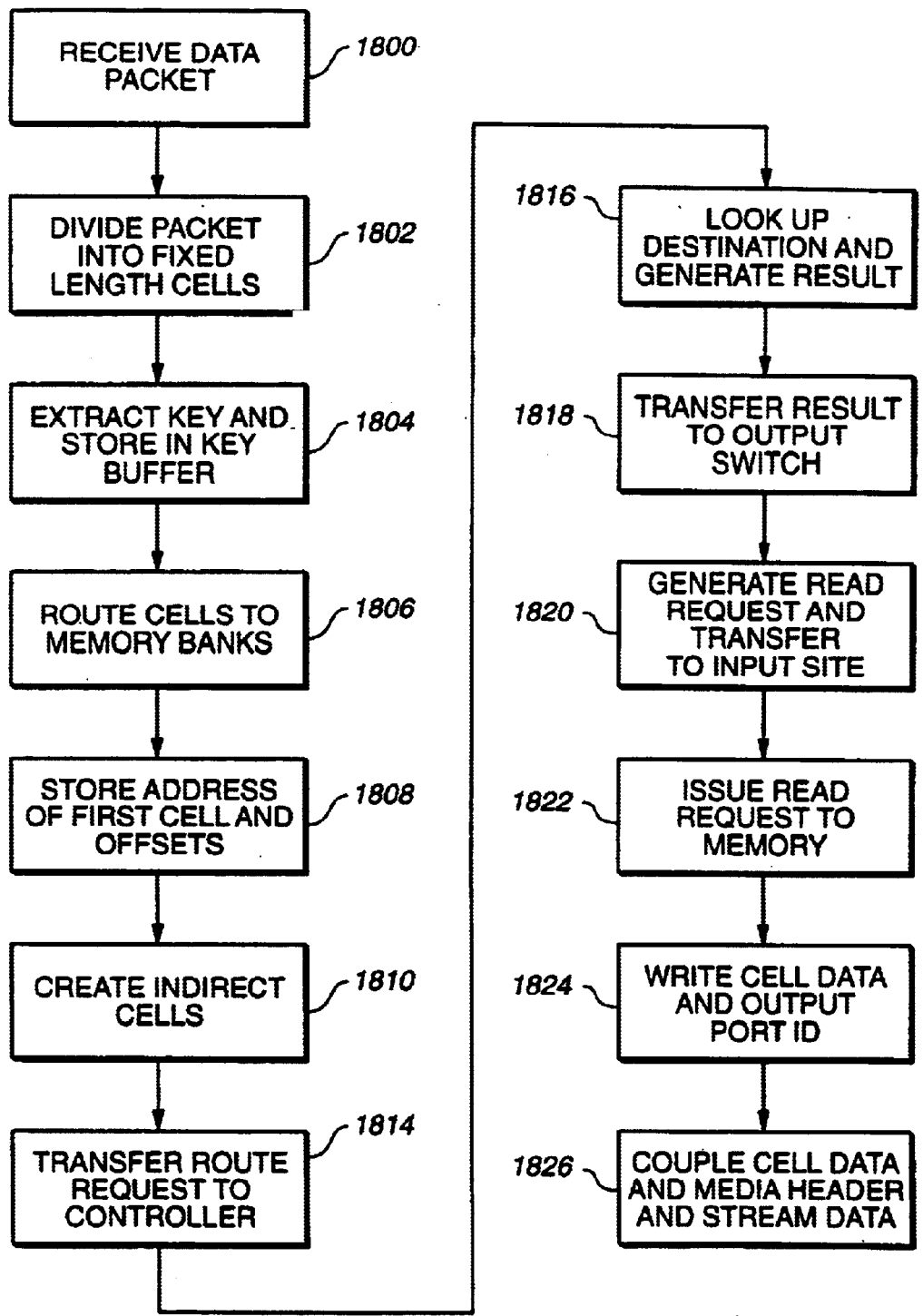
FIG._18

SEPARATION OF DATA AND CONTROL IN A SWITCHING DEVICE

This is a continuation-in-part of U.S. application Ser. No. 08/901,061, entitled "MEMORY ORGANIZATION IN A SWITCHING DEVICE", filed Jul. 24, 1997 now U.S. Pat. No. 6,493,347, which is a continuation-in-part of U.S. application Ser. No. 08/844,171, entitled "HIGH SPEED SWITCHING DEVICE", filed Apr. 18, 1997, now issued as U.S. Pat. No. 5,905,725, which is a continuation-in-part of U.S. application Ser. No. 08/767,576, entitled "HIGH SPEED VARIABLE LENGTH BEST MATCH LOOK-UP IN A SWITCHING DEVICE", filed on Dec. 16, 1996, now issued as U.S. Pat. No. 5,909,440.

BACKGROUND

The present invention relates generally to data routing systems, and more particularly to methods and apparatus for efficiently routing packets through a network.

In packet switched communication systems, a router is a switching device which receives packets containing data or control information on one port, and based on destination information contained within the packet, routes the packet out another port to the destination (or an intermediary destination).

Conventional routers perform this switching function by evaluating header information contained within a first data block in the packet in order to determine the proper output port for a particular packet.

Efficient switching of packets through the router is of paramount concern.

Referring now to FIG. 1A, a conventional router includes a plurality of input ports 2 each including an input buffer (memory) 4, a switching device 6 and a plurality of output ports 8.

Data packets received at an input port 2 are stored, at least temporarily, in input buffer 4 while destination information associated with each packet is decoded to determine the appropriate switching through the switching device 6. The size of input buffer 4 is based in part on the speed with which the destination information may be decoded. If the decoding process takes too long as compared to the rate at which packets are received, large sized memory elements may be required or packets may be dropped.

In addition, the size of input buffer may be influenced by a condition referred to as "blocking". Packets may be forced to remain in the input buffer after the destination information is decoded if the switching device cannot make the connection. Blocking refers to a condition in which a connection cannot be made in the switch due to the unavailability of the desired output port (the port is busy, e.g., routing another packet from a different input port). In summary, the size of input buffer 4 is dependent on a number of factors including the line input rate, the speed of the look-up process, and the blocking characteristics for the switching device. Unfortunately, conventional routers are inefficient in a number of respects. Each input port includes a dedicated input buffer and memory sharing between input ports is not provided for in the design. Each input buffer must be sized to meet the maximum throughput requirements for a given port. However, design trade-offs (cost) often necessitate smaller buffers for each port. With the smaller buffers, the possibility arises for packets to be dropped due to blocking conditions. While excess memory capacity typically exists in the router (due to the varied usage of the input ports), no means for taking advantage of the excess is afforded.

To minimize the occurrence of dropping packets, designers developed non head-of-line blocking routers. Referring now to FIG. 1B, a conventional non head-of-line blocking router includes a plurality of input ports 2 each including an input buffer (memory) 4, a switching device 6 and a plurality of output ports 8 each having an output buffer 9. In order to provide non head-of-line blocking, each output port 8 is configured to include an output buffer 9. Each output port could simultaneously be outputting packets as well as receiving new packets for output at a later time. As the size of the output buffer is increased, fewer packets are dropped due to head-of line blocking at input ports.

However, these designs are even more inefficient in terms of memory capacity and cost. Again, each output port includes a dedicated output buffer and memory sharing between output ports is not provided for in the design. Each output buffer must be sized to meet the maximum throughput requirements for a given port (in order to maintain its non head-of-line blocking characteristics). Even more excess memory capacity typically exists in the router (due to the varied usage of the input ports and output ports), yet no means for taking advantage of the excess is afforded. Twice the amount and bandwidth of memory has to be used than required to support the amount of data being moved through these types of devices.

What is desirable is to produce a router where the data packets can flow to a common memory, while routing decisions are made off-line. By separating the data path, the path along which the packet data traverses through the router, and the control path, a path used in evaluating the packet headers, memory can be conserved.

SUMMARY OF THE INVENTION

In general, in one aspect, the invention provides a method of looking up a key associated with a packet to determine a route through a routing device. The method includes, upon receipt of the key, forward traversing one or more nodes which make up a trie stored in a memory by evaluating at each node traversed one or more bits in the key as indicated by a bits-to-test indicator associated with each node where a value of the bits in the key determines a path traversed along the trie. An end node in the trie is located where the end node has a route. The route is compared to the key. If they match, destination information associated with the end node is outputted to guide the transfer of the packet through the routing device. If they do not match, the trie is traversed backwards to locate a best match for the key.

Aspects of the invention can include one or more of the following features. The step of forward traversing can include storing on a stack, for each node having one or more attached routes, the bits-to-test indicator and pointers to the attached routes. The step of traversing the trie backwards can include comparing the key with the route to determine a first dissimilar bit location, popping entries off the stack to determine when the bits-to-test indicator associated with a first node in the backward traversal is less than or equal to the first dissimilar bit location and outputting destination information associated with the first node to guide the transfer of the packet through the routing device.

The first node can include a route. The method can further include calculating statistical information for each packet and storing in memory the statistical information with the route associated with each of the end node and the first node. The method can further include transferring the statistical information along with the destination information to an output port in the routing device for transfer to a destination.

Prior to a forward traversal of the trie, a root table can be searched for a match of a predetermined number of bits in the key. The root table can be indexed by the predetermined number of bits where each entry includes a pointer to a start node in the trie to begin the forward traversal.

The forward traversal of the trie can include loading node information for each node traversed in the trie until the end node is reached. The node information can include a bits-to-test indicator, a plurality of child pointers and one or more attached routes. The nodes in the tree can include $2^n$ child pointers, where N is an integer greater than 1. Each pointer can include a bits-to-test indicator and an address in the memory where the child node is stored where the bits-to-test indicator indicates one or more bits to be tested in the key associated with a child node to which the child pointers indicate. The forward traversal can include testing one or more bits indicated by the bits-to-test indicator and retrieving an appropriate child pointer associated with the child node that indicates a next node in the trie to be traversed after the child node. Accesses to the memory can be minimized in the forward traversal of the trie by loading a single pointer at each node until the end node is reached.

In one aspect the invention provides a method of routing a packet through a switch including upon receipt of the packet, extracting a key from the packet. A trie is forward traversed by evaluating at each node one or more bits in the key as indicated by a bits-to-test indicator associated with each node where values of the bits in the key located at a position indicated by the bits-to-test indicator determine a path traversed along the trie at each node. An end node in the tree is located having a route. The route is compared to the key. If they match, destination information associated with the end node is retrieved. If they do not match, the trie is traversed backwards to locate a best match for the key having a route and destination information associated therewith. Thereafter the packet is routed through the switch according to the destination information.

In one aspect the invention provides a method of inserting a route in a route table where the route table is stored as a trie in a memory of a routing device. The route table defines a path by which a packet is transferred through the routing device. The method includes traversing the trie to determine an insertion point and determining if the insertion point has an associated parent node and sibling node in the trie. If so, a multi-node is created from the parent, sibling and the route including setting one or more child pointers in the multi-node to indicate a node directly beneath the insertion point. Thereafter, the multi-node is stored in the memory and the child pointer in a node directly above the parent node is updated to indicate a starting address in the memory for the multi-node.

In one aspect the invention provides a router for routing packets in a packet switched network including one or more input ports for receiving packets, a packet memory and an input switch coupled to each input port and the memory. The input switch includes a transfer engine for transferring packets from an input port to the packet memory and a key extraction engine for extracting a key from each packet. The router includes a controller coupled to the input switch. The controller includes a key look-up engine and a route memory. The route memory stores a route table where the route table includes a trie. The key look-up engine traverses the trie to determine a best match to the key, and upon determining the best match for the key, generates notification information. The key look-up engine includes a forward traversal engine for forward traversing the trie and is operable to evaluate at each node traversed one or more bits in the key as indicated by a bits-to-test indicator associated with each node, locate an end node having a route, compare the route to the key, if they match, outputting destination information associated with the end node to guide transfer of a packet through the routing device, and if they do not match, traversing the trie backwards to locate a best match for the key. The router includes one or more output ports and an output switch coupled to the controller, the packet memory and the output port for transferring packets from packet memory to an appropriate output port based on the notification information received from the controller.

Aspects of the invention can include one or more of the following features. The apparatus can include a stack. The forward traversal engine can store on the stack a bits-to-test indicator for the node and pointers to attached routes for each node having attached routes. The key look-up engine can include a backward traversal engine operable to compare the key with the route to determine a first dissimilar bit location, pop entries off the stack to determine when a bits-to-test indicator associated with a first node in the backward traversal is less than or equal to the first dissimilar bit location, and output destination information associated with the first node to guide a transfer of a packet through the router. The apparatus can include a statistical engine for calculating statistical information for each data packet and outputting the statistical information with destination information for transfer to a destination port.

The route memory can be divided into a plurality of banks. Parent and children nodes in the tree can be stored in different banks. Each node in the tree can include a bits-to-test indicator, $2^n$ child pointers, and n or fewer attached routes, where a pair of the $2^n$ child pointers indicate a child node to be traversed in the forward traversal when a value of a bit in the key as indicated by the bits-to-test indicator is a first value and second value, respectively. The child pointers and attached routes can be stored in contiguous locations in the route memory. The trie can be a modified radix trie. The nodes in the modified radix trie can include $2^n$ child pointers, each pointer including a bits-to-test indicator and an address in the memory where the child node is stored. The bits-to-test indicator indicates one or more bits to be tested in the key associated with a child node to which the child pointers indicate. The forward traversal engine is operable to test one or more bits indicated by the bits-to-test indicator and retrieve an appropriate child pointer associated with the child node that indicates a next node in the trie to be traversed after the child node.

In one aspect, the invention provides a route look-up engine for locating a best match for a key in a route table. The route table includes a trie stored in a memory associated with a routing device. The trie includes one or more entries defining a path through a routing device for transferring a packet in a packet switched network from a source to a destination. The route look-up engine includes a stack for storing stack entries including a bits-to-test indicator and a pointer to the destination and a plurality of look-up engines each including a buffer, a bit comparison engine and a key comparison engine. The buffer stores node information that is retrieved from the memory. The node information includes a bits-to-test indicator. Responsive to receiving the key associated with a packet, the look-up engine forward traverses the trie. The bit comparison engine evaluates at each node traversed one or more bits in the key as indicated by a bits-to-test indicator associated with each node. A value of the bits in the key determines the path traversed along the trie. The look-up engine stores stack entries on the stack for each node traversed having an attached route. The look-up engine locates an end node having a route. The key comparison engine performs a singular key comparison for each packet routed through the routing device by comparing the key with the route. If they match, the look-up engine outputs destination information associated with the end node to guide the transfer of the packet through the routing device. If they do not match, the look-up engine traverses the trie backwards, popping entries off the stack, to locate a best match for the key and destination information associated therewith.

In one aspect the invention provides a router for switching a data packet between a source and destination in a network. The router includes an input port including a data handler. The input port receives the data packet from the source. The data handler divides the data packet into one or more fixed length cells. The router includes an output port for routing the data packet to the destination, a memory divided into a plurality of memory banks and an input switch for receiving the fixed length cells from the input port and routing consecutive cells of the data packet to different memory banks. A single cell is transferred in a cell slot time span to a memory bank. The input switch includes a key reading engine for extracting key information from a first cell received at the input switch associated with the data packet. The router includes a controller coupled to the input switch and receiving the key information therefrom. The controller decodes destination information from the key information received from the input switch and outputs a notification defining a routing of the data packet from the memory to the output port. The controller includes a plurality of look-up engines and a memory for storing routes. Each look-up engine is operable to compare the key information with routes stored in the memory and determine a best route through the router for a given data packet. An output switch is included for routing cells received from the memory to the output port.

Aspects of the invention can include one or more of the following features. The input switch can include a linking engine for linking cells in the data packet to allow retrieval of the data packet from non-contiguous locations in the memory. The router can include an indirect cell generator for generating one or more indirect cells. The linking engine can track the location in the memory where consecutive cells of the data packet are stored and provide an address in memory of each cell in the data packet for storage in indirect cells. The input switch time division multiplexes the writing of data packets to the memory such that consecutive cells from the input port are written to consecutive banks in the memory. The output port can include a result processor for receiving the notification from the controller and initiating a transfer of the data packet from the memory to the output port.

The input switch can include a reservation table for scheduling transfers from the memory to the output switch. The output switch can route the notification to the output port and thereafter the output port can issue a request to the input switch to transfer the data packet from memory to the output port through the output switch. The request from the output port can be stored in the reservation table. Requests to transfer cells from memory to the output switch can be time domain multiplexed so that during one cell slot time span at most a single read request is issued to each bank in the memory for servicing. The memory can be configured to output at most a single cell per bank in one cell slot time span.

In one aspect the invention provides a method implemented in a router for switching a data packet between a source and destination in a network. The data packet includes a header portion and a data portion. The header portion includes routing information for the data packet. The method includes defining a data path in the router comprising a path through the router along which the data portion of the data packet travels and defining a control path comprising a path through the router along which routing information from the header portion travels. The method includes separating the data path and control path in the router such that the routing information can be separated from the data portion allowing for the separate processing of each in the router. The data portion can be stored in a global memory while routing decisions are made on the routing information in the control path.

Other advantages and features will be apparent from the following description and claims.

BRIEF DESCRIPTION OF THE DRAWINGS

FIGS. 1A and 1B are block diagrams of conventional router devices.

FIG. 2A is a schematic block diagram of a data routing system according to one embodiment of the present invention.

FIG. 2B is a schematic block diagram of a router according to one embodiment of the present invention.

FIG. 3A is a schematic block diagram of an multi-function port according to one embodiment of the present invention.

FIG. 3B is a schematic block diagram indicating data transfers between components of the router of FIG. 2B according to one embodiment of the present invention.

FIG. 3C is a data structure for a cell transferred between a multi-function port and an input switch according to one embodiment of the present invention.

FIG. 4 is a schematic block diagram of a router including the timing and ordering of transfers from the input port to input switch according to one embodiment of the present invention.

FIG. 5A is a schematic block diagram of an input switch according to one embodiment of the present invention.

FIG. 5B is a schematic block diagram of a router including the timing and ordering of transfers from the input port to memory according to one embodiment of the present invention.

FIG. 6 is a data structure for a route request stored in a key buffer according to one embodiment of the present invention.

FIG. 7 is a data structure for an indirect cell according to one embodiment of the present invention.

FIG. 8 is a data structure for a cell transferred between the input switch and a memory bank according to one embodiment of the present invention.

FIG. 9 is a schematic block diagram of a reservation table according to one embodiment of the present invention.

FIG. 10 is a flow diagram of a process of loading a reservation table according to one embodiment of the present invention.

FIG. 11A is a schematic block diagram of main memory according to one embodiment of the present invention.

FIG. 11B is a schematic block diagram of a global data buffer according to one embodiment of the present invention.

FIG. 11C is a schematic block diagram of a router including 3 memory banks according to one embodiment of the present invention.

FIG. 12 is a schematic block diagram of a router including the timing and ordering of transfers from the input port to memory according to one embodiment of the present invention.

FIGS. 13H–13N collectively are a flow chart for a populating a trie according to one embodiment of the present invention.

FIG. 14 is a data structure for an output request transferred from the controller to the output switch according to one embodiment of the present invention.

FIG. 15A is a schematic block diagram of an output switch according to one embodiment of the present invention.

FIG. 15B is data structure for a cell output from a memory bank to output switch according to one embodiment of the present invention.

FIG. 16 is a data structure for a cell transferred from the output switch to an output port in a multi-function multiport according to one embodiment of the present invention.

FIG. 17A is a schematic block diagram for an output section of a multi-function port according to one embodiment of the present invention.

FIG. 17B is a schematic block diagram for a queue system for storing notifications according to one embodiment of the present invention.

FIG. 18 is a flow diagram for a process of routing a packet through a router according to one embodiment of the present invention.

DETAILED DESCRIPTION

Figure 13A:
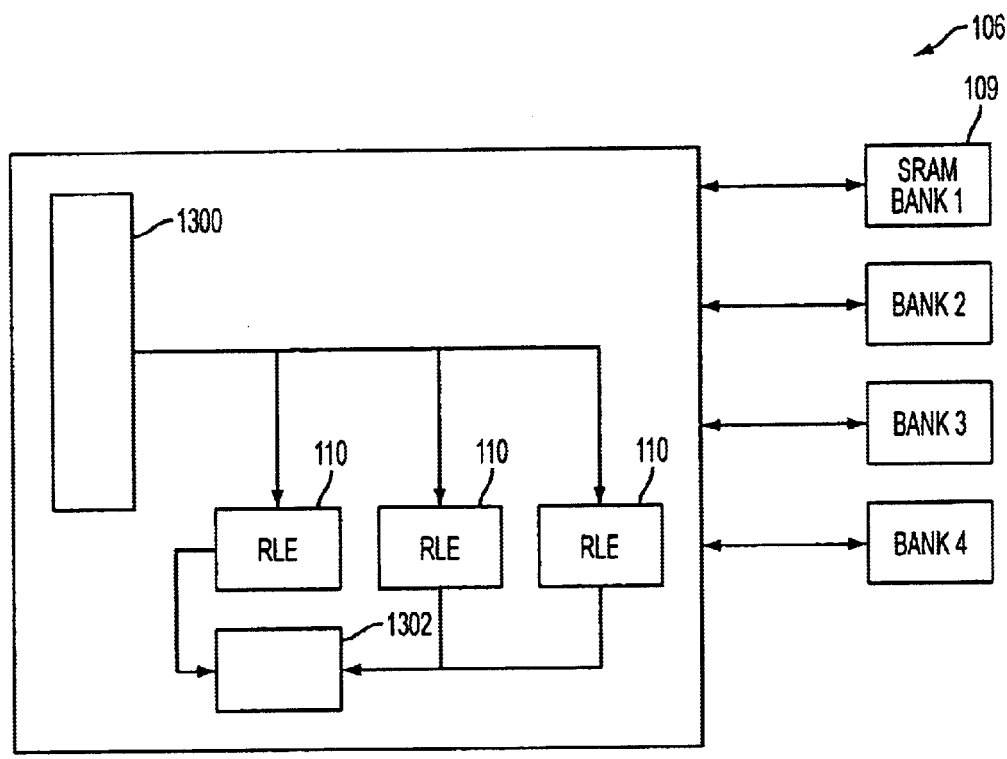
FIG. 13A is a schematic block diagram of a controller according to one embodiment of the present invention.

Referring to FIG. 2A, in a packet switching system, a source 10 is connected to one or more routers 20 for transmitting packets to one or more destinations 30. Each router includes a plurality of multi-function multiports that are connected to various sources and destinations. A packet from source 10 may pass through more than one router 20 prior to arriving at its destination.

Referring to FIG. 2B, each router 20 includes an input switch 100, an output switch 102, a global data buffer 104 including one or more memory banks 105, a controller 106 and a plurality of multi-function multiports 150 (150-0 through 150-3), respectively. Associated with the controller 106 is controller memory 109 for storing a routing table. Input switch 100 and output switch 102 are connected to each multi-function multiport 150 in router 20. In one embodiment, router 20 includes plug-and-play multi-function multiports which allows for easy expansion capability. The present invention will be described with reference to a system including eight multi-function multiports 150 (even though FIG. 2B only shows four), with each multi-function multiport including up to sixteen input ports and sixteen output ports. Other configurations may be used depending on user load conditions. Each multi-function multiport includes one or more input ports, one or more output ports and a memory. The configuration and operation of the multi-function multiports will be described in greater detail below.

In operation, packets are received at a multi-function multiport 150, transferred to input switch 100 and stored temporarily in global data buffer 104. When the packet is received by switch 100, a key is read from the first data block in the packet and transferred to controller 106. The key contains destination information which is derived from the header field associated with the first block of data in a packet and other information (such as source ID, priority data and flow ID).

A route look-up engine 110 in controller 106 performs a trie based search based on the key information and returns a result which includes the output multiport associated with the destination. The result is coupled with other information (such as source ID, flow ID and packet length) for routing the packet through router 20 and provided as a notification from controller 106 to output switch 102. Output switch 102 transfers the notification to the identified multi-function multiport 150. Upon receiving the notification information, the multi-function multiport 150 initiates the transfer of the packet from global data buffer 104 through output switch 102 to the appropriate multi-function multiport 150.

Multi-function Multiports

Referring to FIG. 3A, each multi-function multiport 150 includes an input section 270, an output section 280 and a memory section 290.

Input section 270 includes a line input interface 300, a data handler 302 and an input switch interface 304. Output section 280 includes an output request processor 306, a line output interface 308, a storage device 310, stream output buffers 312 (one for each output stream), output formatter 314, an output switch interface 316 and head and tail queue buffer 318. In addition, the output section includes a portion of input switch interface 304. Specifically, input switch interface 304 includes read request queues 305, one for each memory bank. The use and operation of the read request queues, stream output buffers, and head and tail queue will be discussed in greater detail below in association with FIGS. 17A and 17B.

Memory section 290 includes a memory bank 105 (which represents a portion of the global data buffer 104) and a notification queue body 319. The use an operation of the memory section will be discussed in greater detail below in association with FIG. 17B.

The multi-function multiport is used in conjunction with the input switch, output switch and controller as is shown in FIG. 3B. The various piece components of the input section, output section and memory section will be described in greater detail below. The combination of the devices into a single unit simplifies the interfaces between the components.

Referring again to FIG. 3A, packets are received at line input interface 300. As the packets are received, data handler 302 divides the packets received into fixed lengths cells. In one embodiment, the length of each cell is 80 bytes, with 16 bytes of internal header (control information) and 64 bytes of cell data. As the data handler divides the incoming packets into fixed length cells, it synchronously outputs the cells to input switch 100 through input switch interface 304.

The format for transfers between the multi-function multiport and the input switch is shown in FIG. 3C. A cell 350 transferred from a multi-function multiport 150 to the input switch contains a cell header 352 and cell data 354. Cell header 352 includes a type field 356, stream field 358, and packet header fields 360. In addition, cell header 352 includes an independent read request in the form of a multi-function multiport identifier 366 and address 368.

The type field 356 indicates the type of cell to be transferred from the multi-function multiport. At each cell slot (20 clock cycles in one embodiment), a multi-function multiport may transfer either a data cell, an indirect cell placeholder, or a delayed indirect cell placeholder. Data cells contain data associated with an incoming packet. An indirect cell placeholder is an empty cell, and is used in conjunction with indirect addressing for the storage of the cells in the global data buffer 104. Delayed indirect cell placeholders arise when a data stream that requires indirect addressing terminates at a time prior to the designated time for writing the last indirect addressing cell associated with the data stream to global data buffer 104. The generation and operation of indirect placeholders and delayed indirect placeholders will be discussed in greater detail below in conjunction with FIG. 7.

Stream field 358 indicates the stream to which the cell data belongs. In one embodiment of the present invention, each multi-function multiport is capable of handling up to sixteen separate streams of data at a time, one on each of its respective 16 input ports.

Packet header field 360 contains header information associated with a given packet and includes start offset information, packet length and interface index information.

Multi-function multiport identifier 366 identifies the multi-function multiport which is sourcing the read request. Address 368 indicates the address in global data buffer 104 to be read.

Referring now to FIG. 4, a single cell 450 is transferred from a multi-function multiport 150 to input switch 100 at each cell (time) slot "T". For a given cell slot "T", input switch 100 receives a total of "N" cells, where "N" is equal to the number of multi-function multiports.

In one embodiment, cells from a given stream may be written to memory in an order that is different from the arrival order. These out of order writes are performed to make efficient use of scarce bandwidth between the multi-function multiports and the input switch. When a packet comes in to the multi-function multiport, it is broken up into cells as the bytes arrive and the cells are placed in per-bank output queues on the way to the input switch. These queues are designed to share scarce interconnect bandwidth between the streams of a multi-functional multiport in the most efficient way possible, but they have the detrimental effect of reordering cells at the interface between the multi-function multiport and the input switch. Thus the cells from a given stream may arrive at the input switch out of order. The multi-function multiport marks the data cells of a stream with one of four codes: first cell (FC); intermediate data cell (DC); last cell (LC); or first cell which happens to be also a last cell (FLC).

Input Switch

Referring to FIGS. 2B and 5A, input switch 100 includes a round robin data handler 500, one or more input interfaces (501-0 through 501-7, one for each multi-function multiport 150), one or more memory interfaces 502 (502-0 through 502-7, one associated with each memory bank), a like plurality of pointers 504 (504-0 through 504-7), an output processor 505, one or more output interfaces 506 (506-0 through 506-7, one for each multi-function multiport 150), a reservation table 508, an indirect cell processor 510, controller interface 512 and read controller 517.

a) Transfers Through the Input Switch

Round robin data handler 500 receives cells from each multi-function multiport and transfers them to output processor 505 for output to an appropriate memory bank 105 in global data buffer 104. Round robin data handler 500 services the inputs (cells) received on input interfaces 501 in a round robin, time division multiplexed manner. That is, for a given cell slot, one cell from each multi-function multiport is received at the round robin data handler 500 and subsequently transferred to output processor 505 for transfer at the next cell slot to a memory bank 105 in global data buffer 104. At the next time cell slot, data handler 500 transfers the next cell received from the same multi-function multiport to output processor 505 for transfer to a different memory bank. In one embodiment, the next cell received is transferred to the next memory bank (next in numerical order, modulo N) in the memory array. Alternatively, another time dependent permutation may be used to control the transfer of successive cells from the same multi-function multiport.

Referring to FIG. 5B, the timing and ordering of transfers from the multi-function multiport to memory is shown. For the purposes of this example, a sequence of cells is depicted on each transmission line. For the purposes of this example only, each transmission line is considered to be very long and contains data associated with two or more cells. In operation, the transmission lines are short and multiple cells are not present on a transmission line at a given time. At cell slot T4 a series of cells 450-0 through 450-7 are transferred down transmission lines 458, one from each multi-function multiport 150 to input switch 100. At cell slot T3 (one just prior in time to cell slot T4) a series of cells 452-0 through 452-7 are transferred down transmission lines 458, one from each multi-function multiport 150 to input switch 100.

Round robin data handler 500 and output processor 505 within the input switch 100 transfer cells out to global data buffer 104 on transmission lines 460. As can be seen at cell slot T2, output processor 505 outputs one cell 454-$B_0$ to 454-$B_7$ to each memory bank in a single cell slot. The "$B_x$" designator indicates the multi-function multiport from which the particular cell was received. One cell from each multi-function multiport is written to global data buffer 104 per cell slot. At time period T1 (one cell slot prior to cell slot T2), again one cell (456-$B_0$ to 456-$B_7$) is written to each memory bank. Round robin data handler 500 time division multiplexes the transfers to output processor 505 such that consecutive cells from the same multi-function multiport are written to consecutive memory banks 105 (modulo N) in global data buffer 104.

Referring again to FIG. 5A, pointer 504 indicates the location in an associated memory bank to which the next cell will be written. Output processor 505 writes a cell to a memory location in a particular memory bank based on the next available address in the bank as is indicated by the associated pointer 504.

b) Key Reading and the Linking Process

Round robin data handler 500 includes a key reading engine 514 for determining the key information associated with a first cell in a packet and a linking engine 515 for linking cells in the same packet.

The process of reading key information is known in the art. After the key is determined for a given packet, it is stored temporarily in key buffer 516 in input switch 100 until the entire packet has been stored in global data buffer 104. The data structure for entries 600 in the key buffer 516 is shown in FIG. 6. Each entry or "info cell" 600 includes a key 602, full address 604, offsets 606 and an indirect cell indicator 608.

Referring now to FIGS. 5A, 6 and 7, linking engine 515 determines the starting address (full address) in memory for where the first cell in a given packet is to be stored in memory. The starting address includes the bank number in global data buffer 104 (the bank number which is assigned to store the cell by round robin data handler 500) and the first available address location in the designated bank (as is indicated by the associated pointer 504). The starting address (full address 604) is stored in key buffer 516 along with the associated key 602 for the packet. When the next cell associated with the same packet arrives at switch 100, an offset 606 associated with the offset at which the cell is to be written (relative to the full address) is computed and stored in key buffer 516. In one embodiment of the present invention, up to four offsets 606 are stored. Each offset address is computed based on the relative offset in memory between the location of the last cell in memory and the value of the pointer 504 associated with the current memory bank which is to be written.

If more than five data cells are included in a packet, then the indirect cell indicator for that packet is set, and the last offset indicates the address in memory where the first indirect cell associated with the packet is stored. Indirect cells will be described in greater detail below in reference to FIG. 7. After the packet has been stored in memory, the associated info cell in key buffer 516 (a route look-up request) is forwarded through the controller interface 512 to the controller 106 for processing. Alternatively, the info cell may be transferred after the first five cells have been stored in memory.

As described above, the data cells are stored in the global buffer upon receipt. The data path for the data packets flows directly from the input port on which a packet is received (the multi-function multiport 150) to the global data buffer 104. The data packets remain in the global data buffer 104 while a routing decision is made in a separate control path using controller 106. The separation of the data path and control path allows for the sharing of the memory resources among all of the input ports.

The linking or threading of cells for a packet is performed by using the offsets described above and indirect cells. Offsets are used to link cells in a packet. Offsets may be stored along with key information and routed through controller 106 (FIG. 2B) or may be stored in indirect cells. In one embodiment, if a cell contains 5 cells or less, no indirect cells are required to be used. Indirect cell processor 510 performs the linking of cells in memory for a given packet. Indirect cell processor 510 generates indirect cells for storage in global data buffer 104. Indirect cells contain offset information associated with the relative offset in memory space between contiguous cells in the packet. Indirect cell processor includes indirect cell memory 520 for storing indirect cell data during the formation of indirect cells.

Referring now to FIG. 7, the data structure for an indirect cell 700 includes a linking field 702, a plurality of offset fields 704, and a last field 706. Linking field 702, when not set, indicates the current indirect cell is the last cell in the chain of indirect cells for a given packet. If set, then more indirect cells exist for the given packet. If more indirect cells exist, then last field 706 indicates the offset to the location in memory of the next indirect cell associated with the packet. In one embodiment, indirect cells contains up to 56 offset data blocks for linking 56 cells in memory.

As was described above, when a packet is received, the linking engine processes the first five cells and stores linking information in the form of a start address and four offsets in key buffer 516. In the event more than five cells are contained within a packet, the indirect cell processor takes over for the linking engine and computes the offsets associated with the locations in memory where the remaining cells in the packet are stored. Round robin processor 500 passes cells to the output processor 505 for transfer to an associated memory bank in global data buffer 104. Round robin processor 500 enables the indirect cell processor when the packet being processed contains more than 5 cells (based on header information included within the first cell). At the time for writing the fifth cell to memory, indirect cell processor 510 stores in indirect cell memory 520 the address (the "indirect cell address") associated with the location in memory at which the fifth cell would have been written if it had been the last cell in the packet. The indirect cell address indicates the location in memory where the indirect cell is to be written when full (or when the last cell of the packet is processed).

When an indirect cell is full (having stored offsets in all available locations except the last field 706), then the indirect cell processor stores the offset associated with the location in memory where the next indirect cell is located in the last field 706. Thereafter, the full indirect cell is written to its appropriate place in memory. The writing of the indirect cell to memory coincides with the receipt of an indirect cell placeholder by the input switch 100 from the associated multi-function multiport 150. This process continues until the last cell in a packet is stored in memory. At that time, the last indirect cell is written to memory, and the associated entry 600 from the key buffer 516 is transferred to the controller 106 for processing. For a given packet, all indirect cells are written to the same memory bank in the global memory buffer.

As often will be the case, the last cell of a packet will not coincide with the timing required to write the completed indirect cell immediately into memory. This is because packet length is completely arbitrary. The end of a packet will likely not coincide with the last available entry of an indirect cell. When a packet has completed (all cells have been received by the input switch) and a last entry in the indirect cell is written, the indirect cell is free to be written to memory. However, the writing will be delayed until the proper time, hence the term delayed indirect cell. A delayed indirect cell is a indirect cell that is the last indirect cell associated with a packet. It is delayed, because it is written to memory after the rest of the packet has been written to memory. The timing of the write to memory is dictated by the address which is reserved for the indirect cell. As was described above, at the time for the creation of an indirect cell, its position in memory is reserved. The delayed indirect cell will be written to memory at the next time slot available for the particular multi-function multiport to write to the particular memory bank after the packet has been completed. The timing of the write to memory of delayed indirect cells coincides with the receipt of a delayed indirect placeholder from the appropriate multi-function multiport 150.

c) Transfers to Memory

The data structure of a cell transferred from input switch 100 (via the output processor 505) to a memory bank 105 in global data buffer 104 is shown in FIG. 8. The unit of addressing and memory allocation is a 64-byte cell, and all accesses to memory are either cell reads or cell writes. A cell size of 64 bytes was chosen as a compromise between the conflicting requirements of bandwidth efficiency and storage efficiency. DRAM bandwidth efficiency dictates larger sizes, while storage loss caused by internal fragmentation when fitting variable size packets into fixed size cells dictates smaller sizes.

At each cell slot, output processor 505 generates a cell 800 which includes a read request source field 802, read address 804, write address 806 and data field (cell data received from multiport 150) 808. The read request source field 802 indicates the output port (in the particular multi-function multiport 150) requesting the read (destination output port). Output processor 505 receives read requests from read controller 517 and bundles the read request with any write request received from round robin data handler 500 destined for the same memory bank. At each cell slot, output processor 505 provides a cell 800 which may include a write and read request to each memory bank 105 in global data buffer 104.

Read controller 517 controls the transfer of read request signals flowing from input switch 100 out memory interface 502 to the individual memory banks in global data buffer 104. Read controller 517 receives read requests from each multi-function multiport through output interfaces 506. The format of each request includes source identification (output port) and a full address in memory which is to be read. At each cell slot, each multi-function multiport port may generate a read request for processing by switch 100 to read a memory location in global data buffer 104, resulting in the reading of a cell (a read reply) from a memory bank 105 (on a subsequent cell slot) to output switch 102.

Read controller 517 loads a reservation table 508 as requests to transfer packets are received from the various multi-function multiports 150. The reservation table is loaded such that at every cell slot a single read request is generated for each bank of memory 105. Referring now to FIG. 9, reservation table 508 includes a plurality of columns 900, one for each memory bank 105 in global data buffer 104, a plurality of rows 902, placeholders 904 and loaded entries 906. Each row represents a set of read requests (one per memory bank) to be generated on a single cell slot. Each row includes a single entry for each multi-function multiport 150. At each cell slot, each multi-function multiport is capable of requesting a read from a single memory bank 105 in global data buffer 104. Associated with reservation table 508 is a read pointer 908. The pointer points to the next row in the reservation table to be read. Rows ahead of the read pointer correspond to requests that will be queued at a later cell slot time. In one embodiment, the pointer moves at least one row in each cell slot time.

Loaded entries 906 reflect read requests to be performed as a result of reservation requests received from individual multi-function multiports. Placeholders 904 represent available slots in which read requests for a particular memory bank are still available (e.g., read requests which have not as of yet been received for this memory bank from a particular multi-function multiport). At each cell slot, the read controller 517 performs three functions: loading entries in the reservation table at the first available location in the table (after the read pointer), outputting the last row as read requests to the output processor 505; and refreshing the table, moving out the last row, incrementing the rows and creating a new row at the top of the table. The number of rows in the reservation table must be as large as the product of the latency in processing read requests multiplied by the number of banks. In one embodiment, 48 rows are included in reservation table 508 reflecting a system including six cell slots of latency and eight memory banks.

At initialization, reservation table 508 contains placeholders 904 in all of the rows 902. Placeholders 904 are locations in the reservation table which have not been loaded. As read requests are processed by the read processor, certain ones of the placeholders 904 are converted to loaded entries 906 based on the read requests. Loaded entries 906 include a read request address.

Referring now to FIG. 10, the process of loading the reservation table includes receiving a read request (full address) from an multi-function multiport (1000). The read controller decodes the read request to determine the column (based on the memory bank to be read from) in the reservation table to search (1002). The read processor searches, starting at the location indicated by pointer 908 in the reservation table, for the first placeholder associated with the multi-function multiport that generated the read request (1004). The read processor transforms the placeholder 904 to a loaded entry 906 by writing the full address of the read request at the location (1006). The process repeats for each read request received by the read controller (1008).

Memory Architecture

Referring now to FIGS. 11A–C, main memory 1050 is used as temporary buffer storage for packets flowing into the system on input streams 1052 and out of the system on output streams 1054. Main memory is divided into two distinct parts: a global data buffer 104 that is used to store incoming packets while the lookup engine determines the outgoing stream for each packet; and packet notification queues 319 that are used to store packet pointers (notifications) after the outgoing stream has been determined. Notification queues 319 are associated with outgoing streams, whereas the global data buffer 104 forms a common pool shared amongst all the streams.

Global data buffer 104 includes a plurality of memory banks 105. Associated with each memory bank is an input switch interface (an input port) 304 and output switch interface (an output port) 316. At each cell slot, each memory bank receives at most one write and one read request via input switch interface 304. The write requests are associated with cells received from a multi-function multiport 150. Read requests reflect a request for cell data to be transferred from a memory bank 105 to output switch 102 for ultimate transfer to a requesting multi-function multiport 150.

The memory in the multi-function multiport configuration is physically distributed across a number of banks b, one bank for each active multi-function multiport in the system. FIG. 11C show a system including three banks, numbered 0, 1 and 4 respectively, representative of three active multi-function multiports. Each bank is divided into two contiguous, non-overlapping regions referred to as global data area (memory bank 105) and the notification area (notification queue 319). The global data area for a bank constitutes 1/b of the memory of the global data buffer 104. The notification area provides space for queuing notifications that will be sent out on the line output interface 308 for a given multi-function multiport. Typically, the global data area is four times larger than the notification area; this factor derives from the ratio between data size and notification size for the shortest packet.

In one implementation, each bank's memory bandwidth is sufficient for reading and writing packets from a full-duplex OC-48 interface as well as for queuing and dequeuing notifications for the worst-case example of single-cell packets. Thus, both the aggregate memory size and the aggregate memory bandwidth scale linearly with the number of active multi-function multiports b in the system.

In one embodiment, each memory bank is implemented as two sub-banks using two 72-bit wide SDRAM (static dynamic random access memory) DIMM's (dynamic in-line memory modules) cycling at 125 MHZ. The sub-banks are transparent to the input and output switch resulting in what appears to be one continuous bank from the perspective of the switches. However, the sub-bank architecture allows for better throughput. Each DIMM has a 72-bit wide ECC (error correction code) protected data path going to 9 SDRAM chips each of which is 8 bits wide. The two DIMM's have separate address busses and are addressed independently of one another. The DIMM's are interleaved on bit 0 of the 23-bit address. In one embodiment, the smallest memory bank configuration is 32 MBytes, using 16 Mbit chips and the largest is 512 MBytes, using 256 Mbit chips.

As was described above, a bank can receive at most one read request and one write request every cell slot. Since a cell slot is 20 clock cycles at 125 MHZ, this works out to a peak bandwidth demand of 400 MBytes/sec for reads and 400 MBytes/sec for writes. The worst case notification load occurs for single cell packets. For unicast traffic, this load is exactly ¼ the data bandwidth which works out to 100 MBytes/sec for reads and 100 MBytes/sec for writes. In this embodiment, the total peak memory bandwidth needed is therefore 1 GByte/sec.

In this embodiment, the peak transfer rate of each DIMM is 1 GByte/sec, but the sustained rate depends on the actual mix of reads and writes and how the addresses are distributed over the internal DIMM banks. In practice, each DIMM is expected to deliver a sustained data rate of around 650 MBytes/sec. The total of 1.3 GBytes/sec supplied by the two groups is 30% larger than the maximum sustained requirement of 1 GByte/sec/. The 30% headroom provides a way to sustain instantaneous loads where one DIMM has more references directed to it than the other. The memory controller for the two DIMM's resides in the multi-function multiport.

In one embodiment, all banks are made the same size and approximately ⅕th of the memory in each bank is allocated to the notification area and ⅘th to the global data area. The purpose of this allocation is to make it exceedingly unlikely for a stream to run out of memory because of space in its notification queue. With a worst case packet size of 64 bytes, notifications (sized at 16 bytes) need ¼th the amount of storage that packet data needs, which is exactly the proportion allocated. Any cell in the global data buffer may be accessed via its physical cell pointer, which identifies the physical bank number and the address of the cell within the bank. The physical cell pointer defines a system-wide physical address space. To simplify address computations, as well as to provide a mechanism to detect old packets, accesses to the global packet buffer are performed through a system-wide virtual address space that maps to the physical address space.

Incoming packets are broken up into as many cells as needed and the cells are written to the global packet data buffer as they arrive as described above. The global data buffer is treated as a single large circular buffer. The input switch maintains an array of write pointers, one per active bank, to keep track of where to write the next cell. The pointers start out at one end of the buffer and advance until they eventually wrap around and overwrite packets that were written a long time ago. An ageing mechanism is used to guard against reading cells that may have been overwritten by subsequent packets. The cells of packets arriving on a given stream are interleaved strictly across the active banks to spread the bandwidth load.

a) Transfers from the Input Switch to Memory

Referring now to FIG. 12, the transfer of cells from the input switch 100 to global data buffer 104 is performed in a time division multiplex fashion. That is, consecutive cells from a given multiport are directed to different memory destination locations. At each time period (cell slot), the input switch transfers to memory a single cell received from each multi-function multiport (as available) into memory. At a next time T+1 the input switch transfers again a single cell from each multiport into memory. Successive entries from the same input multiport are written to different memory banks 105 in global data buffer 104.

Controller

Referring now to FIG. 13A, controller 106 includes controller memory 109, route look-up engine 110, input switch interface 1300, and output switch interface 1302. Controller 106 receives a route look-up request from input switch 100 at the input switch interface 1300. In one embodiment of the present invention a plurality of route look-up engines 110 are included in controller 106, each receiving look-up requests in round-robin fashion so as to speed the routing process. In one embodiment, controller memory 109 is a four-bank static random access memory (SRAM) that requires thirty two route look-up engines 110 to service at full bandwidth.

The present invention is scalable with respect to performance. That is, the number of route look-up engines 110 included within the controller may be increased to provide higher performance without requiring an increase in memory size. In one embodiment, the number of route look-up engines is eight times as great as the number of memory banks in controller memory 109. Alternatively, lesser cost and performance units may use lesser numbers of route look-up engines 110.

a) Controller operation

Referring to FIGS. 2B and 13a, in operation, packets are received at an input port 150, transferred to input switch 100 and stored temporarily in memory 104. When the packet is received by switch 100, a key extraction engine reads the key from the first data block in the packet and transfers the key to controller 106. The input switch also includes a transfer engine for transferring packets received from an input port 150 to memory 104.

The key includes at least destination information and may also include source information, a flow identifier and physical source information (input port ID). The key is located in the header field associated with the first block of data in a packet. The header may contain other information (ISO layer 2 and layer 3 headers), such information is passed to memory for storage. The process of reading key information from a packet is known in the art. The present invention accommodates keys of various types. For example, keys for various protocols may be designated (IPV4, IPV6, etc.). The length of the key is user definable. In general, the key is derived from the header, but portions may also be derived from the payload (data field associated with the packet).

When the controller receives the key information, it must determine a key type. In one implementation, a plurality of key types are defined. The user may define up to 4 types of keys, each having variable length. The key type can be defined by a two bit field in the header. A look-up of the two bit field is used to determine an appropriate trie to search.

Thereafter, an assigned route look-up engine 110 performs a trie based search for the best variable length match of the key, with each key type defining a particular trie for searching. A trie is a data structure that is used to locate the best (longest) matching route for a given key. At the completion of the trie search, the route look-up engine returns a result which includes the output port associated with the destination. The result and other information (source ID, flow ID, packet length, quality of service and statistical information) for routing the packet through the router combine to form a notification. The notification is transferred from the controller 106 to the output switch 102. Upon receiving the notification, the output switch 102 initiates the transfer of the packet from memory 104 to the respective output port 150 associated with the result.

Referring now to FIG. 14, the data structure associated with the notification outputted by the controller 106 to the output switch 102 is shown. The data structure 1400 for the notification includes a mask 1402, a next hop index pointer 1404, full address 1406, offsets 1408 and packet length 1410.

The mask field 1402 is used to indicate which multi-function multiport connected to output switch 102 is to transfer the packet. In one embodiment, the notification may be sent to more than one multi-function multiport resulting in the broadcast of the associated packet. Associated with each multi-function multiport 150 is a storage 310. The next hop index pointer points to a location in storage 310. Storage 310 is used to store media header information associated with a particular type of packet transfer. Next hop addresses, media headers and storage 310 will be described in greater detail below in association with the output section of multi-function multiport 150.

The full address 1406 indicates the starting address in the global data buffer where the first cell in the packet is stored. As was described above, offsets 1408 provide linking information for retrieving cells or an indirect cell associated with the packet. Packet length filed 1410 indicates the length of the associated packet and may be used to determine if indirect cells will have to be retrieved.

I) Route Look-up

Figure 13B:
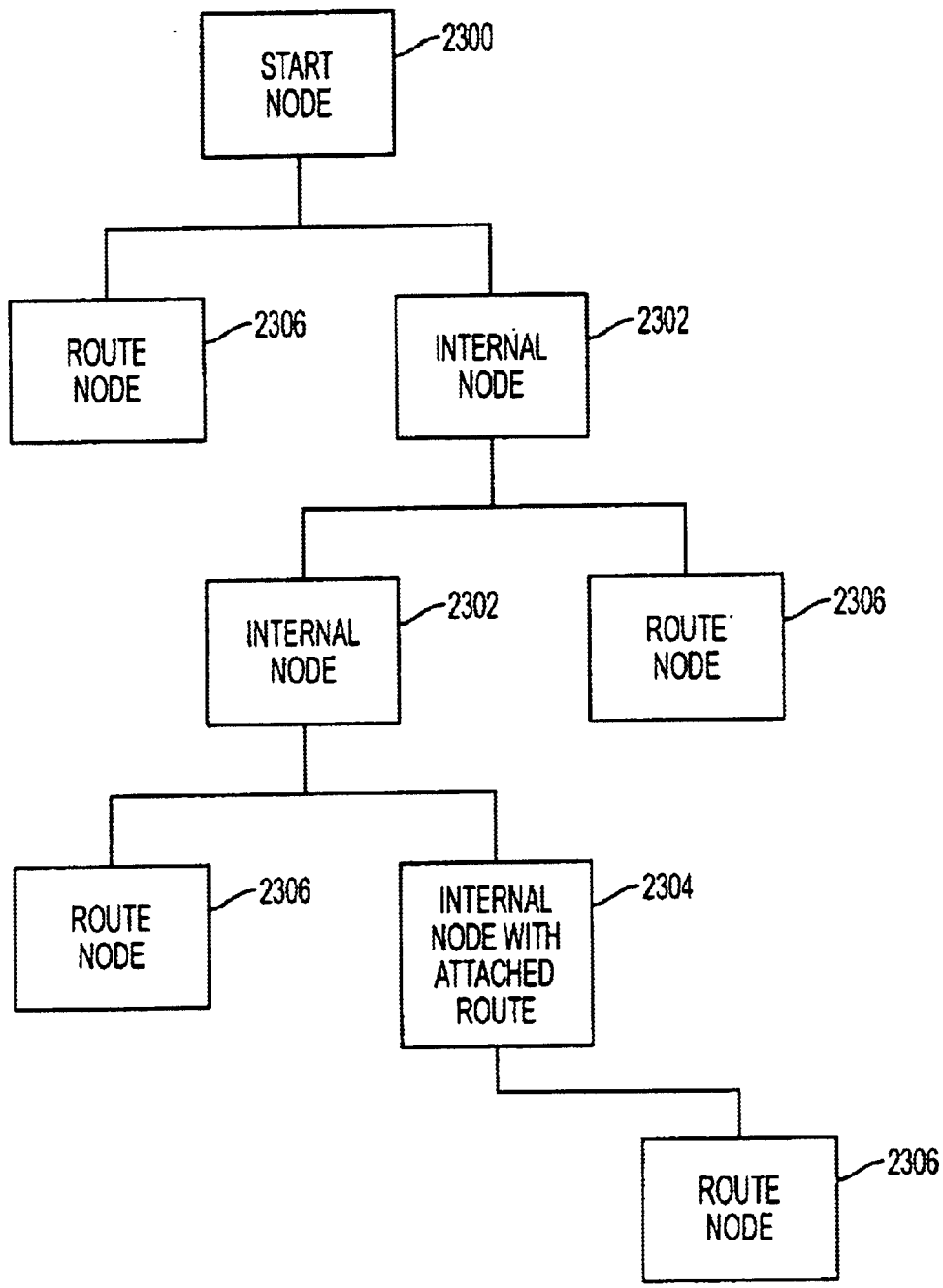
FIG. 13B is a schematic block diagram of a route trie according to one embodiment of the present invention.

Route look-up engine 110 performs the best match variable length look-up based on a modified radix trie search routine. Specifically, in one embodiment of the invention, a route table is stored in memory 109 in the form of one or more tries. Each trie is comprised of one or more nodes including a start node 2300, and may include internal nodes (without an attached route) 2302, internal nodes with an attached route 2304 and route nodes 2306 as is shown in FIG. 13B. In one embodiment, the starting node includes an attached route that is guaranteed to match any key having a type associated with this particular trie. In this way, the attached route provides a default path in the event no other match is located in the trie for a particular key.

Nodes are the decision points in the look-up process. A key associated with a packet has various of its bits tested at nodes along the trie, and depending on the value of the indicated bit(s) in the key being tested, will result in the traversal down a particular branch of the trie. The bits of a key are numbered left to right. Associated with each node is a bits-to-test indicator. The value of the bits-to-test indicator in a trie branch increases until a leaf (route node) is reached. Internal nodes may be of two types, those with and those without attached routes. An internal node with an attached route 2304, may be a match for a key. Internal nodes without attached routes are never a match for a key. Route nodes 2306 are nodes which have no children and, accordingly, only contain route information.

Figure 13C:
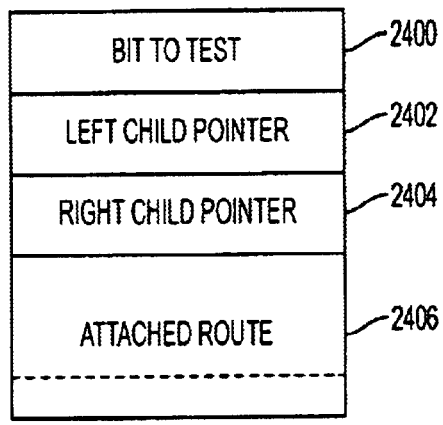
FIG. 13C is a schematic block diagram of a data structure for an internal node with an attached route according to one embodiment of the present invention.

The data structure for each internal node in a trie according to one embodiment of the present invention is shown in FIG. 13C. Associated with each node is a bits-to-test indicator field 2400, a left child pointer 2402, a right child pointer 2404 and an attached route 2406. The bits-to-test indicator field indicates the bit(s) in the key which is (are) to be tested at this node in order to determine which branch (left child or right child for a single bit implementation) in the trie should be traversed in the look-up process. The number of bits included in the bits-to-test indicator field 2400 may be variable. The number of children that branch from a given node is determined by the number of bits in the bits-to-test indicator field 2400, e.g., one bit yields two children, two bits yields four children and so on.

In a one bit implementation, a left child pointer 2402 and right child pointer 2404 are included. The left child pointer points to a left child in the trie structure while the right child pointer 2404 points to a right child in the trie structure. A left child is the next node in the trie to be traversed when the bit tested for the present node has a value of 0. Conversely the right child is the next node in the trie to traverse when the bit tested associated with the present node has a value of 1.

Figure 13D:
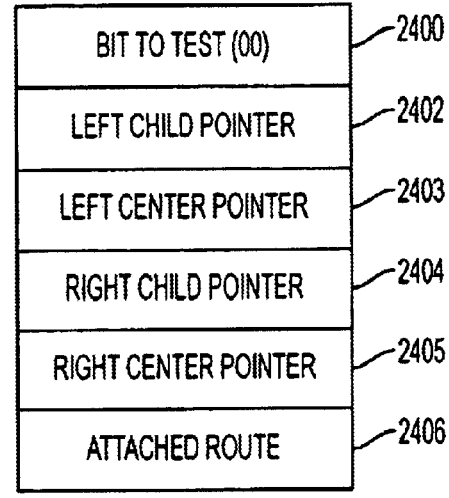
FIG. 13D is a schematic block diagram of a data structure for an internal node having four children and with an attached route according to one embodiment of the present invention.

In a two-bit implementation, a left child pointer 2402, left-center child pointer 2403, right child pointer 2404 and right-center child pointer 2405 are included as shown in FIG. 13d. A left child is the next node in the trie to be traversed when the bits tested for the present node have a value of 00. Conversely the right child is the next node in the trie to traverse when the bits tested associated with the present node have a value of 11. The left-center child is the next node in the trie to traverse when the bits tested associated with the present node have a value of 01. Finally, the right-center child is the next node in the trie to traverse when the bits tested associated with the present node have a value of 10.

The attached route 2406 indicates a result which is associated with a particular node. In one embodiment, the attached route is two words and includes both output port and prefix information. Alternatively, the attached route may also include other data such as quality of service and statistical information. In one embodiment, the attached route includes fields associated with the route (destination) which are updated each time a packet is processed for the given route. The information is stored along with the attached route and may be downloaded in response to a query from a user or the destination. Alternatively, a portion or all of the information may be downloaded with each packet transferred to a destination as part of the notification.

Often it is desirable to attach information to a route that indicates statistical information associated with a given route (destination). Examples of statistical information that may be transferred to a destination include number of packets (in a given time period), frequency of packets, average size of packets, and time since the last packet. Other statistical information including accounting information may also be stored with the attached route and may be incorporated into the notification. For example, billing information for a particular transfer or cumulative billing information may also be incorporated into the notification. In one embodiment of the present invention, controller 106 (FIG. 2) includes statistical modules for calculating statistical information related to each packet transferred through the router. As each packet is processed by the controller, statistical modules update the statistical information stored with the destination route determined in the look-up process.

In addition, quality of service information may be stored with an attached route to speed the routing of certain packets through the switch structure. A quality of service value may be set for each route to allow for the prioritization of packets transferred out a particular output port.

In one embodiment, the data structure of an attached route is comprised of a prefix length, a prefix (the portion that is left justified and matched against the key), a result field, a statistics field and a quality of service field. Prefix length indicates the length of the prefix in bits. The prefix is a pattern (portion of a key) that is compared against a key to determine a best match. The result field stores the output port (destination port) associated with the particular route (prefix). In the event that the prefix associated with a particular node is itself the best match for a given key, then the attached route indicates the output port to which the packet is to be routed. In one embodiment of the present invention, the attached route is a pointer which points to the location in memory where the attached route is stored. Alternatively, the attached route may be stored in consecutive memory locations with the rest of the node information as described above.

Figure 13E:
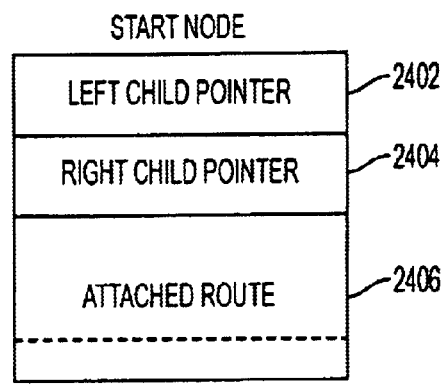
FIG. 13E is a schematic block diagram of a data structure for a start node according to one embodiment of the present invention.

The data structure for a start node according to one embodiment of the present invention (a one-bit bits-to-test indicator field) is shown in FIG. 13E. Associated with the start node are a left child pointer 2402, a right child pointer 2404 and an attached route 2406. In one embodiment of the present invention, no bits-to-test indicator field is stored in memory for the start node. This is because, typically the bits-to-test indicator for the start node is set to bit zero. Alternatively, another bit(s) in the key may be the first bits-to-test. If another bit(s) is the first bits-to-test, then the associated bit identifier is stored in a bits-to-test indicator field for the start node.

Figure 13F:
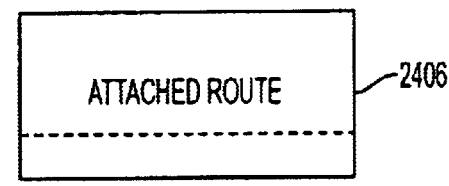
FIG. 13F is a schematic block diagram of a data structure for a route node according to one embodiment of the present invention.

The data structure for each route node according to one embodiment of the present invention is shown in FIG. 13F. Each route node has only an attached route 2406.

Figure 13G:
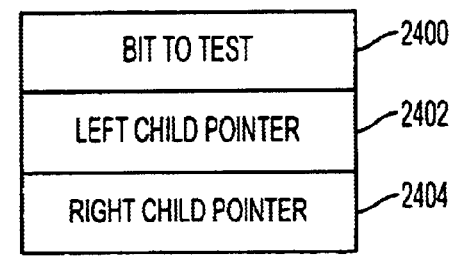
FIG. 13G is a schematic block diagram of a data structure for a internal node according to one embodiment of the present invention.

Internal nodes without routes attached have a data structure as shown in FIG. 13G. Specifically, no space is set aside for an attached route. Otherwise, the data structure is identical to that shown in FIG. 13C.

In a typical router implementation, a route table is not fully populated. That is, not all of the possible key values are mapped to a particular output port. Accordingly, some bits in the key are "don't care" values, and are not required to be tested during the route look-up process, because they do not affect the determination of the output port. In some prior art systems, the look-up of keys in the route table required the comparison of each bit in the key with entries in the route table. Such systems were inefficient. With a trie structure, not every bit in a key needs to be tested in order to determine the best match associated with a particular packet. By testing only the smallest number of bits that allow the discrimination between a key and existing routes, the speed of determining a match is improved.

ii) Trie Creation

Figure 13H:
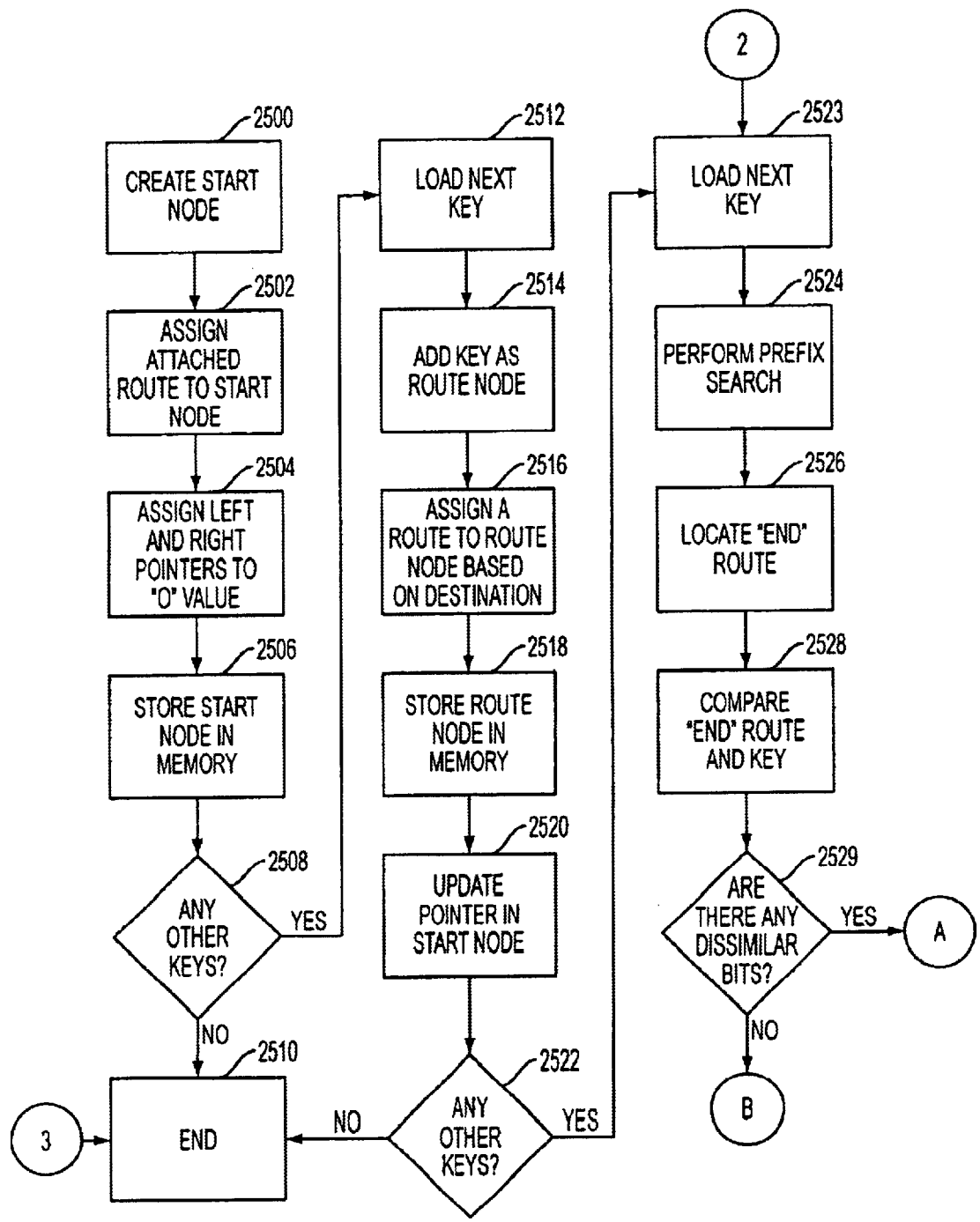
Figure 131:
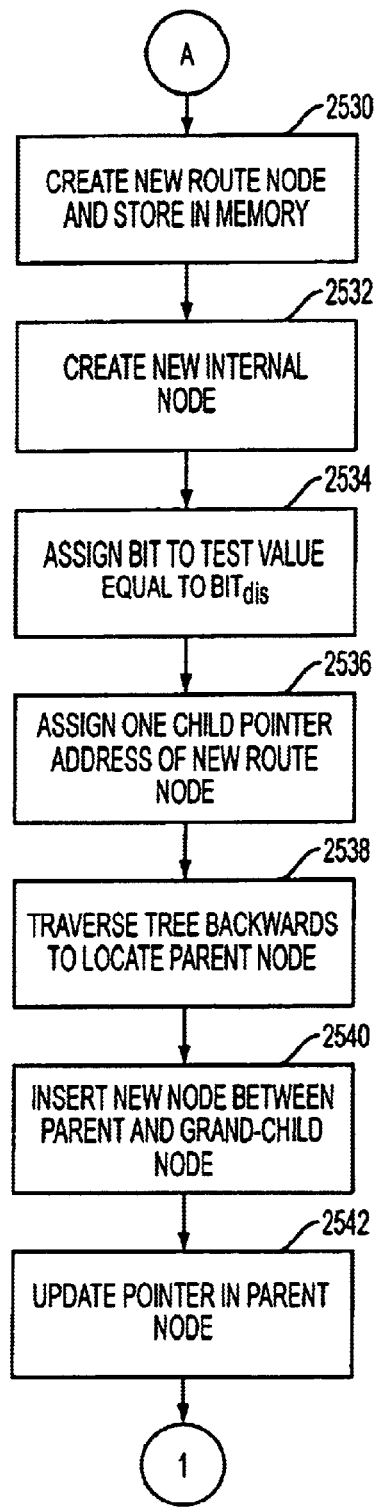

Accordingly, for each key type, a route table is created in trie format. Referring now to FIG. 13H, in a method of creating a trie, a start node is created for the trie (2500). The start node is assigned an attached route (2502). The left and right child pointers are assigned a null value (a binary 511 in one embodiment of the present invention) indicating that no left or right child exists (2504). Finally, the four word start node including left child pointer (1), right child pointer (1) and attached route (2) is stored in memory 108 (2506).

A check is made to determine if any other routes are needed to be placed in the trie (2508). If not then, the process ends (2510). Else, the next route is loaded (2512). The first route in the trie is added as a route node (2514). An associated route is assigned based on the destination for the particular prefix (2516). The attached route and prefix information is stored in memory (2518). Thereafter, the appropriate pointer in the start node (left child pointer or right child pointer) is updated based on the value of the zero bit of the first prefix (2520). If the value of the zero bit in the first prefix (route) loaded is a "0", then the left child pointer is updated to reflect the starting address in memory where the route node for this prefix is stored. Alternatively, if the value of the zero bit in the first prefix loaded is a "1", then the right child pointer is updated to reflect the starting address in memory where the route node for this prefix is stored.

A check is made to determine if any other prefixes are needed to be placed in the trie (2522). If so, the next prefix is loaded (2523). The next prefix will be placed in the trie as either a route node, an internal node, an internal node with an attached route, or as an attached route to an existing internal node. A prefix search is performed in the existing trie (2524). The search entails traversing the trie by testing the new prefix based on the bit indicated by the bits-to-test indicator for each node. At a given node, the bit in the new prefix designated by the bits-to-test indicator for the node is checked in order to determine the next node in the search. The prefix search continues until an end route is determined (2526). An end route will be found either at a route node or at an internal node having an attached route. An end route is either the route associated with a route node or the first route located on the trie after the bits-to-test indicator associated with the current node on the trie exceeds the number of bits in the prefix being searched. The first route located may be an attached route to an internal node, or a route node. The search must terminate at a node which has an associated route in order to determine where (and how) the new prefix will be inserted into the trie.

That is, at the start node, the value of the zero bit is checked in the new prefix to determine if the search should proceed down a left child or the right child. At each subsequent node in the trie, the bit indicated by the bits-to-test indicator associated with the node is checked to determine a next node in the traversal. Eventually, the search will come to an end as described above. In our initial two node trie (start node and a route node), the search is deminimus, and may end at either the start node (if the new prefix being searched has a value in the zero bit different from the prefix associated with the route node) or at the route node.

At the end of the search, a comparison is made between the prefix being searched and the end route to determine the first dissimilar bit ($BIT_{Dis}$) in the new prefix (2528). In one embodiment of the present invention, an EXCLUSIVE OR operation on the two prefixes is performed to reveal the first dissimilar bit. If a dissimilar bit is found, then branch A in the process is performed (2529). If no dissimilar bits are found, then all of the bits of the new prefix match the end route and branch B in the process is performed.

Referring to FIG. 13i, in branch A, a dissimilar bit has been determined, and the new prefix will be inserted into the trie as route node pointed to by a new internal node which is to be inserted into the existing trie. Specifically, a new route node is created and stored in memory indicating the destination associated with the new prefix (2530). Thereafter, a new internal node is created (2532). The bits-to-test indicator for the new internal node is assigned to be the first dissimilar bit ($BIT_{Dis}$) discovered above (2534). One of the child pointers (either the left child or the right child, in a one-bit implementation) of the new internal node is assigned the address of the new route node depending on the value of the bits-to-test indicator in the new prefix (2536). Starting at the node associated with the end route identified above, the trie is traversed in reverse to locate the first node (the parent node) having a bits-to-test indicator which is less than the first dissimilar bit ($BIT_{Dis}$) (2538). The node immediately beneath the parent node in the original trie is referred to as the grand-child node. The new internal node is inserted into the trie between the parent and the grand-child nodes by assigning the remaining child pointer in the new internal node the starting address associated with the grand-child node (2540). Finally, the address of the pointer in the parent node which previously pointed to the grand-child node is updated to indicate the starting address in memory of the new internal node (2542). Branch A is complete.

Figure 13J:
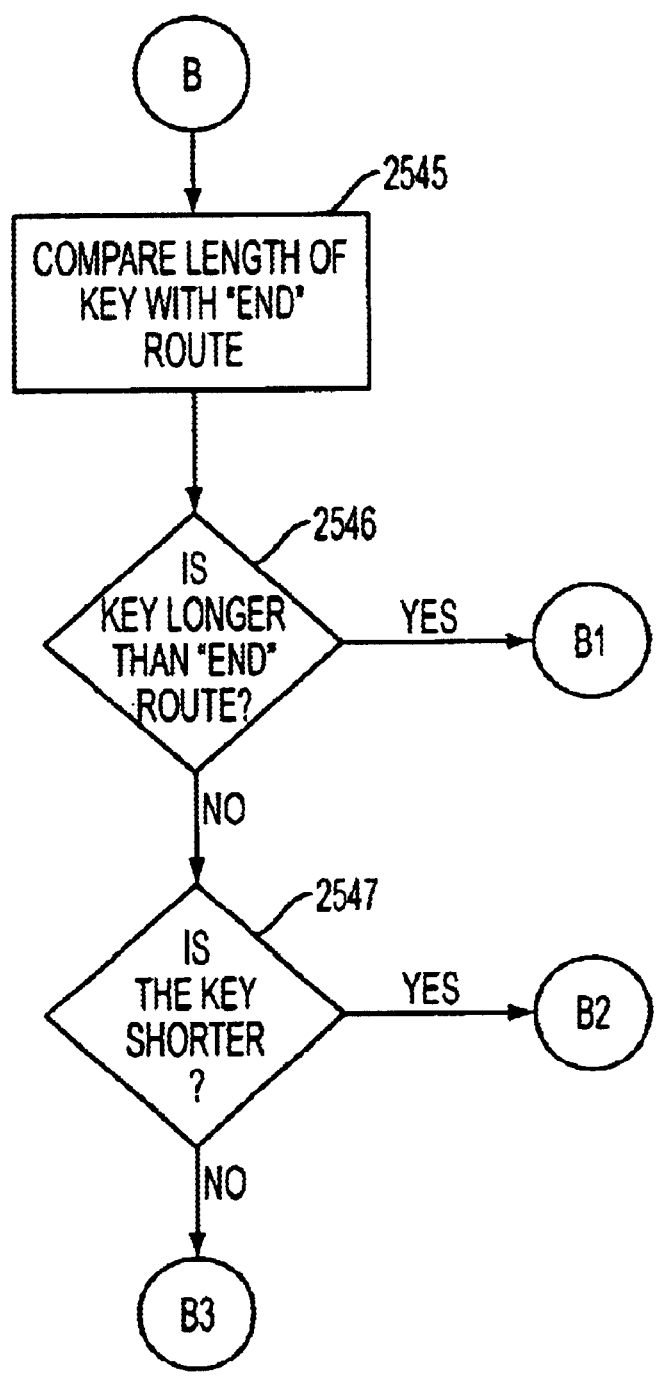

Referring now to FIG. 13*j*, in branch B, no dissimilar bits were determined, necessitating a comparison of the length of the new prefix with the length of the end route (2545). If the length of the new prefix is longer than the length of end route then branch B1 is traversed (2546). If the length of the new prefix is shorter than the length of end route, then branch B2 will be traversed (2547). Finally, if the length of the new prefix is the same as the length of end route, branch B3 will be traversed.

Figure 13K:
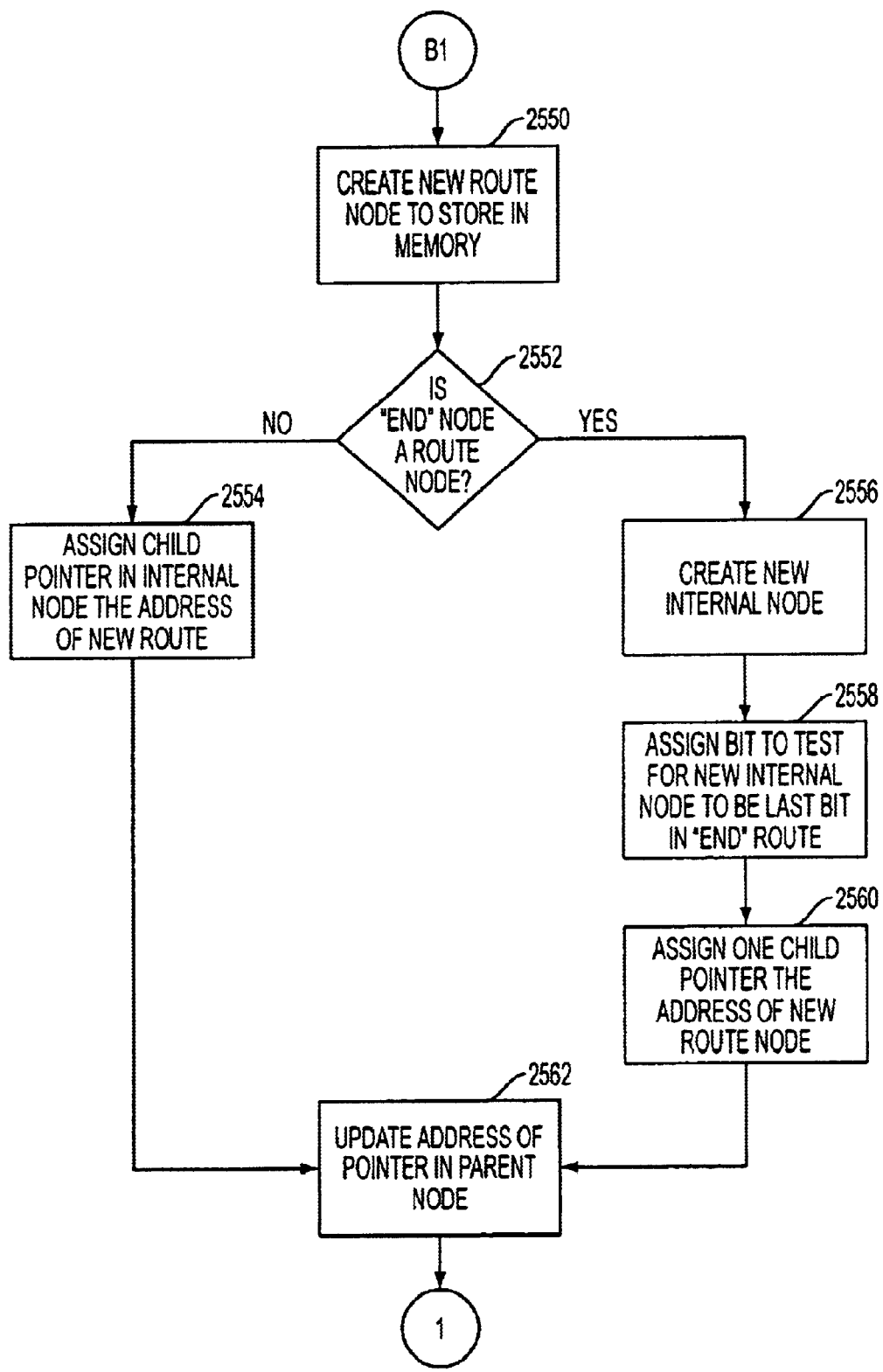

Referring now to FIG. 13K, in branch B1 (the new prefix is longer than the length of end route), the new prefix will be inserted into the trie below the node associated with the end route as a new route node. Specifically, a new route node is created and stored in memory indicating the destination associated with the new prefix (2550). Thereafter, a determination is made of the type of node associated with the end route (2552). If the node associated with the end route is an internal node with an associated route, then the appropriate child pointer (based on the value of the bit in the new prefix of the bits-to-test indicator associated with the internal node) is assigned the starting address of the new route node (2554). Else, a new internal node is created (2556). The bits-to-test indicator for the new internal node is assigned to be the last bit in the end route (2558). One of the child pointers (either the left child or the right child, in a one-bit implementation) of the new internal node is assigned the address of the new route node depending on the value of the bit in the new prefix of the bits-to-test indicator associated with the new internal node (2560). Finally, the address of the pointer in the parent node (the node immediately preceding the route node associated with the end route and whose pointer previously indicated the starting address of the route node associated with the end route) is updated to indicate the starting address in memory of the new internal node (2562). Branch B1 is complete.

Figure 13L:
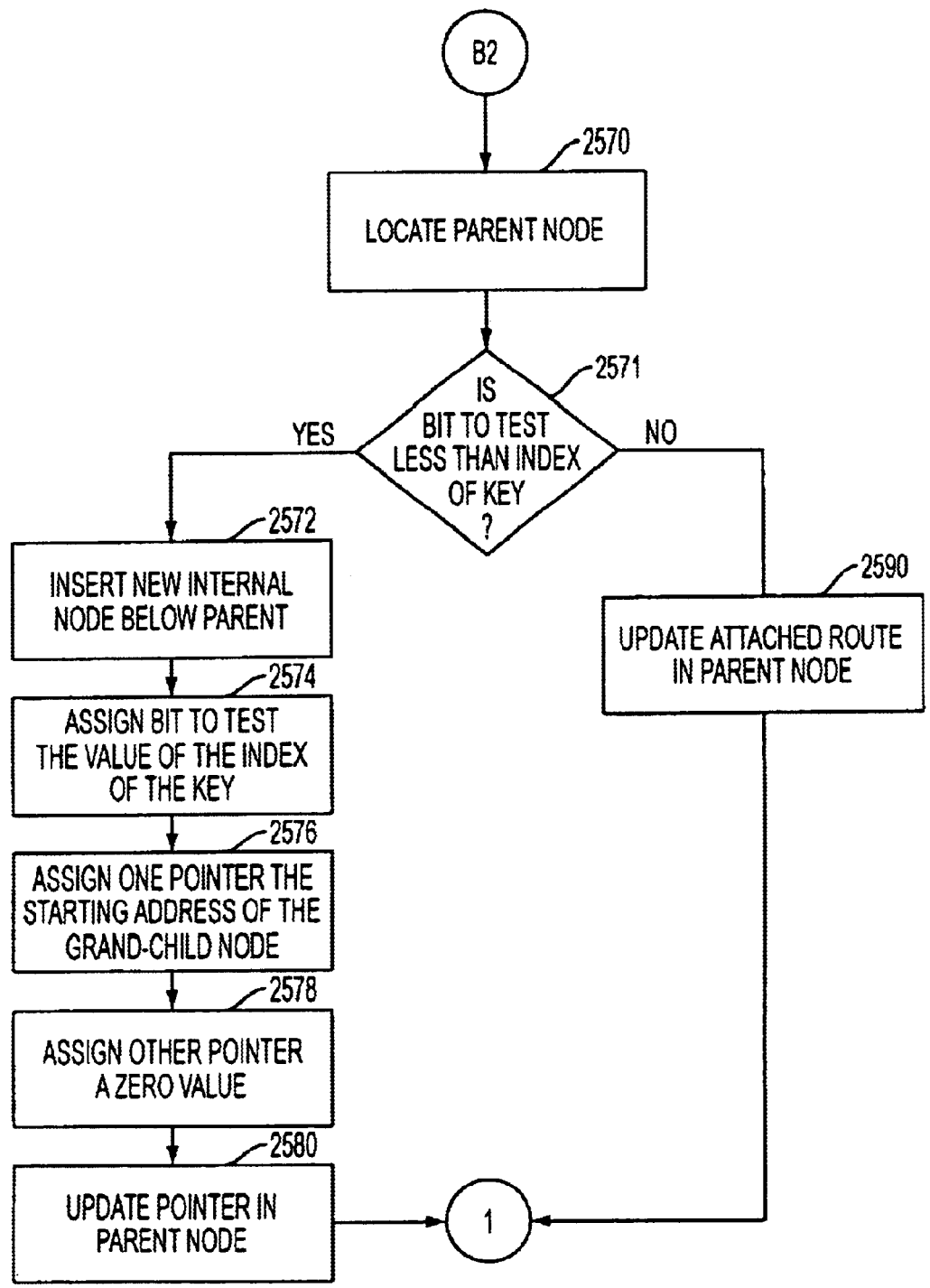

Referring now to FIG. 13L, in branch B2 the new prefix is shorter than the end route. The new prefix is inserted into the trie above the node associated with the end route, as either a new route or as an internal node with a route attached. Specifically, starting at the node associated with the end route, the trie is traversed backwards until a node (the parent node) is found having a bits-to-test indicator less than or equal to the index (length) of the new prefix (2570). The node immediately beneath the parent node in the original trie is referred to as the grand-child node.

If the bits-to-test indicator is less than the index of the new prefix (2571), then a new internal node is inserted below the parent node (2572). The bits-to-test indicator for the new internal node is assigned the value of the index (length) of the new prefix (2574). Accordingly, the new internal node tests the first bit after the end of the new prefix. The new internal node is inserted into the trie between the parent and the grand-child nodes by assigning one of the child pointers (as indicated by the value of the bits-to-test indicator of the new internal node) the starting address associated with the grand-child node (2576). The other child pointer (either the left child or the right child in a one-bit implementation) of the new internal node is assigned a null value (binary 511 in one embodiment) (2578). Finally, the address of the pointer in the parent node which previously pointed to the grand-child node is updated to indicate the starting address in memory of the new internal node (2580).

If the bits-to-test indicator of the node discovered in the backwards search is equal to the index of the new prefix, then the new prefix is inserted as an attached route for the node (2590). Specifically, the attached route associated with the node determined in the search is updated to reflect the destination of the new prefix. Branch B2 is complete.

Figure 13M:
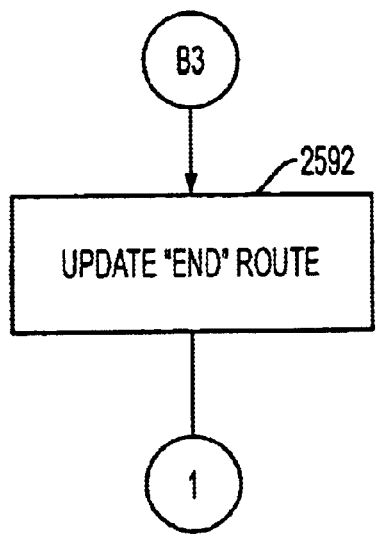

Referring now to FIG. 13M, in branch B3 the new prefix is the same length as the end route. The new prefix is inserted into the trie as an update to the end route (2592). Specifically, the route associated with the end node is updated to reflect the destination of the new prefix.

Figure 13N:
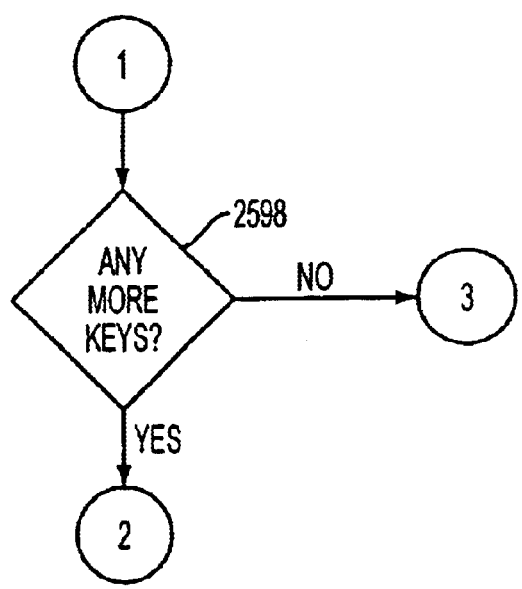

Referring now to FIG. 13N, at the completion of branches A and B (and the various sub-branches of branch B including B1, B2 and B3), a check is performed to determine if any more prefixes need to be inserted into the trie (2598). If so, then the process continues at step (2523). Else, the process ends (2510).

In one embodiment of the present invention, the process of constructing a trie is performed for each type of key based on an initial set of prefixes and associated destination information. In addition, each trie may be updated dynamically by a routing protocol associated with the controller 106 (FIG. 2). The routing protocol services the tries, and may insert new prefixes as necessary. The process for inserting a new prefix is identical to the process described above for inserting a next prefix after the first prefix in the trie has been installed as a route node (steps 2522–2592).

The updating process advantageously does not require the shutting down of the route look-up process. As was described above, the insertion of a route is accomplished off line, and only the final step in the process affects the trie. The final step in any insertion process requires writing in memory the address for a new node to the new node's parent. Accordingly, searches in a trie may be performed the entire time that an insertion process is operated to insert new entries or make changes to existing entries. The trie is never invalid, thus never requiring the shutting down of the look-up process for trie maintenance.

iii) Route Look-up

Figure 13P:
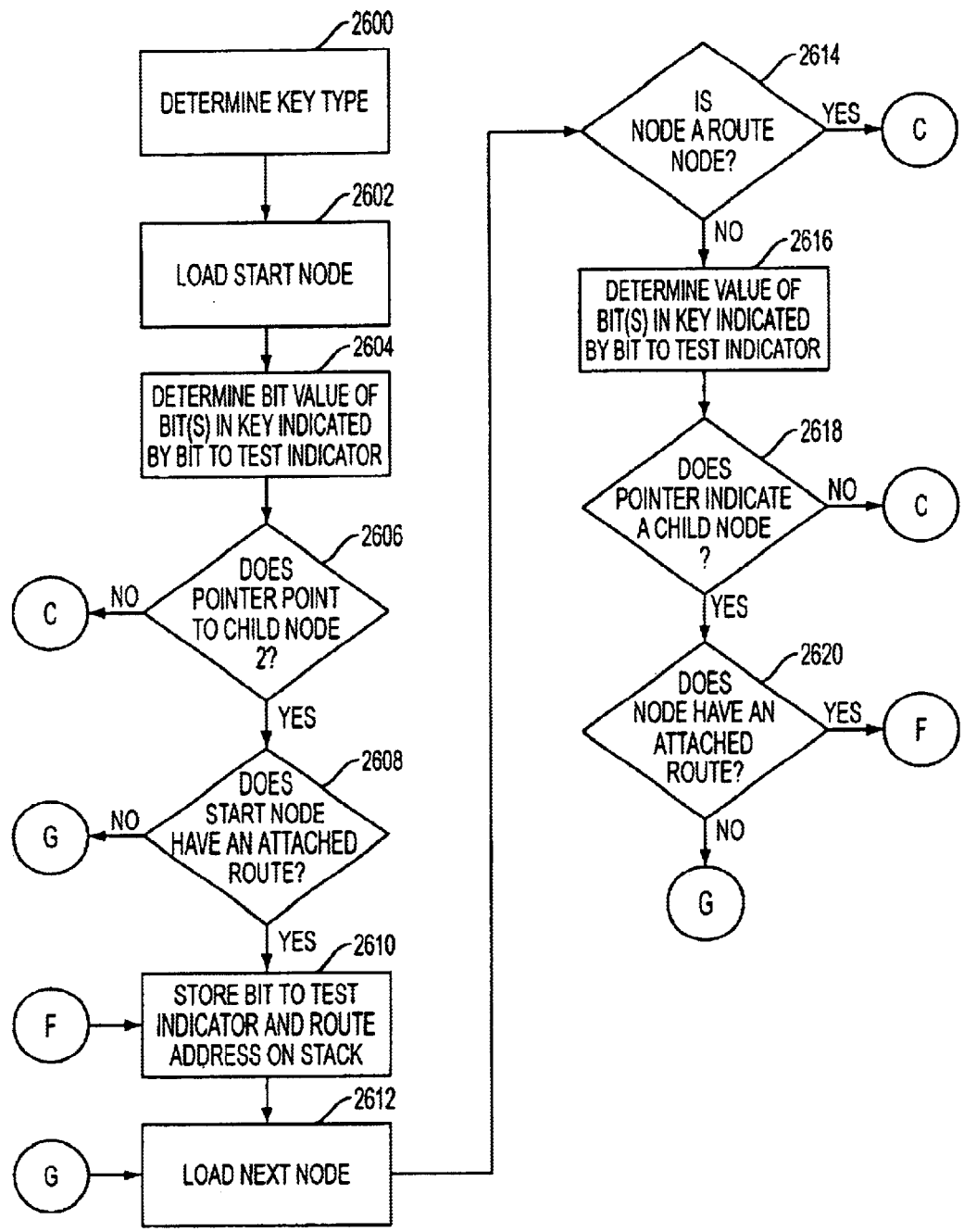
FIGS. 13P and 13Q collectively are a process for routing data through the router according to one embodiment of the present invention.
Figure 13Q:
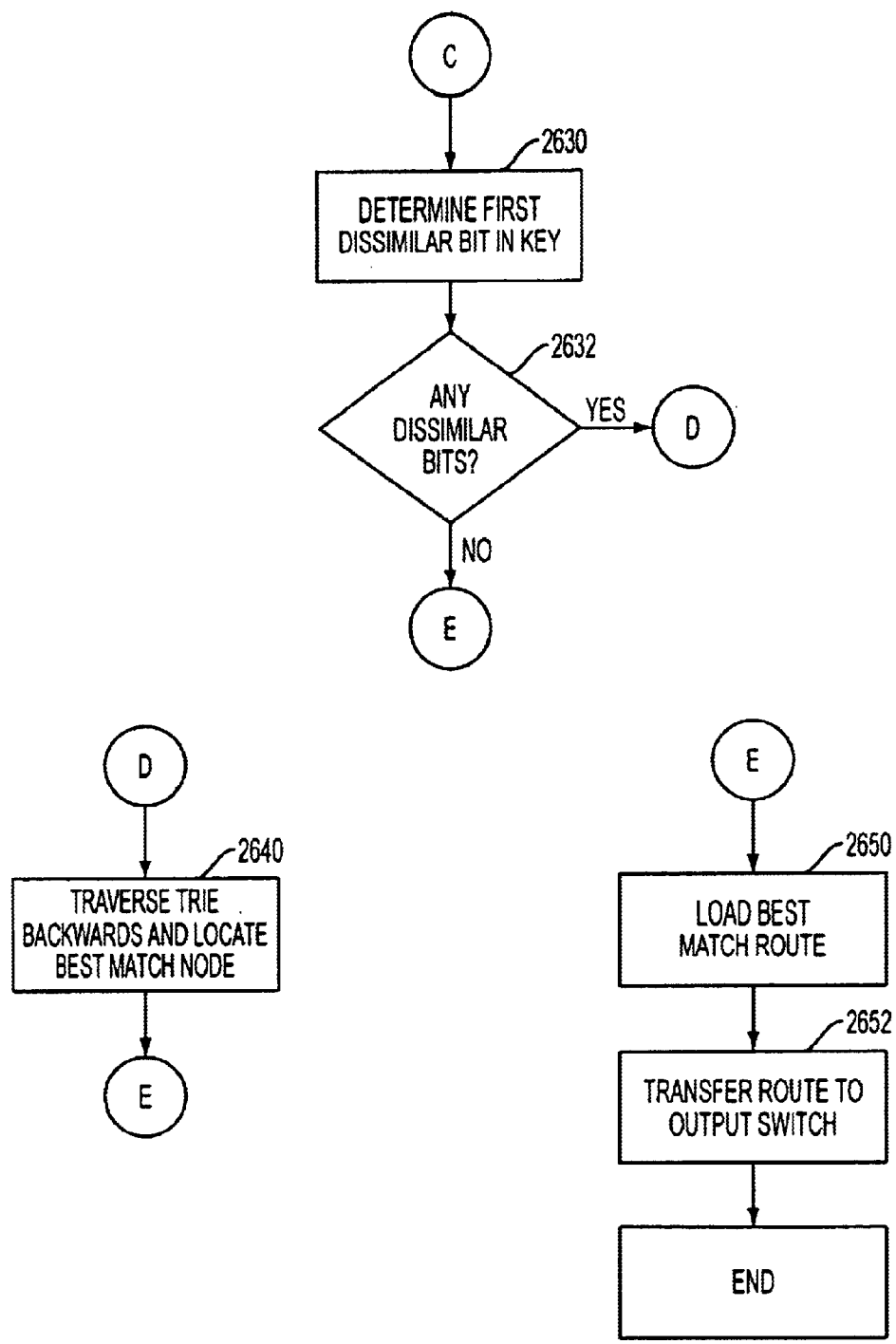

Having created a route table including one or more tries which are stored in memory as described above, the router is ready to process packets. A key is copied from an inbound packet by input switch 100 (FIG. 2) and transferred to a selected route look-up engine 110 (FIG. 2) in the controller 106 (FIG. 2). Referring to FIGS. 2 and 13*p–q*, in a best variable length match look-up method, a key type is determined for a new key to identify the particular trie that must be traversed in the look-up process (2600). The look-up process includes a forward and backward traversal of the trie to determine the best match associated with a given key. The forward search begins at the start node. Specifically, the four word data block associated with the first node in the appropriate trie type is loaded into a buffer in the route look-up engine 110 from memory 108 (2602). A bit test engine in route look-up engine 110 determines the value of the bit(s) in the new key indicated by the bits-to-test indicator (as defined by the bits-to-test indicator field retrieved in step (2602)) (2604). Thereafter, the route look-up engine determines if the pointer indicated by the bit(s) value (either the left child pointer or right child pointer in a one-bit implementation) indicates a child node (2606). If no child is indicated, then route look-up engine 110 performs a key comparison as is shown in branch C.

If the pointer indicates a child, then a check is made to determine if the start node has an attached route (2608). If an attached route is associated with the start node, the route look-up engine stores the starting address in memory for the attached route (or the starting address associated with the contiguous memory locations associated with the start node) and the bits-to-test indicator associated therewith on a forward search stack in the route look-up engine (2610). If no attached route exists, the process continues at branch G. The route look-up engine thereafter loads the data words associated with the next node indicated by the respective child pointer (2612). For example in a one-bit implementation, where the start node bits-to-test indicator is set to the "zero'th" bit, and if the zero'th bit in the new key location has a value of "0", then the route look-up engine will load the node indicated by the left child pointer. Alternatively, if the zero'th bit has a value of "1", the route look-up engine will load the node indicated by the right child pointer. In one embodiment of the present invention, the loading process of a node entails loading all of the data blocks associated with a given node (5 for internal nodes or 2 for route nodes). Alternatively, a lesser number of data words may be loaded as will be described below.

Thereafter the route look-up engine determines if the new node is a route node (2614). If so, then a route has been determined and the process continues at branch C. If not, then the route look-up engine (bit comparison engine) determines the bit value in the new key of the bit indicated by the bits-to-test indicator associated with the new node (node loaded in step 2612), where the bits-to-test is defined by the bits-to-test indicator field retrieved as part of the load in step 2612 (2616). Thereafter, the route look-up engine determines if the pointer indicated by the bit value (either the left child pointer or right child pointer) indicates a child node (2618). If no child is indicated then the route look-up engine performs a key comparison as is shown in branch C.

Alternatively, the route look-up engine checks to determine if the new node has an attached route (2620). If so, then the process continues at branch F resulting in the storage of the address associated with the attached route onto the stack (or the pointer indicating the starting address in memory for the attached route) prior to the loading of a next route. Alternatively, the process continues at branch G and the next node is loaded for processing. The route look up engine repeats this process for each node (steps 2610–2620) until an end node has been located.

An end node may be a route node or an internal node having an attached route. An internal node with an attached route will only be an end node if the value of the bit(s) indicated by the bits-to-test indicator in the key being tested indicates a child pointer associated with the internal node that points nowhere (null). When an end node is reached, the route look-up engine performs branch C. Specifically, if the pointer indicated by a bits-to-test value in the new key points to a route, then the forward search portion of the process ends when the route is retrieved. If however, the pointer indicates a null, the search ends with the internal node.

Branch C can be characterized as follows: the forward search has terminated at an internal node (the end node) having a pointer to a child which has no data, and, this "no-data" pointer is indicated by the bit(s) value(s) in the new key of the bits-to-test bit(s) of the end node; or, the search has terminated at a route node. The backward portion of the search begins by comparing the route associated with the current node (either an attached route for an internal node or a route associated with a route node) and the new key.

At this point, the best match for the new key will be at the end node or is guaranteed to be somewhere back-up stream (along the path from the end node back to the start node). Accordingly, in order to determine the best match, a key comparison engine in route look-up engine 10 compares the key being searched and the end route (the route associated with the end node) to determine the first dissimilar bit ($BIT_{Dis}$) the new key (2630). In one embodiment of the present invention, an EXCLUSIVE OR operation on the new key and prefix (route) is performed to reveal the first dissimilar bit. If a dissimilar bit is found, then branch D in the process is performed (2632). If no dissimilar bits are found, then. all of the bits of the new key match the end route and branch E in the process is performed.

In branch D, a dissimilar bit has been determined, and the end route is not a match for the new key. Starting at the end node, the trie is traversed in reverse to locate the first node (the best match node) having a bits-to-test indicator which is less than or equal to the bit number of the first dissimilar bit ($BIT_{Dis}$) (2640). In one embodiment of the present invention, this is performed by popping off entries from the forward search stack in the route look-up engine (each entry associated with nodes that have attached routes and have been traversed as part of the forward search), until an entry is located which has a bits-to-test indicator value that is less than or equal to the bit number of the first dissimilar bit. When the best match node has been located, then the process continues at branch E.

In branch E, a best match route has been determined either by discovering no dissimilar bits when comparing the new key to the end route, or by traversing the trie and locating the route associated with the best match node. The route look-up engine loads the best match route from memory (2650). In one embodiment, if the end route associated with the end node matches the new key, no load is required, such load having already been accomplished as part of the loading of the end node in the forward search of the trie. Alternatively, if the trie is required to be traversed backwards, the route information is loaded based on the pointer stored on the stack. The route look-up engine transfers the best match route information to the output switch 102 (FIG. 2) (2652). Thereafter the process ends (2654).

One of the advantages of the present invention is that the trie structure guarantees a best match for each key transmitted through the switch. As is described above, each route stored in the trie has a prefix associated therewith. A prefix is a left justified subset of a key. Accordingly, a key may match many prefixes in a trie. The best match is the matching prefix having the longest length. The system of the present invention provides for a best (longest) match for a key.

In addition, only a single key comparison is required in the entire matching process. The key is compared to a single prefix (at the end node) and thereafter the best match may be determined without performing any additional comparisons of the key to prefixes stored in the route look-up table.

iv) Minimized Data Word Loads

As was described above in conjunction with the forward traversal of a trie, a load operation is performed of the data words associated with each node in the forward search. This requires the loading of up to five words per node (bits-to-test indicator, left child pointer, right child pointer, and attached route (2 words)). Alternatively, lesser number of words may be loaded.

Specifically, in one embodiment of the invention, only the bits-to-test indicator and child pointers are loaded for a given node. In the event that the node is determined to be the end node in a forward search, then the attached route information can be loaded as required.

In another embodiment of the present invention, only the bits-to-test indicator is loaded initially for a given node. After the bits-to-test indicator is loaded for a given node, the bit(s) value of the new key is used to determine which child should be loaded for this node, if any. For example, if the bit value of the bit in the new key indicated by the bits-to-test indicator is a "0" in a one-bit implementation, the left child only is loaded. If the bit value in the bit in the new key is a "1", then only the right child is loaded. In this way, even where plural bits are to be tested, only a single load is required to retrieve the correct next child node in the trie.

v) Data Structure

Figure 13R:
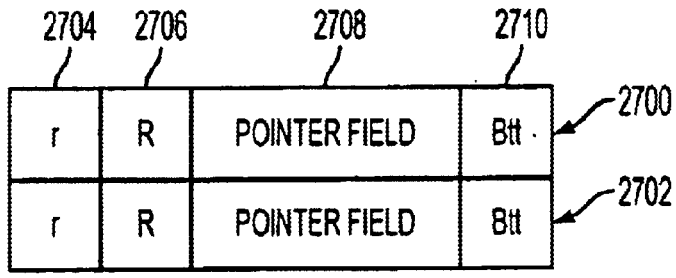
FIG. 13R is a schematic block diagram of a data structure for a internal node according to an alternative embodiment of the present invention.

In another embodiment of the present invention, an alternative data structure associated with the nodes is used to minimize memory accesses. Referring to FIG. 13R, a data structure for an internal node without an attached route is shown in a one-bit implementation. Each internal node without an attached route includes a left child pointer 2700, and a right child pointer 2702. The left and right child pointers include two status bits 2704 and 2706 (little "r" and big "R", respectively), a pointer field 2708 which points to the starting address of an associated child, and a bits-to-test indicator field 2710 which indicates the bits-to-test in the child node indicated by the pointer field 2708. The first status bit (little "r") 2704 indicates whether the pointer stored in the pointer field 2708 points to a route node or an internal node. The second status bit (big "R") 2706 indicates whether an attached route exists for this node.

Figure 13S:
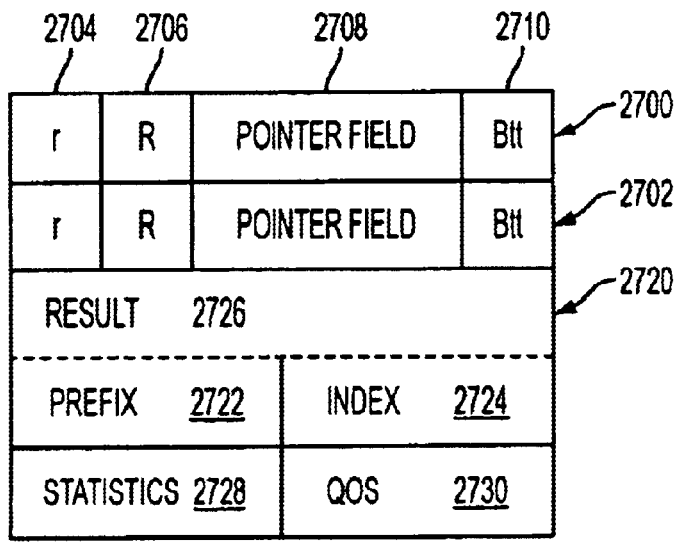
FIG. 13S is a schematic block diagram of a data structure for a internal node with an attached route according to an alternative embodiment of the present invention.

The data structure for an internal node with an attached route for a one-bit implementation is shown in FIG. 13S. Each internal node with an attached route includes a left child pointer 2700, a right child pointer 702 and an attached route 2720. The left and right child pointers include two status bits 2704 and 2706 (little "r" and big "R", respectively), a pointer field 2708 which points to the starting address of an associated child, and a bits-to-test indicator field 2710 which indicates the bits-to-test in the child node indicated by the pointer field 2708. The attached route 2720 contains an index 2722, a prefix 2724, a result 2726 (destination port), a statistics field 2728 and quality of service field 2730, the functions of which have been described above.

Figure 13T:
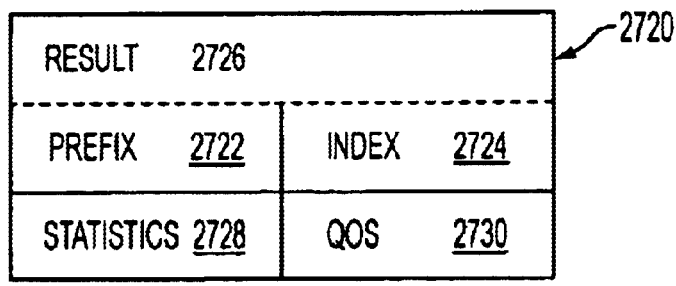
FIG. 13T is a schematic block diagram of a data structure for a route node according to an alternative embodiment of the present invention.

The data structure for a route node for a one-bit implementation is shown in FIG. 13T. Each route node includes an attached route 2720.

With this data structure, a single word per node is required to be loaded in order to traverse the trie. Only minor variations in the creation of the trie and in the traversal of the trie are required, yet the memory accesses required have been reduced substantially.

Figure 13U:
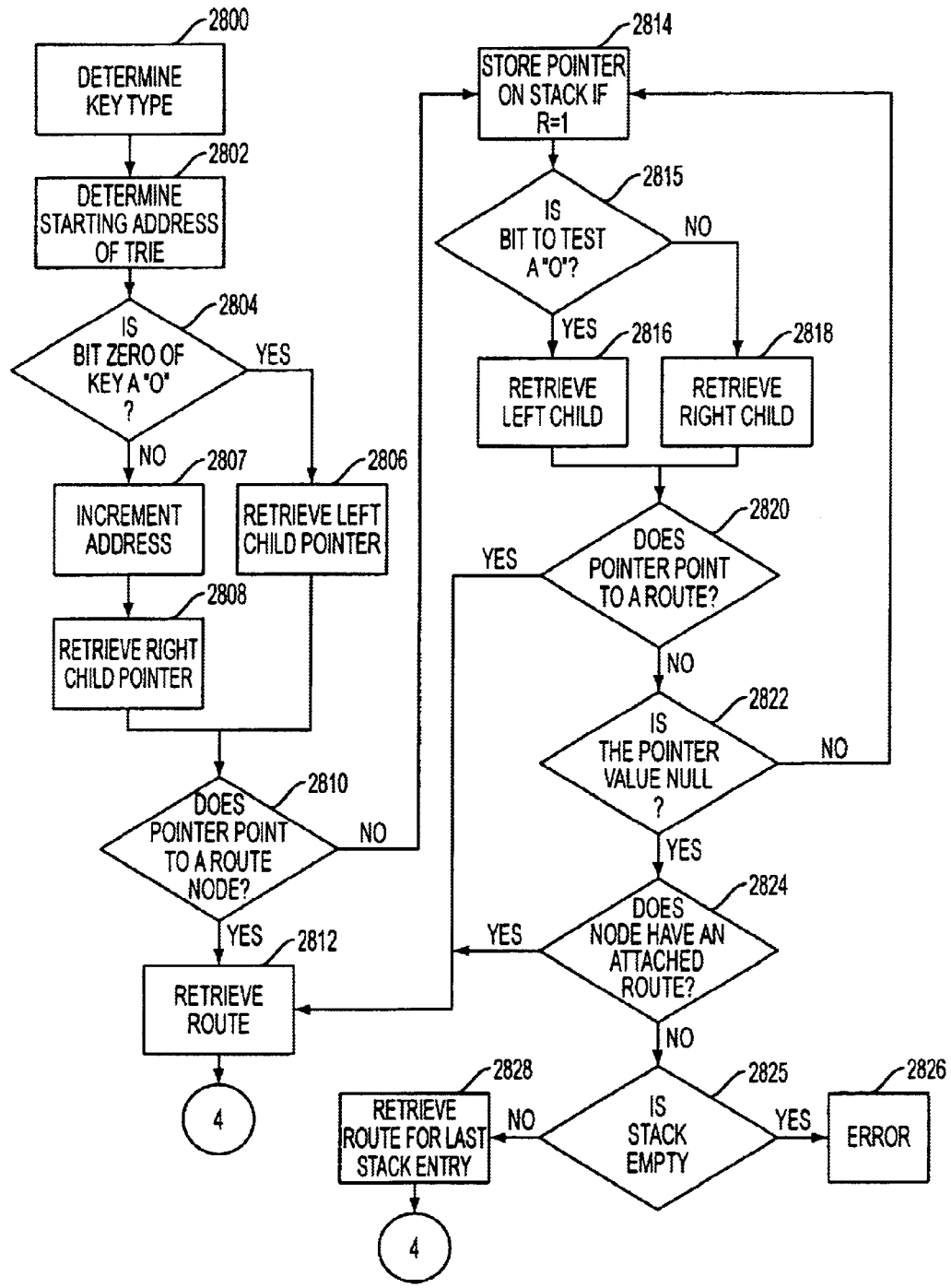
FIGS. 13U and 13V collectively are a process for routing data through the router according to an alternative embodiment of the present invention.

During the look-up operation, the benefits of the data structure proposed above are readily apparent. Referring to FIG. 13U, the process of performing a best match variable length look-up of a route for a one-bit implementation begins with determining the type of key for a new key received at the controller (2800). The starting address of an appropriate start node is determined based on the trie type (2802). Thereafter, a check is made of the value of the bit in the new key indicated by the bits-to-test indicator associated with the start node (typically bit zero)(2804). If the value of bit in the new key is a "0", then the route look-up engine retrieves the left child pointer associated with the start node which will be located at the starting address determined above in step 2802 (2806). If the value of bit in the new key is a "1", the route look-up engine will increment by one the starting address received in step 2802 (2807) and retrieve the right child pointer associated with the start node (2808).

A check is made to determine if the pointer retrieved points to a route (node) or to another internal node (2810). If the pointer points to a route node (as indicated by the status of the little "r" status bit 2704) then the route indicated by the pointer (the first left or right child pointer) is retrieved (2812). If the pointer points to an internal node, then the route look-up engine will store the pointer retrieved on a stack if the "R" status bit is set (2814). Specifically, the route look-up engine stores the bits-to-test indicator associated with the given node and the pointer retrieved in step 2812. Thereafter, the route look-up engine (bit comparison engine) will test the bit of the new key indicated by the bits-to-test indicator field in the pointer retrieved in steps 2806 or 2808.

If the bit(s) indicated by the bits-to-test indicator has a value of "0" in the new key, then the route look-up engine will retrieve the left child associated with the address indicated by the pointer (2816). Specifically, the route look-up engine will retrieve the data word which is indicated by the address indicated by the left or right child pointer.

If the bit (in step 2812) has a value of "1" in the new key, then the route look-up engine will retrieve the right child associated with the address indicated by the pointer (2818). Specifically, the route look-up engine will retrieve the data word which is indicated by the address indicated by the child pointer incremented by one.

This process repeats (steps 2814–2822) until an end route is located. Specifically, if the pointer indicated by a bits-to-test value in the new key points to a route (2820), then the forward search portion of the process ends when the route is retrieved (2812). If however, the pointer retrieved indicates a null value (2822), a check is made to determine if the node has an attached route (2824). If so, then the forward search portion of the process ends and the associated internal route is retrieved in step 2812. If no attached route exists, a check is made to determine if the stack is empty (2825). If so, an error condition occurs and the route look-up terminates (2826). If the stack is not empty, then the last entry on the stack is retrieved (2828) and the process continues at step 2830. The route retrieved from the route node, the internal node with attached route, or the route indicated by the stack entry will become the end route for the purposes of performing the backward portion of the look-up process.

Figure 13V:
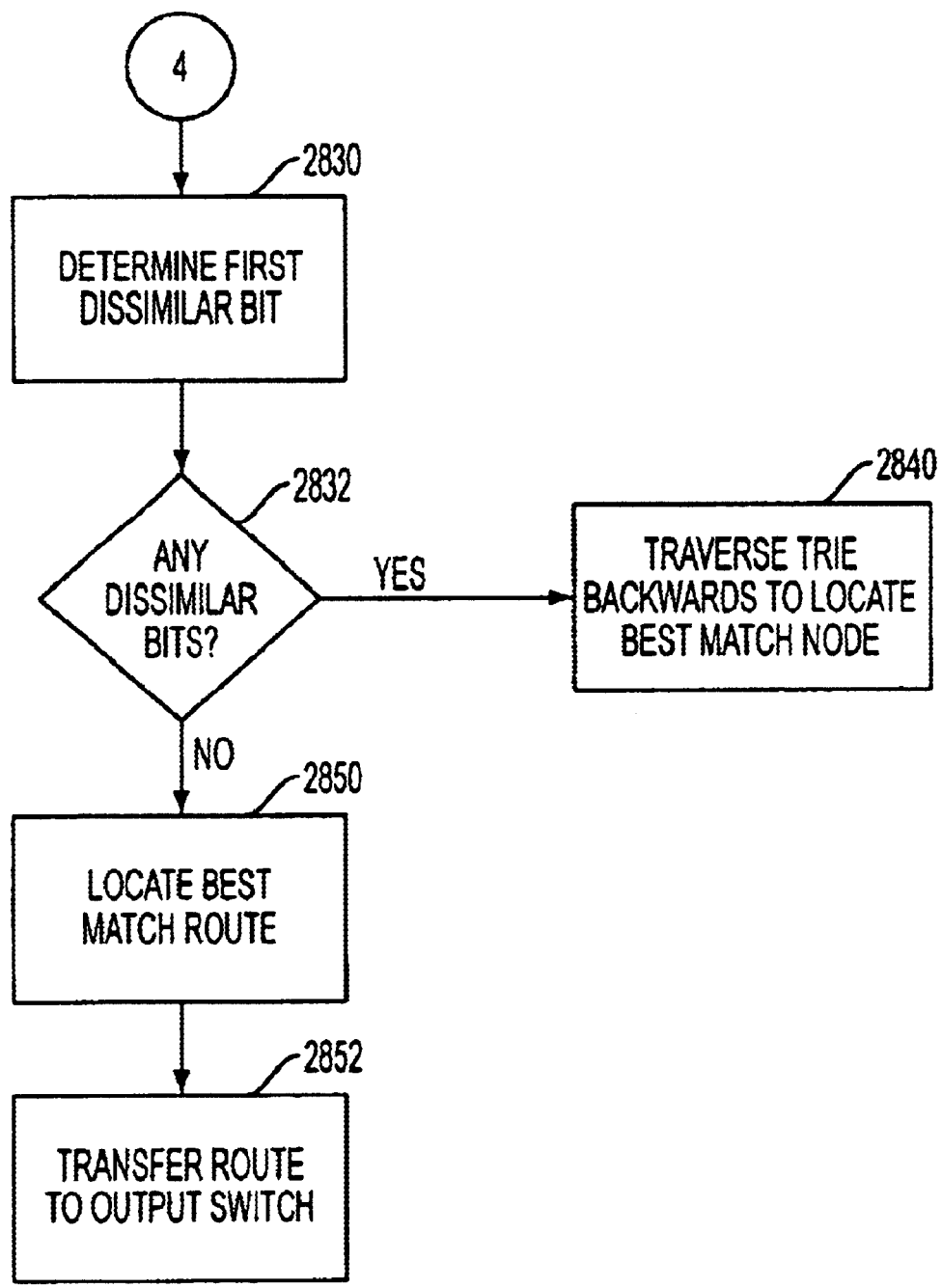

Referring to FIG. 13V, in order to determine the best match, the route look-up engine (key comparison engine) compares the key being searched and the end route to determine the first dissimilar bit ($BIT_{Dis}$) in the new key (2830). If a dissimilar bit is found (2832), then starting at the end node, the trie is traversed in reverse to locate the first node (the best match node) having a bits-to-test indicator stored on the stack which is less than or equal to the bit number of the first dissimilar bit ($BIT_{Dis}$) (2840). In one embodiment of the present invention, this is performed by popping off entries from the forward search stack in the route look-up engine, each entry associated with nodes that have been traversed as part of the forward search, until a entry is located which has a bits-to-test indicator value that is less than or equal to the bit number of the first dissimilar bit. If no dissimilar bits are found or if the best match node has been determined in step 2840, then the route look-up engine loads the best match route, either the route associated with the best match node or the end route from memory (2850). If the best match route is the end route, no memory load is required, such load having been accomplished as part of the comparison above. Alternatively, the route information is loaded by incrementing the memory address retrieved from the stack node by two(if the starting address for the node is stored on the stack as opposed to the address for the attached route), and loading the appropriate route information. Thereafter, the route look-up engine transfers the best match route to the output switch 102 (2852).

vi) Multiple Memory Banks

Referring again to FIG. 2, in one embodiment of the invention, the memory 108 attached to controller 106 is a bank of four static RAMs (SRAMs). In the construction of the route table, parents and children are distributed among the SRAM banks such that no parent and child are stored in the same bank of static RAM. Accordingly, when a route look-up engine accesses a particular memory location in memory 108, it is guaranteed to not to have to access the same memory bank in order to traverse to the next node in a given path. The use of multiple memory banks is useful to increase the number of simultaneous read operations which can be performed in the look-up process. Distribution of parent and children nodes across the memory banks helps to avoid bank conflicts.

Another memory saving technique included in one embodiment of the present invention is the attachment of routes sequentially in memory for a given node. As was described above, if an internal node has an attached route, then the route is placed by design immediately following the associated child pointer in memory (after the right child). Accordingly, when the best match is located for a given node, the destination information associated therewith is known precisely, and may be retrieved directly from memory (as opposed to indirect retrieval if a pointer system is used). This organization technique saves on memory accesses.

For example, upon a match condition, the route look-up engine must load the result which includes the output port associated with the particular switch. With the memory structure described above, the result may be loaded directly by incrementing the pointer information popped off the stack during the backward traversal of the trie (by adding 2 or 3 address locations to the stack pointers depending on the type of node for a one-bit implementation, or by adding 2, 3, 4 or 5 address locations for a two-bit implementation having four children).

In one embodiment of the present invention, a root table is used as a preliminary screen for matching the most significant bits in a key. A root table may be used to perform a quick match of the most significant bits in a key so as to avoid having to perform many memory accesses in the trie search. The root table is stored in controller 106 (FIG. 2). Each entry in the route table includes an address to the start node in memory at which the look-up is to begin and a stack entry. The stack entry includes a bits-to-test indicator and a pointer to an attached route. The table is indexed according to the first N bits of the key. In one embodiment of the present invention, the first eight bits of the key are indexed.

Output Switch

Referring now to FIG. 15A, output switch 102 includes a controller interface 1500, one or more memory inputs 1502 (1502-0 through 1502-7, one for each memory bank), one or more outputs 1504 (1504-0 through 1504-7, one for each multi-function multiport), a result processor 1506 and an output processor 1508. Output switch 102 performs four functions: receive output results, process output results, receive cells from memory and output cells to output ports.

a) Transfers from Memory to the Output Switch

Cells from memory are received at memory inputs 1502 and transferred to output processor 1508. Cells are transferred based on read requests received at the input switch from multi-function multiports. The data structure associated with the cells transferred from global data buffer 104 to output switch 102 is shown in FIG. 15B. Each cell 1510 includes an output port identifier 1512 and cell data 1514.

Output processor 1508 decodes the destination multi-function multiport from the cell information received from memory and transfers the cell data to the appropriate outputs 1502. At each cell slot, output switch 102 may receive a cell for processing from each bank in global data buffer 104.

b) Transfers from the Output Switch to the Multi-function Multiports

Output switch 102 receives notification from controller 106 on controller interface 1500. Result processor 1506 decodes the result (route) and determines which multi-function multiport(s) 150 is (are) to receive the route data. Based on mask 1402 in the notification, result processor 1506 transfers the notification to output processor 1508 for transfer to each multi-function multiport 150 indicated. At each cell slot, output processor 1508 provides (via outputs 1504) a route to each multi-function multiport 150.

The data structure associated with the data transferred from output processor 1508 to multi-function multiports 150 is shown in FIG. 16. A cell 1600 includes a header 1602 and data field 1604. The header 1602 includes memory bank source information 1606 and route information 1608. The memory bank source information includes a source identifier for indicating which memory bank provided the cell in data field 1604. Route information 1608 contains data from the notification including a next hop index, packet length, full address and offsets.

Output Section of a Multi-function Multiport

Referring now to FIGS. 17A and 17B each multi-function multiport 150 includes an output switch interface 316, an input switch interface 304 including read request queues 305, head and tail queue buffer 318, an output request processor 306, an line output interface 308, storage device (memory) 310, stream output buffers 312 and output formatter 314.

a) Notification Queues

A multi-function multiport 150 receives notification that a packet is to be processed in the form of a notification cell 1600 (FIG. 16) received at the output switch interface 316.

Output request processor 306 processes notifications, storing each in an appropriate location in head and tail queue buffer 318 and servicing notification requests as they make their way through the various priority queues in head and tail queue buffer 318. The servicing of requests results in the generation of a read request to input switch 100 associated with the first address in memory where the packet (associated with the particular notification) is stored.

Referring now to FIG. 17B, head and tail queue buffer 319 includes a plurality of notification queues Q 1700, where Q=4*s, and where s is the number of active streams in the multi-function multiport. Unlike the global data buffer, the queues Q are implemented on a per-port basis. The queues in a respective multi-function multiport store only those notifications associated with streams to be outputted from the respective port of the multi-function multiport. Each queue is itself divided into a head region 1702, a tail region 1704 and a body region 1706. The head and tail region for a queue are stored in the head and tail queue buffer 318.

The size of the portion of the head and tail queue buffer dedicated to each stream is fixed at initialization time and is proportional to the peak bandwidth of its stream. The partitions between portions are "hard" in the sense that a stream cannot use more than the memory allocated to, it. The partitions between queues associated with the same stream are "soft". The size of an individual queue is proportional to the nominal bandwidth allocated to its queue. The body region of the notification queue is stored in the notification area 319 (FIG. 3A) of the memory section 290 of the multi-function multiport 150. Each stream is assigned 4 queues (the body portions of the priority queues) in the notification area 319 (FIG. 3A). The body region is sized to be ⅕ of the overall memory section.

Each queue associated with a given stream is serviced according to a priority scheme. Notifications that are received by the output request processor 306 are loaded into an appropriate queue associated with a stream based on the priority of the notification. Priority for notifications can be set by an external source and may be included in the packet received by the router. Alternatively, controller 106 (FIG. 3A) may set the priority depending on the amount of time required to perform the route look-up or other criteria.

Once a queue 1700 has been identified based on the priority information and stream ID, the output request processor 306 loads the notification into the appropriate tail queue 1704. Notifications are transferred between the respective head, tail and body portions of a queue based on available space by a queue manager (not shown). In one embodiment, each notification is 16 bytes, and the notification area 319 is sized to hold 64 bytes. Accordingly, for reasons of bandwidth efficiency, all reads and writes to the notification area are done using 64-byte cells containing four 16-byte notifications each.

The head and tail of each queue is sized to store only a small number of notifications, the bulk of queue storage being provided by the notification area in the multi-function multiport memory bank. As long as space is available on-chip (on the multiport) to hold the notifications for a queue, the notification area is completely bypassed. When on-chip space runs out, the notification area acts as the large "middle" of the queue, with a few notifications at the head and tail being held on-chip.

While the size of the notification area will tend to limit the numbers of dropped packets, occasionally a queue will become full. Output request processor includes a drop engine (not shown) for determining which entries in a particular queue are to be dropped based on a predefined algorithm. In one embodiment, the drop engine institutes a programmable random early drop routine. The routine is programmable in that the user can define one or more parameters, random in that a random number generator is used to determine whether a entry will be dropped. Early refers dropping from the head of the queue.

The programmable random early drop routine may be implemented in software and when executed performs the following sequence of operations. The process begins by calculating the amount of data stored in a particular queue. This information is stored in the form of a fraction (or percentage) of fullness. Thereafter, a drop criterion is determined based on the fraction of fullness. In one embodiment, a table of drop criterion values ranging from zero to one is mapped against fullness fractional values. The drop engine then derives a random number from zero to one. The random number may be generated by a random number generator or other means as is known in the art. A comparison is made between the random number generated and the drop criterion value. Thereafter, the entry at the head of the particular queue is dropped if the random number generated is larger than the drop criterion. Alternatively, the drop engine could avoid the drop if the random number generated is less than the drop criterion. The drop engine operates on each queue at a regular interval to assure that the queues do not overflow and a orderly method of dropping packets is achieved if required. This process is extremely helpful when transmitting packets across the Internet.

b) Per Bank Notification Queues

Each stream includes four queues 1700 that are serviced using a weighted round robin discipline. The weighting is used to reflect the priority associated with a given queue. For example, the four queues for a given stream may be serviced in the following ratios: Q1 at 50%, Q2 at 25%, Q3 at 15% and Q4 at 10%.

The multi-function multiport maintains four cell pointers for each queue: start, end, head, and tail. In one embodiment, each pointer is 23 bits long and can address the entire memory associated with the multi-function multiport. The start and end pointers mark the boundaries of the queue's region, while the head and tail pointers point to the next cell (notification) to read and next cell to write respectively. The head and tail pointers are restricted to align within the region defined by the start and end pointers, and standard wrap-around arithmetic is performed when incrementing these pointers.

Given the description above, it should be clear that the region for a queue can be as small as one cell and as large as the entire memory bank. It is up to the software to configure the pointers at initialization time to define the sizes of the regions, and to ensure that regions are non-overlapping with each other and with the memory allocated to the global packet buffer.

Typically, the software is used to allocate memory to a stream proportional to the stream's bandwidth.

C) Read Request Generation

Output request processor 306 services the queues to extract notifications from the head regions of queues 1700. Output request processor generates a first read request based on the full address received from output switch 102. Thereafter subsequent read requests are generated for transmission to the input switch based on the offset information provided in the request (from cell 1600) or indirect cells (as will be described below). Read requests include a stream identifier and a full address. Read requests are sent by the output request processor to an appropriate read request queue 305. One read request queue 305 is provided for each bank of memory.

If the packet length, as determined from the route information provided with the cell 1600, is greater than five (5) cells, then the output request processor first requests the transfer (read from memory) of the first indirect cell associated with the packet. This is accomplished by computing the address of the indirect cell based on the full address and the offsets provided in cell 1600. After the indirect cell request is generated, the output request processor generates read requests for the remaining cells in the packet based on the full address and the offsets provided in cell 1600. Upon receipt of a indirect cell from the output switch 102, output request processor continues to generate read requests for the remaining cells in the packet based on the offset information contained within the indirect cell.

Subsequent indirect cells are retrieved in a similar fashion. That is, at the time for reading the next indirect cell, the address of the next indirect cell is computed based on the last offset stored in the previous indirect cell. The timing of retrieving the indirect cells is accomplished such that no delays in the output stream are incurred. Each subsequent indirect cell is retrieved prior to the end of the processing of the prior indirect cell. In this way, once the output stream is initialized, no buffering of data is required and no interruptions due to the latency associated with the retrieval process are experienced.

Output requests to an individual memory bank are processed strictly in order. That is, the multi-function multiport may track each request issued to a memory bank (through the read request queues) and is assured that the data received in response to a series of requests to the same memory bank will be strictly delivered according to the sequence or pattern in which they were issued. Output request processor 306 keeps track of requests generated for each memory bank through the use of reply queues (not shown). The request queue contains a stream number and a read address. When a request is issued to memory, the entry is removed from the request queue and the stream number portion is placed in an associated reply queue. When a reply is received, the entry at the head of the reply queue is removed and the reply is sent to the stream number (in stream output buffer 312) indicated by the stream number retrieved from the reply queue.

As cells are received back at the multi-function multiport 150 (responsive to the read requests), they are stored in an associated stream output buffer 312. Stream output buffer 312 includes a plurality of FIFOs, one for each stream. Each cell received for a stream is placed in the streams associated FIFO. For given packet, the multi-function multiport stores a fixed number of cells (in the FIFO) required to provide a streamed output prior to initializing the output of the stream to line output interface 308. In one embodiment of the present invention, twelve cells are stored prior to beginning output (stream data) from the output port. The selection of the number of cells for storage in output buffer 312 is based on the latency in the read process (number of clock cycles between a read request from an multi-function multiport and the arrival of the cell associated with the read request to the output port).

Output formatter 314 receives the cells from output buffer 312 and couples the data with media header information stored in memory 310. Each request (notification) received from output switch 102 includes a next hop index. The next hop index indicates the starting address in memory 310 of the media header information associated with a given type of transmission (derived from the destination of the packet). Media header information stored in memory 310 may be loaded upon initialization of the router and updated by the controller as required. Output formatter 314 couples the cell data returned from memory with the appropriate media header to generate a proper packet for transfer out of router 20 on the line output interface 308.

Packet Routing Overview

Referring now to FIG. 18, in a method of routing packets through a switch a packet is received at a multi-function multiport (1800). The multi-function multiport divides the packet into fixed length cells and transfers the cells to an input switch (1802). Input switch removes the key information from the first cell in a packet and stores it temporarily in a key buffer (1804). Thereafter the input switch routes the cells to memory banks resident in the multi-function multiports in a time division multiplexed manner (1806). The input switch stores the first address in memory where the first cell is stored and computes offsets for each additional cell associated with the offset in memory for the next contiguous memory bank into which the next cell is written (1808). The input switch creates indirect cells to store linking information for the packet if the packet length exceeds five cells (1810). If the number of cells exceeds the number of available offsets in an indirect cell, then the old indirect cell is stored in memory and a new indirect cell is created and loaded based on the offsets calculated for each new cell received at the input switch.

When the packet (and its indirect cells if any) have been stored in memory, then the key, full address of the first cell and offset information is transferred as a look-up request to a controller (1814). The controller performs a best match look-up and generates a result of the look-up. The result includes the destination port (multi-function multiport), address, offset information and next hop index (1816). A notification including the result is transferred to the output switch for transfer to the appropriate multi-function multiport (1818).

Upon receipt of a notification, the multi-function multiport generates read requests a cell at a time to the input switch for the data associated with the packet (1820). The input switch issues the read requests in a time division multiplexed fashion generating a single request to each memory bank per cell slot (1822). When the memory bank receives the request from the input switch, cell data and a multi-function multiport identifier associated with the request are transferred to the output switch (1824). Again, at each cell slot, the output switch transfers a single cell to each of the multi-function multiports. Upon receipt, the multi-function multiport couples the cell data with media header information and streams the data to the destination (1826).

Alternative Implementations i) Multi-function Multiports

In an alternative implementation, multi-function multiport 150 may be divided into separate functional blocks and embodied in separate physical structures. For example, each multi-function multiport may be separated into an input port, an output port and a memory. Memory may include both the global data buffer and the notification queues. Alternatively, memory may be divided further with the notification queues physically manifested as a part of an output port.

ii) Multi-nodes

As described above, a node in a trie can have more than two children. For example, a node can include a bits-to-test indicator that points to two bits in the key to examine at the given node. The two bits can be consecutive bits, or can be separated by one or more bits. In one implementation, the bits to test can be indicated directly by the bits-to-test indicator, e.g. test bits 7 and 8 of the key. Alternatively, the bits-to-test indicator can point to the first bit of a series of consecutive bits to test in the key (i.e., the bits-to-test indicator points to a first bit-to-test where plural bits can be tested). In one implementation, a code is used to signal a bits-to-test indicator that points to plural bits in the key, such as configuring the "r" and "R" bits stored with the bit-to test indicator with a value of binary 11.

A multi-node refers to a node having more than two children. Multi-nodes can be configured including four or more (2 to the n-th children where n is greater than 1) children. Multi-nodes are configured using a data structure, as described above, so that a minimum of data reads from memory are required. More specifically, the pointers to each child are sequentially stored in memory so that depending on the value of the bits in the key, an appropriate child node can be loaded directly. As described above, the sequential ordering minimizes the number of reads required from memory when performing a trie search.

When forward searching a trie and a multi-node is tested, the bits-to-test indicator that is stored on the stack includes plural bits (reflecting the plural bits that have been matched in the search process). When traversing the trie in reverse, entries are popped off the stack in a conventional fashion until the first dissimilar bit is discovered as described above.

Associated with each multi-node can be n or fewer attached routes. A route can be attached for each "bit" in the multi-node. The attached route defines the route to be traversed if a key match arises at the particular bit of the multi-node (the bit is a don't care bit).

iii) Combining Nodes

In an alternative implementation, the process for combining or deleting a node in a trie can be expanded to include creating or disassembling multi-nodes (nodes having more than two children). When adding a node to a trie, a test can be made to determine if the node that is proposed to be added can be combined with other existing nodes in the trie to form a multi-node. For example, a check can be made to determine if the point of insertion for the new node also includes a parent node that has an existing child node (a "sibling node") that points to the same bit as the new node. If so, then a multi-node can be created from the three nodes (the parent node, the new node and the sibling node). If a multi-node can be formed, then the multi-node is constructed and added to the trie as opposed to just adding a single new node. In the deletion process, the deletion of a node can also present the opportunity to create new multi-nodes. More specifically, a check can be made when deleting a node for a combination of a parent node having two children nodes that both point to the same bit-to test bit (without any intervening nodes between the parent and children, e.g. not a combination of "grandparent" and "grandchild" nodes).

The present invention has been described in terms of specific embodiments, which are illustrative of the invention and not to be construed as limiting. Other embodiments are within the scope of the following claims.

What is claimed is:

1. A method of looking up a key associated with a packet to determine a route through a network device comprising:

upon receipt of the key, forward traversing one or more nodes of a trie stored in a memory by evaluating at each node traversed one or more bits in the key, a value of the bits in the key determining a path traversed along the trie;

locating an end node in the trie, the end node being associated with a route;

comparing the route to the key;

if they match, outputting destination information associated with the end node to guide the transfer of the packet through the network device; and if they do not match, traversing the trie backwards to locate a best match for the key.

2. The method of claim 1 wherein the forward traversing includes storing on a stack, for each node associated with one or more attached routes, a bits-to-test indicator and pointers to the attached routes.

3. The method of claim 2 wherein the traversing the trie backwards includes:

comparing the key with the route to determine a first dissimilar bit location;

popping entries off the stack to determine when the bits-to-test indicator associated with a first node in the backward traversal is less than or equal to the first dissimilar bit location; and outputting destination information associated with the first node to guide the transfer of the packet through the network device.

4. The method of claim 3 wherein the first node includes a route, the method further including calculating statistical information for each packet and storing in memory the statistical information with the route associated with each of the end node and the first node.

5. The method of claim 4 further including transferring the statistical information along with the destination information to an output port in the network device for transfer to a destination.

6. The method of claim 1 further including prior to a forward traversal of the trie, searching a root table for a match of a predetermined number of bits in the key, the root table indexed by the predetermined number of bits where each entry includes a pointer to a start node in the trie to begin the forward traversal.

7. The method of claim 1 wherein the forward traversal of the trie includes loading node information for each node traversed in the trie until the end node is reached, the node information including a bits-to-test indicator, a plurality of child pointers and one or more attached routes.

8. The method of claim 1 where the nodes in the trie include $2^n$ child pointers, where n is an integer greater than 1, each pointer including a bits-to-test indicator and an address in the memory where a child node is stored, the bits-to-test indicator indicating one or more bits to be tested in the key associated with a child node to which the child pointers indicate, and where the forward traversal includes testing one or more bits indicated by the bits-to-test indicator and retrieving an appropriate child pointer associated with the child node that indicates a next node in the trie to be traversed after the child node, whereby accesses to the memory are minimized in the forward traversal of the trie by loading a single pointer at each node until the end node is reached.

9. A method of routing a packet through a network device comprising:

upon receipt of the packet, extracting a key from the packet;

forward traversing a trie by evaluating at each node one or more bits in the key, values of the bits in the key determining a path traversed along the trie at each node;

locating an end node in the trie, the end node being associated with a route;

comparing the route to the key;

if they match, retrieving destination information associated with the end node;

if they do not match, traversing the trie backwards to locate a best match for the key having a route and destination information associated therewith; and routing the packet through the network device according to the destination information.

10. A method of inserting a route in a route table where the route table is stored as a trie in a memory of a routing device, the route table defining a path by which a packet is transferred through the routing device, the method comprising:

traversing the trie to determine an insertion point;

determining if the insertion point has an associated parent node and sibling node in the trie;

if so, creating a multi-node from the parent, sibling and the route including setting one or more child pointers in the multi-node to indicate a node directly beneath the insertion point;

storing the multi-node in the memory; and updating the child pointer in a node directly above the parent node to indicate a starting address in the memory for the multi-node.

11. A network device for transmitting packets in a packet switched network comprising:

one or more input ports for receiving packets;

a packet memory;

an input switch coupled to each input port and the memory, the input switch including a transfer engine for transferring packets from an input port to the packet memory and a key extraction engine for extracting a key from each packet;

a controller coupled to the input switch, the controller including a key look-up engine and a route memory, the route memory storing a route table where the route table includes a trie, the key look-up engine traversing the trie to determine a best match to the key, and upon determining the best match for the key, generating notification information, the key look-up engine including a forward traversal engine for forward traversing the trie operable to evaluate at each node traversed one or more bits in the key, where the values of the bits in the key determine the path traversed along the trie, locate an end node having a route, compare the route to the key, if they match, outputting destination information associated with the end node to guide transfer of a packet through the network device, and if they do not match, traversing the trie backwards to locate a best match for the key;

one or more output ports; and an output switch coupled to the controller, the packet memory and the output port for transferring packets from packet memory to an appropriate output port based on the notification information received from the controller.

12. The network device of claim 11 further including a stack and where the forward traversal engine stores on the stack a bits-to-test indicator for the node and pointers to attached routes for each node having attached routes.

13. The network device of claim 12 where the key look-up engine includes a backward traversal engine operable to compare the key with the route to determine a first dissimilar bit location, pop entries off the stack to determine when a bits-to-test indicator associated with a first node in the backward traversal is less than or equal to the first dissimilar bit location, and output destination information associated with the first node to guide a transfer of a packet through the network device.

14. The network device of claim 11 further including a statistical engine for calculating statistical information for each data packet and outputting the statistical information with destination information for transfer to a destination port.

15. The network device of claim 11 where the route memory is divided into a plurality of banks, and where parent and children nodes in the trie are stored in different banks.

16. The network device of claim 11 where each node in the trie includes a bits-to-test indicator, $2^n$ child pointers, and n or fewer attached routes, where a pair of the $2^n$ child pointers indicate a child node to be traversed in the forward traversal when a value of a bit in the key as indicated by the bits-to-test indicator is a first value and second value, respectively.

17. The network device of claim 16 where the child pointers and attached routes are stored in contiguous locations in the route memory.

18. The network device of claim 11 wherein the trie is a modified radix trie.

19. The network device of claim 18 where the nodes in the modified radix trie include $2^n$ child pointers, each pointer including a bits-to-test indicator and an address in the memory where a child node is stored, the bits-to-test indicator indicating one or more bits to be tested in the key associated with a child node to which the child pointers indicate, and where the forward traversal engine is operable to test one or more bits indicated by the bits-to-test indicator and retrieve an appropriate child pointer associated with the child node that indicates a next node in the trie to be traversed after the child node, where accesses to the memory are minimized in the forward traversal of the modified radix trie by loading a single pointer at each node until the end node is reached.

20. A route look-up engine for locating a best match for a key in a route table, the route table including a trie stored in a memory associated with a routing device, the trie including one or more entries defining a path through a routing device for transferring a packet in a packet switched network from a source to a destination, the route look-up engine comprising:

a stack for storing stack entries including a bits-to-test indicator and a pointer to the destination; and a plurality of look-up engines each including a buffer, a bit comparison engine and a key comparison engine, the buffer for storing node information that is retrieved from the memory, the node information including a bits-to-test indicator, wherein responsive to receiving the key associated with a packet, the look-up engine forward traverses the trie, the bit comparison engine evaluating at each node traversed one or more bits in the key as indicated by a bits-to-test indicator associated with each node, a value of the bits in the key determining the path traversed along the trie, the look-up engine storing stack entries on the stack for each node traversed having an attached route, the look-up engine locating an end node having a route, the key comparison engine performing a key comparison for each packet routed through the routing device by comparing the key with the route, if they match, the look-up engine outputting destination information associated with the end node to guide the transfer of the packet through the routing device and if they do not match, the look-up engine traversing the trie backwards, popping entries off the stack, to locate a best match for the key and destination information associated therewith.

21. A computer program, tangibly stored on a computer-readable medium, comprising instructions for causing a device to:

upon receipt of a key, forward traverse a trie stored in a memory by evaluating at each node traversed one or more bits in the key, a value of the bits in the key determining a path traversed along the trie;

locate an end node in the trie, the end node having a route;

compare the route to the key;

if they match, output destination information associated with the end node to guide a transfer of a packet through a device; and if they do not match, traverse the trie backwards to locate a best match for the key and destination information associated therewith.

22. The computer program of claim 21 wherein the forward traverse includes instructions to cause the device to:

store on a stack for each node having an attached route a bits-to-test indicator for the node and pointers to any attached routes.

23. The computer program of claim 22 wherein the backward traverse includes instructions to cause the device to:

compare the key with the route to determine a first dissimilar bit location;

pop entries off the stack to determine when the bits-to-test indicator associated with a first node in the backward traversal is less than or equal to the first dissimilar bit location; and output destination information associated with the first node to guide a transfer of the packet through the device.

24. A device for sending a data packet between a source and destination in a network comprising:

an input port including a data handler, the input port receiving the data packet from the source, the data handler dividing the data packet into one or more fixed length cells;

an output port for routing the data packet to the destination;

a memory divided into a plurality of memory banks;

an input switch for receiving the fixed length cells from the input port and routing consecutive cells of the data packet to different memory banks, wherein a single cell is transferred in a cell slot time span to a memory bank, the input switch including a key reading engine for extracting key information from a first cell received at the input switch associated with the data packet;

a controller coupled to the input switch and receiving the key information therefrom, the controller for decoding destination information from the key information received from the input switch and outputting a notification defining a routing of the data packet from the memory to the output port, the controller including a plurality of look-up engines and a memory for storing routes, each look-up engine operable to compare the key information with routes stored in the memory and determine a best route through the device for a given data packet; and an output switch for routing cells received from the memory to the output port.

25. The device of claim 24 where the input switch includes a linking engine for linking cells in the data packet to allow retrieval of the data packet from non-contiguous locations in the memory.

26. The device of claim 25 further including an indirect cell generator for generating one or more indirect cells, the linking engine tracking the location in the memory where consecutive cells of the data packet are stored and providing an address in memory of each cell in the data packet for storage in indirect cells.

27. The device of claim 24 wherein the input switch time division multiplexes the writing of data packets to the memory such that consecutive cells from the input port are written to consecutive banks in the memory.

28. The device of claim 24 wherein the output port includes a result processor for receiving the notification from the controller and initiating a transfer of the data packet from the memory to the output port.

29. The device of claim 24 wherein the input switch includes a reservation table for scheduling transfers from the memory to the output switch.

30. The device of claim 29 wherein the output switch routes the notification to the output port and thereafter the output port issues a request to the input switch to transfer data packet from memory to the output port through the output switch.

31. The device of claim 30 wherein the request from the output port is stored in the reservation table.

32. The device of claim 31 wherein requests to transfer cells from memory to the output switch are time domain multiplexed so that during one cell slot time span at most a single read request is issued to each bank in the memory for servicing.

33. The device of claim 30 wherein the memory outputs at most a single cell per bank in one cell slot time span.

* * * * *